US008516132B2

(12) United States Patent
Selgas et al.

(10) Patent No.: US 8,516,132 B2
(45) Date of Patent: Aug. 20, 2013

(54) METHOD OF ACCESSING A SELECTED NETWORK

(75) Inventors: Thomas Drennan Selgas, Garland, TX (US); Michael Brian Massing, Boulder Creek, CA (US); John Everett Gmuender, Campbell, CA (US)

(73) Assignee: MyMail, Ltd., San Angelo, TX (US)

( * ) Notice: Subject to any disclaimer, the term of this patent is extended or adjusted under 35 U.S.C. 154(b) by 1133 days.

(21) Appl. No.: 10/417,756

(22) Filed: Apr. 16, 2003

(65) Prior Publication Data
US 2003/0195967 A1 Oct. 16, 2003

Related U.S. Application Data

(60) Division of application No. 09/100,619, and a continuation-in-part of application No. 09/100,619, filed on Jun. 19, 1998, now Pat. No. 6,571,290.

(51) Int. Cl.
*G06F 15/16* (2006.01)

(52) U.S. Cl.
USPC .......................................... 709/228; 709/227

(58) Field of Classification Search
USPC .............. 709/227–229, 230, 237, 217–219, 709/250; 379/114.02
See application file for complete search history.

(56) References Cited

U.S. PATENT DOCUMENTS

| 3,885,104 A * | 5/1975 | Smith et al. .................. 370/377 |
| 4,430,702 A | 2/1984 | Schiebe |
| 4,470,417 A | 9/1984 | Gruber |
| 4,529,870 A | 7/1985 | Chaum |
| 4,757,267 A | 7/1988 | Riskin |
| 4,825,354 A | 4/1989 | Agrawal |
| 5,150,464 A | 9/1992 | Sidhu |
| 5,198,806 A * | 3/1993 | Lord ............................. 726/36 |
| 5,241,594 A | 8/1993 | Kung |
| 5,263,165 A | 11/1993 | Janis |
| 5,287,461 A | 2/1994 | Moore |
| 5,410,543 A | 4/1995 | Seitz et al. |
| 5,426,427 A | 6/1995 | Chinnock |
| 5,475,819 A | 12/1995 | Miller |
| 5,483,596 A | 1/1996 | Rosenow |
| 5,499,289 A | 3/1996 | Bruno |

(Continued)

FOREIGN PATENT DOCUMENTS

| EP | 0 233 682 A2 | 8/1987 |
| EP | 0 270 882 A2 | 6/1988 |

(Continued)

OTHER PUBLICATIONS

Microsoft Web article: "Microsoft Announces Internet Referral Server to Facilitate Selection of Internet Serivce Provider for Users of Windows, Microsoft Internet Explorer", Jul. 30, 1996, http://www.microsoft.com/presspass/press/1996/jul96/reflsvpr.mspx.*

(Continued)

*Primary Examiner* — Kenny Lin
(74) *Attorney, Agent, or Firm* — Gardere Wynne Sewell LLP

(57) ABSTRACT

The present invention comprises a method of and apparatus for simplifying the process of access to a network for a roaming computer user, divides the responsibility of servicing a given user wanting to access the network between multiple parties and minimizes the possibility of improper dissemination of email header data as well as improper use of network resources (including server systems) by non-clients.

21 Claims, 17 Drawing Sheets

(56) References Cited

U.S. PATENT DOCUMENTS

| | | | |
|---|---|---|---|
| 5,558,339 A * | 9/1996 | Perlman | 463/42 |
| 5,572,643 A | 11/1996 | Judson | |
| 5,586,257 A | 12/1996 | Perlman | |
| 5,617,526 A | 4/1997 | Oran et al. | |
| 5,635,940 A * | 6/1997 | Hickman et al. | 342/389 |
| 5,636,209 A | 6/1997 | Perlman | |
| 5,638,433 A * | 6/1997 | Bubien et al. | 379/130 |
| 5,638,494 A | 6/1997 | Pinard et al. | |
| 5,638,513 A | 6/1997 | Ananda | |
| 5,642,419 A | 6/1997 | Rosen | |
| 5,644,737 A | 7/1997 | Tuniman et al. | |
| 5,644,739 A | 7/1997 | Moursund | |
| 5,655,077 A | 8/1997 | Jones | |
| 5,675,507 A | 10/1997 | Bobo | |
| 5,680,549 A | 10/1997 | Raynak | |
| 5,682,325 A | 10/1997 | Lightfoot | |
| 5,684,950 A | 11/1997 | Dare | |
| 5,689,638 A | 11/1997 | Sadovsky | |
| 5,694,546 A | 12/1997 | Reisman | |
| 5,694,549 A * | 12/1997 | Carlin et al. | 709/250 |
| 5,706,502 A | 1/1998 | Foley et al. | |
| 5,708,780 A | 1/1998 | Levergood | |
| 5,721,780 A | 2/1998 | Ensor | |
| 5,732,219 A | 3/1998 | Blumer et al. | |
| 5,745,555 A * | 4/1998 | Mark | 379/93.03 |
| 5,749,075 A | 5/1998 | Toader | |
| 5,751,812 A | 5/1998 | Anderson | |
| 5,752,244 A | 5/1998 | Rose et al. | |
| 5,758,084 A | 5/1998 | Silverstein et al. | |
| 5,761,683 A | 6/1998 | Logan et al. | |
| 5,764,639 A | 6/1998 | Staples | |
| 5,764,902 A | 6/1998 | Rothrock | |
| 5,768,508 A | 6/1998 | Eikeland | |
| 5,774,869 A | 6/1998 | Toader | |
| 5,781,724 A | 7/1998 | Nevarez | |
| 5,790,548 A | 8/1998 | Sistanizadeh et al. | |
| 5,790,800 A * | 8/1998 | Gauvin et al. | 709/227 |
| 5,793,854 A * | 8/1998 | Kashepava | 379/130 |
| 5,796,393 A | 8/1998 | MacNaughton et al. | |
| 5,799,071 A * | 8/1998 | Azar et al. | 379/114.02 |
| 5,801,702 A | 9/1998 | Dolan | |
| 5,802,304 A | 9/1998 | Stone | |
| 5,802,502 A * | 9/1998 | Gell et al. | 705/37 |
| 5,802,530 A | 9/1998 | Van Hoff | |
| 5,806,043 A | 9/1998 | Toader | |
| 5,809,242 A | 9/1998 | Shaw | |
| 5,812,819 A | 9/1998 | Rodwin et al. | |
| 5,815,665 A | 9/1998 | Teper | |
| 5,818,447 A | 10/1998 | Wolf et al. | |
| 5,821,927 A | 10/1998 | Gong | |
| 5,822,539 A | 10/1998 | Van Hoff | |
| 5,825,357 A | 10/1998 | Malamud et al. | |
| 5,825,890 A | 10/1998 | Elgamal et al. | |
| 5,826,000 A | 10/1998 | Hamilton | |
| 5,826,025 A | 10/1998 | Gramlich | |
| 5,828,837 A | 10/1998 | Eikeland | |
| 5,828,843 A | 10/1998 | Grimm | |
| 5,835,712 A | 11/1998 | DuFresne | |
| 5,835,725 A | 11/1998 | Chiang et al. | |
| 5,835,914 A | 11/1998 | Brim | |
| 5,845,070 A * | 12/1998 | Ikudome | 726/28 |
| 5,845,073 A | 12/1998 | Carlin | |
| 5,845,075 A | 12/1998 | Uhler et al. | |
| 5,845,077 A | 12/1998 | Fawcett | |
| 5,852,722 A | 12/1998 | Hamilton | |
| 5,854,901 A | 12/1998 | Cole et al. | |
| 5,862,203 A * | 1/1999 | Wulkan et al. | 379/114.02 |
| 5,862,220 A | 1/1999 | Perlman | |
| 5,862,339 A * | 1/1999 | Bonnaure et al. | 709/227 |
| 5,867,161 A | 2/1999 | Walsh | |
| 5,881,234 A * | 3/1999 | Schwob | 709/219 |
| 5,884,024 A | 3/1999 | Lim | |
| 5,889,958 A | 3/1999 | Willens | |
| 5,890,158 A | 3/1999 | House et al. | |
| 5,890,171 A | 3/1999 | Blumer et al. | |
| 5,890,172 A | 3/1999 | Borman et al. | |
| 5,893,091 A | 4/1999 | Hunt et al. | |
| 5,894,556 A | 4/1999 | Grimm | |
| 5,896,444 A | 4/1999 | Perlman | |
| 5,898,780 A | 4/1999 | Liu | |
| 5,898,839 A | 4/1999 | Berteau | |
| 5,905,736 A | 5/1999 | Ronen et al. | |
| 5,908,469 A | 6/1999 | Botz | |
| 5,913,040 A | 6/1999 | Rakavy | |
| 5,914,714 A | 6/1999 | Brown | |
| 5,918,013 A | 6/1999 | Mighdoll | |
| 5,918,016 A | 6/1999 | Brewer et al. | |
| 5,918,019 A | 6/1999 | Valencia | |
| 5,919,247 A | 7/1999 | Van Hoff et al. | |
| 5,928,333 A | 7/1999 | Landfield et al. | |
| 5,930,258 A | 7/1999 | Dato Solis et al. | |
| 5,935,207 A | 8/1999 | Logue | |
| 5,940,074 A | 8/1999 | Britt, Jr. et al. | |
| 5,944,824 A | 8/1999 | He | |
| 5,950,010 A | 9/1999 | Hesse et al. | |
| 5,953,504 A | 9/1999 | Sokal | |
| 5,956,391 A | 9/1999 | Melen | |
| 5,960,411 A | 9/1999 | Hartman et al. | |
| 5,963,964 A | 10/1999 | Nielsen | |
| 5,974,461 A | 10/1999 | Goldman et al. | |
| 5,978,381 A * | 11/1999 | Perlman et al. | 370/432 |
| 5,983,244 A | 11/1999 | Nation | |
| 5,983,273 A | 11/1999 | White et al. | |
| 5,987,498 A | 11/1999 | Athing | |
| 5,987,611 A * | 11/1999 | Freund | 726/4 |
| 5,991,807 A | 11/1999 | Schmidt | |
| 6,006,333 A | 12/1999 | Nielsen | |
| 6,009,474 A | 12/1999 | Lu et al. | |
| 6,011,794 A * | 1/2000 | Mordowitz et al. | 370/389 |
| 6,012,088 A * | 1/2000 | Li et al. | 709/219 |
| 6,023,585 A | 2/2000 | Perlman et al. | |
| 6,023,698 A | 2/2000 | Lavey et al. | |
| 6,023,729 A | 2/2000 | Samuel | |
| 6,026,079 A * | 2/2000 | Perlman | 370/260 |
| 6,026,151 A * | 2/2000 | Bauer et al. | 379/114.24 |
| 6,034,689 A | 3/2000 | White et al. | |
| 6,035,330 A | 3/2000 | Astiz et al. | |
| 6,038,599 A | 3/2000 | Black | |
| 6,058,250 A | 5/2000 | Harwood et al. | |
| 6,061,798 A | 5/2000 | Coley et al. | |
| 6,067,568 A | 5/2000 | Li | |
| 6,070,192 A | 5/2000 | Holt et al. | |
| 6,070,243 A | 5/2000 | See et al. | |
| 6,073,168 A | 6/2000 | Mighdoll et al. | |
| 6,088,451 A | 7/2000 | He et al. | |
| 6,101,328 A | 8/2000 | Bakshi et al. | |
| 6,101,510 A | 8/2000 | Stone et al. | |
| 6,119,152 A | 9/2000 | Carlin et al. | |
| 6,119,161 A | 9/2000 | Lita | |
| 6,128,660 A | 10/2000 | Grimm et al. | |
| 6,128,663 A | 10/2000 | Thomas et al. | |
| 6,130,933 A * | 10/2000 | Miloslavsky | 379/90.01 |
| 6,134,590 A | 10/2000 | Perlman | |
| 6,138,142 A | 10/2000 | Linsk | |
| 6,141,694 A | 10/2000 | Gardner | |
| 6,145,002 A * | 11/2000 | Srinivasan | 709/225 |
| 6,178,505 B1 | 1/2001 | Schneider et al. | |
| 6,182,229 B1 | 1/2001 | Nielsen et al. | |
| 6,185,625 B1 | 2/2001 | Tso et al. | |
| 6,192,045 B1 * | 2/2001 | Williams et al. | 370/352 |
| 6,195,691 B1 | 2/2001 | Brown et al. | |
| 6,199,065 B1 | 3/2001 | Kenyon | |
| 6,199,110 B1 | 3/2001 | Rizvi | |
| 6,205,126 B1 * | 3/2001 | Moon | 370/329 |
| 6,208,656 B1 | 3/2001 | Hrastar | |
| 6,212,535 B1 | 4/2001 | Weikart et al. | |
| 6,226,655 B1 | 5/2001 | Borman et al. | |
| 6,247,054 B1 | 6/2001 | Malkin | |
| 6,266,681 B1 | 7/2001 | Guthrie | |
| 6,282,548 B1 | 8/2001 | Burner et al. | |
| 6,286,058 B1 | 9/2001 | Hrastar et al. | |
| 6,304,902 B1 | 10/2001 | Black et al. | |
| 6,308,212 B1 | 10/2001 | Besaw | |
| 6,311,197 B2 | 10/2001 | Mighdoll et al. | |

| | | | |
|---|---|---|---|
| 6,311,207 B1 | 10/2001 | Mighdoll | |
| 6,314,516 B1 * | 11/2001 | Cagle et al. | 713/1 |
| 6,332,157 B1 | 12/2001 | Mighdoll et al. | |
| 6,339,830 B1 | 1/2002 | See et al. | |
| 6,345,297 B1 | 2/2002 | Grimm | |
| 6,356,541 B1 | 3/2002 | Muller | |
| 6,370,141 B1 * | 4/2002 | Giordano et al. | 370/386 |
| 6,377,570 B1 * | 4/2002 | Vaziri et al. | 370/352 |
| 6,405,253 B1 | 6/2002 | Schutte | |
| 6,408,336 B1 | 6/2002 | Schneider et al. | |
| 6,421,694 B1 | 7/2002 | Nawaz et al. | |
| 6,424,992 B2 | 7/2002 | Devarakonda | |
| 6,505,232 B1 | 1/2003 | Mighdoll | |
| 6,519,224 B2 | 2/2003 | Hrastar | |
| 6,529,517 B2 | 3/2003 | Hrastar | |
| 6,557,054 B2 | 4/2003 | Reisman | |
| 6,560,704 B2 * | 5/2003 | Dieterman et al. | 713/100 |
| 6,571,290 B2 * | 5/2003 | Selgas et al. | 709/228 |
| 6,578,075 B1 | 6/2003 | Nieminen | |
| 6,606,654 B1 | 8/2003 | Borman et al. | |
| 6,609,198 B1 | 8/2003 | Wood et al. | |
| 6,614,786 B1 * | 9/2003 | Byers | 370/353 |
| 6,618,353 B2 | 9/2003 | Merrill | |
| 6,671,272 B2 * | 12/2003 | Vaziri et al. | 370/352 |
| 6,795,415 B1 * | 9/2004 | Suonvieri | 370/333 |
| 6,795,852 B1 * | 9/2004 | Kleinrock et al. | 709/220 |
| 7,047,560 B2 | 5/2006 | Fishman et al. | |
| 7,082,532 B1 | 7/2006 | Vick et al. | |
| 7,975,056 B2 | 7/2011 | Gmuender et al. | |
| 8,234,575 B2 | 7/2012 | Hartin et al. | |
| 8,275,863 B2 | 9/2012 | Selgas et al. | |
| 2002/0029275 A1 | 3/2002 | Selgas et al. | |
| 2002/0129064 A1 | 9/2002 | Guthrie | |
| 2003/0195967 A1 | 10/2003 | Selgas | |
| 2003/0195968 A1 | 10/2003 | Selgas | |
| 2003/0204606 A1 | 10/2003 | Selgas | |
| 2004/0015592 A1 | 1/2004 | Selgas | |
| 2004/0030752 A1 | 2/2004 | Selgas | |

FOREIGN PATENT DOCUMENTS

| | | |
|---|---|---|
| EP | 0 336 079 A2 | 10/1989 |
| EP | 0 479 660 A2 | 10/1990 |
| EP | 0 479 660 A2 | 4/1992 |
| EP | 0 601 254 A1 | 6/1994 |
| EP | 0 745 924 A2 | 5/1995 |
| EP | 0 814 589 A2 | 6/1996 |
| EP | 0 745 924 A2 | 12/1996 |
| EP | 0 762 297 A | 3/1997 |
| EP | 0 779 751 A2 | 6/1997 |
| EP | 0 779 752 A2 | 6/1997 |
| EP | 0 779 753 A2 | 6/1997 |
| EP | 0 779 754 A2 | 6/1997 |
| EP | 0 793 170 A1 | 9/1997 |
| EP | 0 814 589 A2 | 12/1997 |
| EP | 0 700 625 B1 | 1/2004 |
| GB | 2 289 598 A | 1/1995 |
| GB | 2 289 598 A | 11/1995 |
| JP | 08-340331 A | 12/1996 |
| WO | WO 93/24890 A1 | 12/1993 |
| WO | WO 94/28683 A1 | 12/1994 |
| WO | WO 95/24011 A1 | 9/1995 |
| WO | WO 96/39668 A1 | 12/1996 |
| WO | WO 97/05549 A1 | 2/1997 |
| WO | WO 97/07656 A2 | 3/1997 |
| WO | WO 97/09682 A1 | 3/1997 |
| WO | WO 97/18662 A1 | 5/1997 |
| WO | WO-99/66692 A1 | 12/1999 |

OTHER PUBLICATIONS

McFall, C, "An object Infrastructure for Internet Middleware", IEEE Internet Computing, vol. 2, No. 2, p. 46-51, Apr. 1998.
Snow, A.P., "Internet implications of telephone access", IEEE Computer, vol. 32, No. 9, p. 108-110, Sep. 1999.
Pollard, K. et al, "User-centered design of Web sites and the redesign of LineOne", British Telecom Labs, BT Technology Jounal (UK), vol. 17, No. 1, pp. 69-75, Nov. 1998.
Aboba, Bernard, et al., "Dialup Roaming Requirements," ROAMOPS Working Group, Internet Draft, Dec. 30, 1996.
Aboba, Bernard, et al., "Dialup Roaming Requirements," ROAMOPS Working Group, Internet Draft, Nov. 26, 1996.
Aboba, Bernard, et al., "Review of Roaming Implementations," RFC 2194, Sep. 1997.
Aboba, Bernard, et al., "The Network Access Identifier," ROAMOPS Working Group, Internet Draft, Mar. 6, 1997.
Aboba, Bernard, et al., "The Network Access Identifier," ROAMOPS Working Group, Internet Draft, Feb. 25, 1997.
Aboba, Bernard, et al., "The Network Access Identifier," ROAMOPS Working Group, Internet Draft, Nov. 26, 1996.
Aboba, Bernard, et al., "The Network Access Indentifier," ROAMOPS Working Group, Internet Draft, May 22, 1997.
Ads support 'free' e-mail services, Washington Post, Jun. 3, 1996.
Advertising—Juno Would be delighted to handle your E-mail free, but she would like something in return, New York Times, 1996.
Albinus, Philip, et al. "Ride the Wave with Graphical Online Services—Latest Offerings Promise Faster, Easier Suring (Hands-on Test Results)," Windows Magazine, Sep. 1, 1995.
Allen, Mark, "The GNN Team in Ogden," Interaction, Jun. 1996, p. 13.
American Heritage College Dictionary (excerpts), $3^{rd}$ Ed., Houghton Mifflin Company, 1997.
Angus, Jeffrey Gordon, "Supra Simple offers fast 'net access with few hassles," Info World, vol. 18, No. 4, Jan. 22, 1996.
Associated Press, "GTE with Uunet, Signs on the Internet," The New York Times, Jul. 11, 1996.
AT&T Business Network launches on the Web, Database Magazine, vol. 19, Issue 4, p. 9, Aug./Sep. 1996.
AT&T combines, Information Week, Issue 589, p. 28, Jul. 22, 1996.
AT&T drops Notes: Puts focus on Net, Electronic Buyer's News, Issue 997, p. 66, Mar. 11, 1996.
Automatic Local Access Number Section, IBM Technical Disclosure Bulletin, vol. 38, No. 8, pp. 237-238, Aug. 1995.
Bailey, George, "Establishing an IP Connection," No Name Newsletter, Sep. 1996.
Bass, Steve, et al., "Hot Picks for the Home Office," PC World, vol. 14, Issue 12, Dec. 1996.
Bloomberg Business News, "Company News: Bell Atlantic to Offer Internet Access," The New York Times, Apr. 11, 1996.
Bowen, Charles, "How to Get the Most Out of CompuServe," CompuServe Magazine, Dec. 1995.
Bowen, Charles, et al. How to Get the Most Out of CompuServe, 5th Ed., New York, N.Y., Random House Electronic Publishing, 1993.
Brinkley, Joel. "Two Industries Fight for a $150 Billion Prize," The New York Times, Mar. 28, 1997.
Busch, David D., "The suite sell of access—Integrated application suites will let you finally take full advantage of the net," Netguide, No. 304, 1996.
Caffrey, Brian, "Plugging into the power of the Internet," Electronic Buyer's News, Issue 995, p. 65, Feb. 26, 1996.
Charski, Mindy, et al., "Free E-Mail: A Viable Option for Careful Consumers," PC World, vol. 15, Issue 7, Jul. 1997.
Chen, Elaine, "Data net," Electronic News (North America), vol. 42, Issue 2118, May 27, 1996.
Chen, Elaine, "IBM first major firm to unveil NC. (IBM's Network Station Internet access terminal)," Electronic News, vol. 42, No. 2133, Sep. 9, 1996.
Clegg, Steven G., "Apple Eases Internet Access," LAN Times, vol. 13, No. 8, Apr. 15, 1996.
CNET staff, "PSINet sells consumer accounts," CNET News.com—Tech News First, Jun. 29, 1996.
Cole, David M., "The Cole Digest, Feb. 7, 1996," The Cole Digest, Feb. 7, 1996.
CompuServe Guide for New Members, Jan. 1996.
CompuServe Guide for New Members, May 1996.
CompuServe Magazine, Dec. 1995.
CompuServe, Microsoft Forge Major Strategic Alliance, Microsoft PressPass, Jun. 4, 1996.
Dawson, Keith, "TBTF for Nov. 12, 1996: Where seek is find," Tasty Bits from the Technology Front, Nov. 13, 1996.
Dern, Daniel P., "Better self-installing 'Internet packages' begin to arrive," Networking Computing, vol. 6, Issue 8, p. 34, Jul. 1, 1995.

Di Carlo, Lisa, "Banyan's ENS for NetWare improves access to VINES," *PC Week*, Dec. 20, 1993.
Did you say HTML?, *Interaction*, Jun. 1996, p. 12.
Digital Shelf Space, *Wired*, Dec. 1995.
Dunlap, Charlotte, "AT&T Business Network aims for corporate clients," *Computer Reseller News*, Issue 651 p. 49, Oct. 2, 1995.
Dunlap, Charlotte, "CompuServe pits NetScape v. Lotus," *Computer Reseller News*, Issue 684, p. 53, May 20, 1996.
Dunlap, Charlotte, "Internet access hooks vendors, resellers eager for new market," *Computer Reseller News*, Issue 629, p. 51, May 8, 1995.
EarthLink Announces 'Total Access' Complete Low Cost Internet Access, M2 Presswire, May 24, 1995.
Earthlink Goes Nationwide; Hooks up in 150 Towns, *NetGuide*, vol. 2, Issue 11, Nov. 11, 1995.
Earthlink Pairs with UUNet, *Computer Reseller News*, Issue 647, Sep. 6, 1995.
Edwards, John, "Making a Good Thing Better," *CompuServe Magazine*, Jan. 1996.
E-mail for free, *Waterbury Republican-American*, Jul. 14, 1996.
E-Mailer on WorldCom Lines, *Tulsa World*, Jun. 4, 1996.
Engst, Adam C., et al., "Spry Internet in a Box," Chapter 11, *Internet Starter Kit for Windows*, Hayden Books, 1995.
Firdman, Eric, "How to Unclog the Internet," *The New York Times*, Feb. 9, 1997.
Fisher, Lawrence M., "5 Regional Phone Companies Select Netscape," *The New York Times*, Dec. 10, 1996.
Free e-mail service Juno says has 100,000 members, Reuters America, Inc., Jul. 2, 1996.
Free E-mail with Advertising, *Sarah Stambler's Marketing with Technology News*, Aug. 25, 2995.
Free e-mail, but with a Catch, *Business Week*, Apr. 29, 1996.
Free Mail, Part Two: Two Companies Announce Free Internet E-mail Services, *Multimedia & Videodisc Monitor*, Aug. 1995.
Freemark, Juno Online Plan to Offer Free Electronic Mail Accounts for Those Prepared to Receive Ads with Mail, Aug. 15, 1995.
Furr, Joe, "The Spirit in the Sky," NetGuide, vol. 2, Issue 5, May 1, 1995.
Gerwig, Kate, "Earthlink Expands Access," Interactive Age, vol. 2, Issue 21, p. 8, Aug. 14, 1995.
Going Beyond, *Media Week*, Jul. 8, 1996.
Groves, Dawn with John Overbaugh, *Mosaic in a Box/World Wide Web: 101—A step-by-step guide for getting connected to the Internet*, 1995.
Gryphon, Robert, "Network Central eases file sharing; users can group files into projects for better access," *Info World*, vol. 16, No. 37, Sep. 12, 1994.
Haight, Timothy, et al., "No free lunch, but free Internet e-mail," *Network Computing*, vol. 6, Issue 10, p. 23, Sep. 1, 1995.
Halliday, Caroline M., *The Trail Guide to Prodigy*, Reading, MA, Addison-Wesley Publishing Company, 1995.
Heartland, Amanda. *Prodigy DOS/IBM PC Quick Reference Guide*, New York, N.Y., DDC Publishing, 1993.
Hergert, Douglas. *How to Use Prodigy*, Emeryville, CA, Ziff-Davis Press, 1994.
Herve, R., "A portable component for access control and network protection," *Data Processing and Information*, vol. 2., 1980.
Higgs, Scott, "Windows to the Internet," Byte, Jul. 1995.
Hot Stuff?, *Home PC*, vol. 3, Issue 2, Feb. 1996.
I Own, Therefore I Am, NetGuide, vol. 2, Issue 8, Aug. 1, 1995.
I'm Just Glad Somebody Wants My Business, *PC Magazine*, Jul. 1996.
*Interaction—The New Members Services Monthly*, Aug. 1996.
*Interaction—The New Members Services Monthly*, Mar. 1996.
Internet in a Box: Getting Started, O'Reilly & Associates, Inc., 1994.
Internet in a Box: Installation & Configuration Guide, O'Reilly & Associates, Inc., 1994.
Investment Perspective: The Digital World—America Online, Motley Fool, Jan. 30, 1996.
Jed Savage: Juno's Point Man in Selling 'Free' Email, *Marketing Computers*, vol. 16, Issue 4, Apr. 1996.
Johnson, Ned, *Navigating the Internet with Prodigy*, Indianapolis, IN, Sams.net Publishing, 1995.

Juno Enters Free E-mail Race, *Electronic Marketplace Report*, Jul. 18, 1995.
Juno Hints at shape of things to come, *Financial Times*, Jul. 29, 2996.
Juno Jumps on Free E-Mail Bandwagon, *DM News*, Jan. 15, 1996.
Juno Launches America's First Free Internet E-Mail Service Today, (press release), Apr. 22, 1996.
Juno Launches Free E-mail Service, *Wall Street & Technology*, Jul. 1996.
Juno Set to Brand E-mail with $10M, *Brandweek*, Apr. 22, 1996.
Juno Signs up 100,000 Members in First Two Months, (press release), Jul. 2, 1996.
Kane, Pamela., *PRODIGY—Made Easy*, Berkeley, CA, Osborne McGraw-Hill, 1991.
Kane, Pamela.,*PRODIGY!!!*, Wilmington, DE, PANDA Press, 1994.
Kemp, Fred, "ACW Connections: Accessing the World Wide Web, or Enlightenment Regarding the Internet and Browsing from Home in a Few Easy Concepts," 1995.
Kim, James, "E-mail soon to become free-mail", *USA Today*, Apr. 22, 1996.
Landler, Mark, "Microsoft Near Deal to Acquire Cable TV Stake," *The New York Times*, Jun. 9, 1997.
LANtastic 7.0: Netscape Navigator 2.01 and SPRYNET, 1996.
Lenuzza, Mara, "CompuServe dials the reseller channel to meet big customer needs," VARBusiness, vol. 11, Issue 12, p. 48, Aug. 1995.
Levine, Daniel B., "First Class E-Mail: Six tools that get your Internet message across," *PC World*, vol. 15, Issue 8, Aug. 1997.
Lewis, Peter H., "TV Screen Opens Onto Internet," *The New York Times*, Oct. 22, 1996.
Lichty, Tom, *Official America Online Tour Guide for Windows 2.5, The*, Ventana, 1994.
Lichty, Tom, *Official America Online Tour Guide for Windows 3.1, The*, Ventana, 1996.
Lindstrom, Annie, "BellSouth to give users direct access to AIN (Advanced Intelligent Network)," *Communications Week*, No. 462, Jul. 12, 1993.
Lloyd, B., PPP Authentication Protocols, RFC 1334, Oct. 1992.
Lowe, Doug, Microsoft Network for Dummies, IDG Books Worldwide, 1995.
M.A.K., et al. "AT&T dials into the net," NetGuide, vol. 2, Issue 11, p. 21, Nov. 1995.
Markoff, John, "U.S. Classifies Web TV Technology as a Weapon," *The New York Times*, Nov. 8, 1996.
Masud, Sam, "AT&T to fold NetWare service into Worldnet," *Computer Reseller News*, Issue 692, p. 2, Jul. 15, 1996.
Maybe More than E-mail Should be Free, *PC Week*, Jun. 10, 1996.
McCusker, Tom, "Take Control of Remote Access," *Datamation*, Apr. 1, 1994.
Microsoft Announces 'Normandy,' a New Platform for Commercial Internet Services: First Solution Designed Specifically for ISPs, Commercial Web Sites, Microsoft PressPass, Jun. 4, 1996.
Microsoft Press Computer Dictionary (excerpts), 3$^{rd}$ Ed., Microsoft Press, 1997.
Miller, Michael, *Using Prodigy—The Fast and Easy Way to Learn*, Indianapolis, IN, Que Corporation, 1995.
Miller, Tracy Mygrant, "E-Mail Essentials," *CompuServe*, Feb. 1996.
More Big Guns Enter Microsoft-Justice Fray, *Newsbytes*, Aug. 9, 1995.
Network Security: U.S. Robotics and Security Dynamics Team for Enhanced Remote Access Security Solution; U.S. Robotics Adds to Existing Enterprise—Wide Network Access Security with SecurID Support, *Edge*, Sep. 23, 1996.
Newrock, Melody, *The Trail Guide to the Microsoft Network*, Addison-Wesley Publishing Company, 1996.
News in Brief, *Electronic Advertising & Marketplace Report*, vol. 11, Issue 14, Jul. 15, 1997.
O'Hara, Shelley, et al., "Official EarthLink Beginner's Guide to the Internet," Chapter 3, Ventana Communications Group, 1997.
Online Service Banks on No-Free Access, *PROMO: The Magazine for Promotional Marketing*, Jun. 1996.
Online service connection, The, *NetGuide*, vol. 3, Issue 1, p. 66, Jan. 1996.

Perkins, Doug, "Point-to-Point Protocol for the transmission of multi-protocol datagrams over Point-to-Point links," RFC 1171, Jul. 1990.
Perkins, Doug, "Requirements for an Internet Standard Point-to-Point Protocol," RFC 1547, Dec. 1993.
Perkins, Doug, et al., "Point-to-Point Protocol (PPP) Initial Configuration Options," RFC 1172, Jul. 1990.
Polilli, Steve, "Vendors enhance security across enterprises; IBM readies single sign-on software to speed access, keep security tight," InfoWorld, vol. 16, No. 13, Mar. 28, 1994.
PR Newswire, "First Java-Based Finger Image Technology Provides 'Total' Intranet Security—Prevents Illegal Network Access Due to Security Flaws in Web Browsing Systems or Stolen Passwords/PINs," Mar. 19, 1997.
Press Release: U.S. Robotics, Sep. 18, 1996.
Ranum, Marcus, "Internet Firewall Protection," Open Computing, Sep. 1994.
Reiss, Levi, et al., Open Computing Guide to MOSAIC—Your Guide to Accessing the World Wide Web, Berkeley, CA, McGraw-Hill, Inc., 1995.
Reprogramming D.E. Shaw, Investment Dealer's Digest, Sep. 4, 1995.
Riggs, Brian. "ISPs Offer Internet Globetrotting," LANTimes, Oct. 1996.
Rigney, Carl, et al., "Remote Authentication Dial in User Service (RADIUS)", RFC 2058, Jan. 1997.
Rogers, Amy, "Concentric Network Corp is offering a service that allows employees to dial into local Points of Presence to access their corporate LANs," Communications Week, No. 633, Oct. 14. 1996.
Rohde, David, et al., "AT&T Preps low-cost SDN access; carrier's new Virtual Office Connection remote access utilizing predefined ANIs," Network World, vol. 12, No. 28, Jul. 10, 1995.
Rose, Michael, "The Windows95 TCP/IP Setup How-To/FAQ v1.1," May 1, 1995.
Rose, Michael, "The Windows95 TCP/IP Setup How-To/FAQ v1.4," Nov. 19, 1995.
Sachs, David, et al. Hands-On Mosaic—A Tutorial for Windows Users, Englewood Cliffs, NJ, Prentice Hall PTR, 1995.
Sagman, Stephen W., Travelling the Microsoft Network, Microsoft Press, 1995.
Schmutter, Rachel, et al., "'Free-Mail' Gravy Train Derails," NetGuide, vol. 4, Issue 4, Apr. 1997.
Schuler, Cathi, "Updating AOL," CeePrompt! Computer Connection, Jun. I, 1996.
Scwabach, Bob, "Companies to offer free e-mail service thanks to ads," Star Tribune, Aug. 3, 1995.
Seidman, Robert, "Seidman's Online Insider", vol. 3, No. 23, Jun. 7, 1996.
Selling Your Privacy, PC World, vol. 15, Issue 4, Apr. 1997.
Shah, Rawn, "Getting Started with Windows remote connectivity," Sun World, Mar. 1996.
Sherman, Stephen A., et al., "Secure network Access Using Multiple Applications of AT&T's Smart Card," AT&T Technical Journal, Sep./Oct. 1994.
Sky Dayton, chairman and CEO of EarthLink Network, One of the Nation's Largest Internet Providers, Says UUNet-MFS Merger Validates Internet Company Business Models, Business Wire, May 1, 1996.
Spangler, Todd, "The Net Grows Wider," PC Magazine, vol. 15, No. 20, Nov. 19, 1996.
SprintLink Customer Handbook 2.1 (Sprint Document #5953-2), Oct. 1995.
Stahl, Stephani, "Web crawl continues," Information Week, Issue 581, p. 36, May 27, 1996.
Star hedge fund trader makes big bet on internet, Investment Dealer's Digest, Jul. 17, 1995.
Strom, David, "Three strikes, you're out: network whiffs on lockouts, passwords, access," InfoWorld, vol. 16, No. 46, Nov. 14, 1994.
Support an ad-supported free e-mail access service, Near North News, Jul. 13, 1996.
Sykes, Rebecca, "Commercial ISPs Form Provider Group," PC World, May 21, 1997.

Tatters, Wes, Navigating the Internet with CompuServe, Sams.Net Publishing, 1995.
Tech Bytes: MasterCard in Deal with Net Access Provider; Announces agreement with Concentric Network to furnish Internet access kits with pre-installed security software, American Banker, Mar. 27, 1997.
Telstra has announced that it will invest $300 million over five years to upgrade the ISDN access network (Industry Wakes Up to Potential of ISDN), Exchange Telecommunications Newsletter, vol. 7, No. 5, Feb. 17, 1995.
Travel on the Information Highway, Byte.com, Apr. 1994.
Van Hefner, William, "GTE to Offer Internet Access," Discount Long Distance Digest, Issue No. 69, Vantek Communications, Jun. 7, 1996.
Venditto, Gus, Prodigy for Dummies, Foster City, CA, IDG Books Worldwise, Inc., 1995.
Viescas, John L., The Official Guide to Prodigy Service, Redmond, WA, Microsoft Press, 1991.
Vollmart, Sarah, "How to Implement a PC Security System," The Office, Feb. 1992.
Wall Street's King Quant, Fortune, Feb. 5, 1996.
Webster's New World Dictionary of Computer Terms (excerpts), $6^{th}$ Ed., Simon & Schuster, Inc., 1997.
Webster's New World Dictionary, Third College Edition, Warner Books, Inc., 1990.
WebTV Technical Specifications, Aug. 19, 1997.
Weekly briefs: Internet reseller, Computer Reseller News, Issue 717, p. 63, Jan. 6, 1997.
Wilder, Clinton, "Normandy Lands," Information Week, Issue 583, p. 37, Jun. 10, 1996.
Wilder, Clinton, et al., "Online with AT&T," Information Week, Issue 534, p. 22, Jul. 3, 1995.
Willis, David, et al., "Domestic Internet service providers: Adapt or perish," Network Computing, vol. 7, Issue 9, p. 100, Jun. 1, 1996.
Willis, David, et al., "Interexchange carriers as ISPs: Long-distance runaround," Network Computing, Issue 13, p. 104, Sep. 1, 1996.
WinCIM Spell-Checker Add-On!, CompuServe Magazine, Dec. 1995.
Yamada, Ken, et al., "CompuServe plans major over haul of online services," Computer Reseller News, Issue 644, p. 43, Aug. 21, 1995.
Yamada, Ken, et al., "MSN Lacks ISDN Drivers; Support to be Added in Future OS Updates," Computer Reseller News, Issue 647, Sep. 6, 1995.
Zorn, Glen, "Dialup Roaming," Microsoft Corporation, Apr. 8, 1997.
CD ROM re: Bell Atlantic 1.0 (1996).
CD ROM re: GTE Internet (1996).
Dear Windows 95 Beta Tester letter from Microsoft, Mar. 1995.
Dear Windows 95 Beta Tester letter from Microsoft, Oct. 1994.
Dear Windows Developer letter from Microsoft, Mar. 15, 1995.
Internet Connection product literature re: The Internet Connection, Jan. 13, 1995.
Local Internet Access from Mindspring Enterprises, Inc., 1994.
MindSpring press release re: MindSpring Announces Second Quarter Results, Jul. 22, 1998.
MindSpring press release re: America Gets Connected as MindSpring's World Wide Web Wagon Tours Across the Country, Sep. 23, 1998.
MindSpring press release re: MindSpring Introduces Dedicated ISDN Service in Atlanta—Affordable, Full-Time Connections for Small or Home Offices, Jul. 1, 1998.
MindSpring press release re: MindSpring Introduces V.90 Service, Aug. 11, 1998.
MindSpring press release re: MindSpring Purchases SPRYNET Subscribers and Other Assets from America Online, Inc., Sep. 10, 1998.
MindSpring press release re: MindSpring to Offer Two-Way Cable Modem Service via KNOLOGY's Broadband Network, Aug. 31, 1998.
Netcom product literature, 1994.
Netcom product literature, Jan. 13, 1995.
NetSafe product literature re: system security, 1998.
Press Release re: NetSafe Announces First Suite of Integrated Customizable Internet Tools and Services, Oct. 23, 1996.
Product Literature re: NetSafe, Oct. 23, 1996.
Product literature re: MindSpring, including press releases, 1998.

Rogers, Diane, "Building Web enabled applications with Delphi 2.0," Jun. 12, 1996.
Staff of Classroom Connect, *Family Internet Companion*, PrenticeHall, Inc., 1997.
WebTV Networks—Company Background, WebTV Networks Inc., Aug. 19, 1997.
Yoshida, Junko, "WebTV: Microsoft's Consumer Foothold," *Electronic Engineering Times*, May 1997.
TA 2.0 (Aug. 25, 1998); TA 1.69 WIN3.1 (Mar. 21, 1997); TA 2.0.0 45576 for WIN 95.
EarthLink Total Access Internet Installation CD 1996.
EarthLink Total Access Internet Installation CD 1996 w/ Netscape Navigator.
EarthLink Network Virtual Vineyards Epicurious Foods Installation CD 1996.
EarthLink Network Total Access Internet w/ Netscape Navigator Installation CD 1996 (Black).
EarthLink Network Total Access Internet w/ Netscape Navigator Internet Phone Installation CD 1996.
EarthLink Network Total Access Internet CompUSA w/ Netscape Navigator Install CD 1996.
EarthLink Network Total Access Internet w/ Netscape Navigator, AirWarrior and Poker Installation CD 1996.
EarthLink Network Total Access Internet Lollapalooza '96.
Bruin ONline Gold Pilot Release, Sep. 11, 1997.
Bloom, Paul, et al., "A Network Solution for Improved Security for Computer Access," *Computer Technologies for the 90s*, Oct. 1998).
Cooney, Michael, "New software helps remote users access mainframe application," *Network World*, Jan. 11, 1993.
Dodd, Annabel Z., *Essential Guide to Telecommunications, Third Edition*, Prentice Hall PTR, 2000.
Edwards, John, "Single Sign-On Technology Streamlines Network Access," *Software Magazine*, Nov. 1993.
GPT Communications Systems' new ISDN solution integrates calling line identification to safeguard corporate network from unauthorized access, *Communicate*, May 1996.
Haller, N., et al., On Internet Authentication, RFC 1704, Oct. 1994.
Intelitrak's Citadel Gatekeeper Uses Voice Verification for Secure Network Access, Jul. 1996.
Leech, M., Username/Password Authentication for SOCKS V5, RFC 1929, Mar. 1996.
Lindholm, Elizabeth, "Tools for Remote LAN Access," *Datamataion*, Apr. 1, 1994.
Moltzen, Edward F., "IBM Eyes Remote NC Access: IBM is merging LDAP with its network computer platform, which will enable remote log-on and access to data," *Computer Reseller News*, May 12, 1997.
Neumann, A.J., "A Basis for Standardization of User-Terminal Protocols for Computer Network Access," U.S. Department of Commerce, National Bureau of Standards Technical Note 877, Jul. 1975.
Rendleman, John, "AT&T introduces Software Defined Network Virtual Office Connection service allowing remote access to corporate network from designated phone numbers," *Communications Week*, No. 570, Aug. 14, 1995.
St. Johns, Mike, Identification Protocol, RFC 1413, Feb. 1993.
U.S. Robotics and Security Dynamics Team for Enhanced Remote Access Security Solution; U.S. Robotics Adds to Existing Enterprise-Wide Network Access Security with SecurID Support, *Business Wire*, Sep. 18, 1996.
Escrow Agreement between AT&T Corp. and MyMail, Ltd., Feb. 8, 2005.
Patent License Agreement between AT&T Corp. and MyMail, Ltd., Feb. 8, 2005.
Settlement and Release Agreement between AT&T Corp. and MyMail, Ltd., Feb. 8, 2005.
AT&T Corp.'s and MyMail, Ltd.'s Joint Stipulation and [Proposed] Order of Dismissal with Prejudice, Mar. 11, 2005.
Order granting AT&T Corp.'s and MyMail, Ltd.'s Joint Stipulation and [Proposed] Order of Dismissal with Prejudice, Mar. 15, 2005.
*Excerpt* from Patent License Agreement between America Online, Inc. and MyMail Ltd., Aug. 30, 2005.
America Online, Inc.'s and MyMail, Ltd.'s Agreed Motion to Dismiss with Prejudice, Aug. 31, 2005.
Order granting America Online, Inc.'s and MyMail, Ltd.'s Agreed Motion to Dismiss with Prejudice, Sep. 1, 2005.
Patent License Agreement between GTE.Net LLC and MyMail, Ltd., Jul. 6, 2005.
Settlement and Release Agreement between GTE.Net LLC and MyMail, Ltd., Jul. 6, 2005.
GTE.Net LLC's and MyMail, Ltd's Agreed Motion to Dismiss with Prejudice, Jul. 7, 2005.
Order granting GTE.Net LLC's and MyMail, Ltd's Agreed Motion to Dismiss with Prejudice, Jul. 13, 2005.
PACER docket sheet for litigation as of Apr. 20, 2007.
MyMail's Second Amended Complaint, Oct. 27, 2004, with attached Exhibit A.
America Online, Inc.'s Answer to Plaintiff's Second Amended Complaint, Nov. 15, 2004, including: • Defendant America Online, Inc.'s Motion to Unseal its Answer to Plaintiff's Second Amended Complaint, Jan. 12, 2005. • Order granting Defendant America Online, Inc.'s Motion to Unseal its Answer to Plaintiff's Second Amended Complaint, Jan. 26, 2005.
Plaintiff MyMail's Reply to Defendant AT&T Corp.'s Counterclaims, Nov. 22, 2004.
MyMail's Third Amended Complaint, Jul. 26, 2005.
Defendant Earthlink, Inc.'s Answer and Counterclaims to Plaintiff's Third Amended Complaint, Aug. 2, 2005.
Answer and Counterclaim of Defendants NetZero, Inc., Juno Online Services, Inc., and Netbrands, Inc. to MyMail's Third Amended Complaint, Aug. 2, 2005.
America Online, Inc.'s Answer to Plaintiff's Third Amended Complaint, Aug. 3, 2005.
Defendants Prodigy Communications Corporation and Southwestern Bell Internet Services, Inc.'s Answer to MyMail's Third Amended Complaint, Aug. 3, 2005.
Defendant SBC Internet Services, Inc.'s Answer to MyMail's Third Amended Complaint, Aug. 16, 2005.
Plaintiff MyMail's Reply to Counterclaims of Defendants NetZero, Inc., Juno Online Services, Inc., and Netbrands, Inc., Aug. 16, 2005.
Plaintiff MyMail's Reply to Defendant Earthlink, Inc.'s Answer and Counterclaims to Plaintiff's Third Amended Compliant, Aug. 17, 2005.
MyMail, Ltd.'s Preliminary Infringement Contentions, Aug. 2, 2004, including: • MyMail, Ltd.'s Infringement Claim Chart for U.S. Patent No. 6,571,290 B2 re: America Online, Inc.; • MyMail, Ltd.'s Infringement Claim Chart for U.S. Patent No. 6,571,290 B2 re: AT&T Corp.; • MyMail, Ltd.'s Infringement Claim Chart for U.S. Patent No. 6,571,290 B2 re: NetZero, Inc.; • MyMail, Ltd.'s Infringement Claim Chart for U.S. Patent No. 6,571,290 B2 re: Juno Online Services, Inc.; • MyMail, Ltd.'s Infringement Claim Chart for U.S. Patent No. 6,571,290 B2 re: Netbrands, Inc.; • MyMail, Ltd.'s Infringement Claim Chart for U.S. Patent No. 6,571,290 B2 re: Earthlink, Inc.; • MyMail, Ltd.'s Infringement Claim Chart for U.S. Patent No. 6,571,290 B2 re: SBC Communications, Inc.; and • MyMail, Ltd.'s Infringement Claim Chart for U.S. Patent No. 6,571,290 B2 re: Verizon Communications, Inc.
MyMail. Ltd.'s Preliminary Infringement Contentions for GTE.Net LLC, Oct. 25, 2004.
MyMail, Ltd.'s Preliminary Infringement Contentions for U.S. Patent No. 6,571,290 B2 re: Prodigy Communications Corp., Nov. 30, 2004.
MyMail, Ltd.'s Preliminary Infringement Contentions for Prodigy Communications Corp. and Southwestern Bell Internet Services, Inc., Nov. 30, 2004.
Plaintiff MyMail, Ltd.'s Final Infringement Contentions, Jul. 5, 2005.
Expert Report of Jeffrey O. Smith, Jul. 1, 2005.
Facsimile re: *provider architecture v. NetSafe architecture*, May 21, 1996.
Email dated Apr. 23, 1997.
Email dated Dec. 31, 1997.
Email dated Mar. 16, 1998.
Email dated Mar. 18, 1998.
Email dated Mar. 26, 1998.
Email dated Apr. 8, 1998.
Email dated Oct. 27, 1997.

Email dated Dec. 12, 1997.
Email dated Jan. 28, 1998.
Email dated Jan. 30, 1998.
Email dated Feb. 7, 1998.
Email dated Feb. 19, 1998.
Email dated Jul. 28, 1998.
Email dated Aug. 29, 1998.
Email dated Aug. 31, 1998.
Email dated Jul. 22, 1998.
Email dated Aug. 12, 1998.
Texas Secretary of State Service of Process Information, Aug. 31, 1999.
Facsimile of Nov. 24, 1999.
Letter for Jul. 29, 1999.
Email dated Nov. 16, 1999.
NetSafe Confidential Business Plan, 1999-2001, Dec. 10, 1998.
NetSafe Confidential Business Plan, Feb. 1, 1999.
Email dated Feb. 15, 1999.
NetSafe product information, Dec. 21, 1996.
NetSafe, Inc. Press Background Information, 1996.
NetSafe Netrepreneur Introduction Manual, 1996.
NetSafe, Inc. registration form, Oct. 1, 1996.
NetSafe press release, Oct. 23, 1996.
Encryption Worksheet, Sep. 15, 1998.
NetSafe's Proposal for Smith Barney's Internet Project, Aug. 1995.
Microsoft Corporation letter to Dear Windows Developer, Mar. 15, 1995.
Dear Windows 95 Beta Tester letter, Mar. 15, 1995.
Microsoft Corporation letter to Dear Windows 95 Beta Tester, Oct. 28, 1994.
Neat! Quick Start Guide, 1997.
Promissory Note, Nov. 25, 1996.
Form S-4 for Microsoft Corporation, May 2, 1997.
Form S-4/A for Microsoft Corporation, Jun. 13, 1997.
Registration Statement on Form 2-8, Microsoft Corporation, Aug. 18, 1998.
Form SC 13D for Microsoft Corporation, Dec. 29, 1997.
Form SC 13D for Microsoft Corporation, Sep. 26, 1997.
Form SC 13D/A for Microsoft Corporation, Jan. 6, 1998.
Form SC 14G for Microsoft Corporation, Mar. 9, 1998.
Form SC 13G for Microsoft Corporation, Feb. 13, 1998.
Form SC 13G for Microsoft Corporation, Feb. 14, 1997.
Defendant America Online, Inc.'s Initial Disclosures, Aug. 23, 2004.
Defendant AT&T Corp.'s initial Disclosures, Aug. 23, 2004.
Defendant Earthlink, Inc.'s Initial Disclosures Pursuant to Federal Rule of Civil Procedure 26(a)(1) and the Court's Discovery Order, Aug. 23, 2004.
MyMail, Ltd.'s Initial Disclosures, Aug. 23, 2004.
Initial Disclosures of NetZero, Inc., Juno Online Services, Inc. and Netbrands, Inc. Pursuant to F.R.C.P. 26(a)(1) and Rule 1 of the Court's Discovery Order, Aug. 23, 2004.
Defendants' Proposed Terms and Claim Elements for Construction, Nov. 23, 2004.
Rule 26(a) Initial Disclosures and Discovery Order Disclosures of Defendant SBC Communications Inc., Aug. 23, 2004.
Rule 26(a) Initial Disclosures and Discovery Order Disclosures of Defendants Prodigy Communication Corp. and Southwestern Bell Internet Services, Inc , Dec. 23, 2004.
GTE.Net LLC's Initial Disclosures, Nov. 15, 2004.
Defendants' Preliminary Claim Constructions and Identification of Extrinsic Evidence, Feb. 3, 2005.
GTE.Net LLC's First Amended Disclosures, Feb. 23, 2005.
MyMail, Ltd.'s First Amended Disclosures, May 17, 2005.
Amended Rule 26(a) Initial Disclosures and Discovery Order Disclosures of Defendants Prodigy Communication Corp. and Southwestern Bell Internet Services, Inc., Jun. 15, 2005.
MyMail, Ltd.'s First Supplemental Disclosures, Jul. 11, 2005.
MyMail, Ltd.'s Second Supplemental Disclosures, Jul. 21, 2005.
Defendant America Online, Inc.'s Supplemental Initial Disclosures, Jul. 22, 2005.
MyMail, Ltd.'s Third Supplemental Disclosures, Jul. 25, 2005.
Defendant America Online, Inc.'s Second Supplemental Initial Disclosures, Jul. 25, 2005.
Defendant America Online, Inc.'s Third Supplemental Initial Disclosures, Jul. 28, 2005.
Earthlink, Inc.'s First Supplemental Initial Disclosures, Aug. 2, 2005.
Supplemental Disclosures of NetZero, Inc., Juno Online Services, Inc. and Netbrands, Inc. Pursuant to F.R.C.P. 26(a)(1) and Rule I of the Court's Discovery Order, Aug. 15, 2005.
Defendants' Preliminary Invalidity Contentions (w/ Defendants' Responsive Claim Charts), Sep. 16, 2004.
Defendant SBC Communications, Inc.'s Preliminary Invalidity Contentions and Accompanying Document Production, Sep. 16, 2004.
GTE.Net LLC's Preliminary Invalidity Contentions (w/ GTE.Net LLC's Invalidity Chart), Dec. 1, 2004.
Defendants Southwestern Bell Internet Services Inc and Prodigy Communications Corporation Preliminary Invalidity Contentions and Accompanying Document Production, Jan. 10, 2005.
Final Invalidity Contentions of Defendants Netzero, Inc., Juno Online Services, Inc., and Netbrands, Inc., Jul. 25, 2005.
Defendant America Online, Inc.'s Final Invalidity Contentions, Jul. 25, 2005.
Earthlink, Inc.'s Final Invalidity Contentions, Jul. 25, 2005.
Prodigy's and SBIS's Final Invalidity Contentions, Jul. 25, 2005.
DR 00001378, GTE.Internet CD ROM, 1996.
DR 00001379, Bell Atlantic 1.0 CD ROM, 1996.
Memo to Tex Wooters from Bob Derby, Oct. 22, 1996.
NetSafe, Inc. facsimile from Tex Wooters, Dec. 3, 1996.
GTE Intelligent Network Services NetSafe 800 Usage reports, Jul.-Aug. 1996.
NetSafe, Inc. report re: GTE Invoices 1996.
GTE Intellingent Network Services NetSafe 800 Usage reports, May 1996-Jan. 1997.
Appendix A to Patent Rule 4-3 Joint Claim Construction and Brief Statement, Feb. 14, 2005.
Appendix B Patent Rule 4-3 Joint Claim Construction and Brief Statement, Feb. 14, 2005—Support for Defendants' Proposed Constructions, Feb. 14, 2005.
Plaintiff's Markman Tutorial PowerPoint presentation, Mar. 21, 2005.
Plaintiff MyMail's Markman Claim Construction Brief, Mar. 3, 2005, including: • Exhibit A—Declaration of Jeff Smith in Support of Claim Construction of U.S. Patent No. 6,571,290, Mar. 5, 2005 (with attached Curriculum Vitae); and • Exhibit B—U.S. Patent No. 6,571,290 (Selgas).
Defendant America Online, Inc.'s Claim Construction Brief, Mar. 16, 2005, including: • Exhibit 1—U.S. Patent No. 6,571,290 (Selgas), May 27, 2003; • Exhibit 2—Notice of Allowance re: U.S. Appl. No. 09/100,619/U.S. Patent No. 6,571,290 (Selgas), Oct. 2, 2002; • Exhibit 3—Interview Summary re: U.S. Appl. No. 09/100,619/U.S. Patent No. 6,571,290 (Selgas), Sep. 17, 2002; • Exhibit 4—Excerpts from *Webster's New World Dictionary of Computer Terms, Sixth Edition*, 1997; • Exhibit 5—Excerpts from *The American Heritage College Dictionary, Third Edition*, 1993; • Exhibit 6—Excerpts from *Microsoft Press Computer Dictionary, Third Edition*, 1997; • Exhibit 7—Merriam-Webster Online entry re: "800 number" and "modified"; • Exhibit 8—Declaration of R. Greg Lavender [cover page only]; • Exhibit 9—Excerpts from transcript of deposition of Thomas Selgas, Sep. 16, 2004; • Exhibit 10—Excerpts from transcript of deposition of Thomas Selgas, Oct. 27, 2004; • Exhibit 11—Excerpts from transcript of deposition of Thomas Selgas, Nov. 3, 2004; • Exhibit 12—Letter from Bradley W. Caldwell to All Defense Counsel, Feb. 18, 2005; • Exhibit 13—Letter from Lauren A. Dregnan to Bradley W. Caldwell, Feb. 28, 2005; • Exhibit 14—Letter from Bradley W. Caldwell to Lauren A. Dregnan, Mar. 4, 2005; and • Exhibit 15—Letter from Lauren A. Dregnan to Bradley W. Caldwell, Mar. 14, 2005.
Responsive Markman Brief of Defendants Netzero, Inc., Juno Online Services, Inc., NetBrands, Inc., Earthlink, Inc., Prodigy Communications Corp., Southwestern Bell Internet Services, Inc., and GTE.Net, LLC, Mar. 16, 2005, including exhibits: • Exhibit 1—U.S. Patent No. 6,571,290 (Selgas), May 27, 2003; • Exhibit 2—U.S. Appl. No. 09/100,619/U.S. Patent No. 6,571,290 (Selgas), Jun. 19, 1998; • Exhibit 3—Redacted version of Network Services Agreement between UUNET Technologies, Inc. and Earthlink Network, Inc., Jul. 12, 1995, ELNKMM010090; • Exhibit 4—Interview Summary re: U.S. Appl. No. 09/100,619/U.S. Patent No. 6,571,290 (Selgas), Sep. 17, 2002; • Exhibit 5—Preliminary Amendment re: U.S. Appl. No. 09/100,619/U.S. Patent No. 6,571,290 (Selgas), Aug. 15, 2001; • Exhibit 6—Excerpts from transcript of deposition of Michael B. Massing, Nov. 9, 2004; • Exhibit 7—Excerpt from U.S. Appl. No. 09/100,619/U.S. Patent No. 6,571,290 (Selgas), Jun. 19, 1998; • Exhibit 8—File History of U.S. Appl. No. 60/050,186 (Selgas); • Exhibit 9—Preliminary Amendment re: U.S. Appl. No. 09/100,619/U.S. Patent No. 6,571,290 (Selgas), May 10, 2000; • Exhibit 10—Excerpts from *American Heritage College Dictionary, Third Edition*, 1993; • Exhibit 11—Excerpts from *Microsoft Press Computer Dictionary, Third Edition*, 1997; • Exhibit 12—Excerpts from *Webster's New World Dictionary of Computer Terms, Sixth Edition*, 1997; • Exhibit 13—Excerpts from transcript of deposition of John Everett Gmuender, Nov. 7, 2004; and • Exhibit 14—File History of U.S. Patent No. 6,571,290 (Selgas).

Plaintiff MyMail's Reply in Support of its Markman Claim Construction Brief, Mar. 23, 2005, including: • Exhibit A—Interview Summary re: U.S. Appl. No. 09/100,619/U.S. Patent No. 6,571,290 (Selgas); and • Exhibit B—Excerpts from *Webster's New World Dictionary*, 1990.

Plaintiff's Markman Presentation, Opening, Apr. 6, 2005.

Plaintiffs Markman Presentation, Claim Terms, Apr. 6, 2005.

Plaintiff's Presentation Slides unavailable on Apr. 6, 2005 (submitted Apr. 7, 2005).

Claim Construction Memorandum Opinion issued by the Honorable Leonard Davis, Jun. 3, 2005.

Transcript of Markman Hearing Before the Honorable Leonard Davis, Apr. 6, 2005.

Richard D. Grauer Expert Report, Jun. 30, 2005.

M.Y. Sandidi Expert Report, Jun. 22, 2005 • Exhibit A—Curriculum Vita of M.Y. Sanadidi, Ph.D. • Exhibit B—Listing re: Materials Review for Preparation of Report • Exhibit C—Summary chart re: '290 patent and Juno 1.0 prior art • Exhibit D—Illustrations re: Juno 1.0 operating system • Exhibit E—Summary chart re: '290 patent and IBM TDB • Exhibit F—Summary chart re: '290 patent and Kleinrock patent.

Jeffrey O. Smith Expert Report, Mar. 5, 2005.

Jeffrey O. Smith Supplemental Expert Report, Sep. 30, 2005.

Jeffrey O. Smith Expert Report, Jul. 1, 2006.

John R. Vollbrecht Expert Report, Jul. 1, 2005.

Ellen W. Zegura Addendum to Initial Expert Report, Oct. 19, 2005.

UOL's Reply in Support of its Motion for Summary Judgment of Noninfringment, Sep. 6, 2005 • Exhibit A—Excerpts from transcript of deposition of Jeffrey O. Smith, Aug. 18, 2005 • Exhibit B—Excerpts from transcript of deposition of Michael Sharp, Aug. 11, 2005 • Exhibit C—Excerpts from transcript of deposition of Jeffrey O. Smith, Aug. 22, 2005.

MyMail's Sur-Reply to UOL Defendants' Motion for Summary Judgment of Non-Infringement, Sep. 16, 2005.

Plaintiff MyMail's Sur-Reply to Prodigy and SBIS' Reply in Support of its Motion for Summary Judgment of Non-Infringement, Sep. 29, 2005.

Defendants' [Earthlink, Inc., America Online, Inc., NetZero, Inc., Juno Online Services, Inc., NetBrands, Inc., Prodigy Communications Corp., and Southwestern Bell Internet Services, Inc.] Motion for Summary Judgment of Invalidity Based on the On-Sale Bar, Jul. 26, 2005, including exhibits: • Defendants' Exhibit A—Plaintiff MyMail, Ltd.'s Objections and Responses to Defendants' Second Set of Common Interrogatories (Nos. 13-14), Oct. 29, 2004; • Defendants' Exhibit B—Excerpts from transcript of deposition of Thomas D. Selgas, May 5, 2005; • Defendants' Exhibit C—Excerpts from transcript of deposition of Thomas D. Selgas, Dec. 9, 2004; • Defendants' Exhibit D — Excerpts from transcript of deposition of Thomas D. Selgas, Mar. 1, 2005; • Defendants' Exhibit E—U.S. Appl. No. 60/050,186; • Defendants' Exhibit F—Excerpt from U.S. Appl. No. 09/100,619 (now U.S. Patent No. 6,571,290 (Selgas)) 186; • Defendants' Exhibit G—Excerpt from U.S. Patent No. 6,571,290 (Selgas); • Defendants' Exhibit H—Excerpt from Preliminary Amendment re: U.S. Appl. No. 09/100,619 (now U.S. Patent No. 6,571,290 (Selgas)), Aug. 15, 2001; and • Defendants' Exhibit I—Excerpt from U.S. Appl. No. 09/100,619 (now U.S. Patent No. 6,571,290 (Selgas)), May 8, 2000.

UOL Defendants' Motion for Summary Judgment of Patent Invalidity, Aug. 2, 2005, including exhibits: • Exhibit I—Declaration of Abhijit Khale; • Exhibit 2—Memorandum Opinion 186; and • Exhibit 3—Expert Report of M.Y. Sanadidi.

Defendants' Motion for Summary Judgment of Invalidity Under Section 102(B) Based on Sales and Public Use of the Inventors' "NEAT" Software System and Memorandum in Support Thereof, Aug. 2, 2005 Proposed Order, including exhibits: • Exhibit A—Statement of Material Facts Pursuant to Local Rule CV-56; • Exhibit B—Wooter E-mail of Dec. 8, 1996; • Exhibit C—Selgas & Derby e-mail of Jun. 22, 1997; • Exhibit D—U.S. Patent No. 6,571,290 (Selgas); ∩ Exhibit E—Excerpts from Plaintiff MyMail, Ltd.'s Objections and Responses to Defendants' First Set of Common interrogatories (Nos. 1- 12), Aug. 13, 2004; • Exhibit F—Excerpts from transcript of deposition of John Everett Gmuender, Nov. 7, 2004; • Exhibit G—Excerpts from Plaintiff MyMail, Ltd.'s Objections and Responses to Defendants' Second Set of Common Interrogatories (Nos. 13-14), Oct. 29, 2004; • Exhibit H—MyMail, Ltd. Capital Ownership report, May 3, 2005; • Exhibit I—Excerpts from transcript of deposition of Thomas D. Selgas, May 5, 2005; • Exhibit J—Excerpts from transcript of deposition of Thomas D. Selgas, Dec. 9, 2004; • Exhibit K—Statement of Holman (Tex) H. Wooters, GTE 19829-19830; • Exhibit L—Excerpts from transcript of deposition of Holman (Tex) H. Wooters, Jul. 28, 2005; • Exhibit M—Excerpts from transcript of deposition of Michael B. Massing, Nov. 9, 2004; • Exhibit N—Netsafe Powerpoint presentation, Mymail 3313-3343; • Exhibit O—Excerpts from transcript of deposition of Channing Corn, Jun. 3, 2005; • Exhibit P—Customer Growth Data; • Exhibit Q—GTE Invoice; and • Exhibit R—GTE 800 Number Usage Data.

Earthlink, Inc.'s Motion in the Alternative for Summary Judgment of Invalidity Based on Anticipation of Claims 3-8 and 11, Aug. 3, 2005, including exhibits: • Earthlink's Exhibit A—Declaration of Gregory Collins, Aug. 3, 2005; • Earthlink's Exhibit B—Excerpt from the transcript of the deposition of Cyrus Pejoumand; • Earthlink's Exhibit C—Expert Report of Jeffrey O. Smith, Jul. 1, 2005; • Earthlink's Exhibit D—*Upsher-Smith Laboratories, Inc.* v. *Pamlab, L.L.C.*, 2005 U.S. App. LEXIS 11527, Jun. 17, 2005; • Earthlink's Exhibit E—*Prima Tek II, L.L.C.* v. *Southpac Trust International, Inc.*, 412 F.3d 1284, Jun. 22, 2005; • Earthlink's Exhibit F—Initial Expert Report of Ellen W. Zegura Regarding the Invalidity of U.S. Patent No. 6,571,290, Jul. 1, 2005; • Earthlink's Exhibit G—Declaration of Kevin Lu, Aug. 2, 2005; • Earthlink's Exhibit H—Rebuttal Expert Report of Jeffrey O. Smith, Jul. 29, 2005; •Earthlink's Exhibit I—MyMail claim chart comparing U.S. Patent No. 6,571,290 and Earthlink Total Access 1.0; • Earthlink's Exhibit J—MyMail claim chart comparing U.S. Patent No. 6,571,290 and Earthlink Total Access 1.0; and • Earthlink's Exhibit K—MyMail claim chart comparing U.S. Patent No. 6,571,290 and Earthlink Total Access 1.0.

Plaintiff MyMail's Response to Defendant's Motion for Summary Judgment of Invalidity Under Section 102(B) Based on Sales and Public Use of the Inventors' "NEAT" Software System and Memorandum in Support Thereof, Aug. 26, 2005, including exhibits: • Exhibit A—Declaration of Thomas D. Selgas, Aug. 25, 2005; • Exhibit B—Excerpts from transcript of deposition of Thomas D. Selgas, Dec. 8, 2004; • Exhibit C—Non-Disclosure or Confidentiality Agreements between Netsafe, Inc. and Comm Group, GTE, MarketArts, Inc., The Paradigm Group, Inc., Jim Edward Leo, Channing Corn, Richard Phillips, GTE Intelligent Network Services, Inc., Smith Barney, Inc., E. David Johnson, and Nancy Goodstein, and The Fidelis Group, and GCT, Inc.; • Exhibit D—Internet Access Service Agreement between GTE Intelligent Network Services Incorporated and Netsafe, Inc., Dec. 5, 1995; • Exhibit E—Excerpts from transcript of deposition of Thomas D. Selgas, Sep. 16, 2004; • Exhibit F—Excerpts from transcript of deposition of Thomas D. Selgas, Mar. 1, 2005; • Exhibit G—Excerpts from transcript of deposition of Thomas D. Selgas, Dec. 10, 2004; Exhibit H—Netrepreneurial Network Training Course manual, Nov. 7, 2004; • Exhibit I—Excerpts from transcript of deposition of Holman Wooters, Jul. 28, 2005; • Exhibit J—Excerpts from transcript of deposition of Michael B Massing, Nov. 9, 2004; • Exhibit K—Excerpts from transcript of deposition of Thomas D. Selgas, Dec. 9, 2004; • Exhibit L—Excerpts from transcript of deposition of Thomas D. Selgas, May 5, 2005; Exhibit M—Netsafe NEAT Version 3.0 Beta Review; • Exhibit N—Excerpts from transcript of deposition of Thomas D. Selgas, Jun. 2, 2005; • Exhibit O—Netsafe Announces First Suite of Integrated Customizable Internet Tools and Services, Oct. 23, 1996, • Exhibit P—Information Disclosure Statement re: U.S. Appl. No. 09/100,619 (now U.S. Patent No. 6,571,290), Mar. 27, 2003, • Exhibit Q—Excerpts from transcript of deposition of John Everett Gmuender, Nov. 7, 2004; • Exhibit R—Excerpts from transcript of deposition of Channing Corn, Jun. 3, 2005; and • Exhibit S—Task listing.

MyMail's Response to Defendants' Motion for Summary Judgment of Invalidity Based on the On-Sale Bar, Aug. 26, 2005, including exhibits: • MyMail's Exhibit A—Excerpts from the Provisional Application That Preceded U.S. Patent No. 6,571,290; • MyMail's Exhibit B—Defendant Earthlink, Inc.'s Second Supplemental Responses to Plaintiff MyMail, Ltd.'s First Set of Interrogatories; • MyMail's Exhibit C—Excerpt from U.S. Patent No. 6,571,290 (Selgas); and • MyMail's Exhibit D—Hand-drawn figures from provisional application.

Defendants' Reply in Support of Their Motion for Summary Judgment of Invalidity Based on Sales and Public Use of the "NEAT" Software System, Sep. 6, 2005.

Defendants' Reply in Support of Their Motion for Summary Judgment of Invalidity Based on On-Sale Bar, Sep. 6, 2005, including exhibits: • Defendants' Exhibit A—Earthlink Claim Chart; and • Defendants' Exhibit C—Excerpt from transcript of Markman Hearing Before the Honorable Leonard Davis, Apr. 6, 2005.

UOL Defendants' Reply in Support of Motion for Summary Judgment of Patent Invalidity, Sep. 6, 2005, including: UOL Defendants' Errata Sheet re: UOL Defendants' Reply in Support of Motion for Summary Judgment of Patent Invalidity, Sep. 7, 2005.

Prodigy's Reply in Support of its Motion for Summary Judgment of Invalidity, Sep. 13, 2005, including exhibits: • Exhibit A—Declaration of Bruce Phillips in Support of Prodigy's Reply in Support of its Motion for Summary Judgment of Invalidity, Sep. 13, 2005; and • Exhibit 1 to Exhibit A—Press release re: Prodigy, Inc. Launches Prodigy Internet 1.1, Oct. 16, 1996.

Defendants' [Earthlink, Inc., NetZero, Inc. Juno Online Services, Inc., NetBrands, Inc., Prodigy Communications Corp., SouthwesternBell Internet Services, Inc. and SBC Internet, Inc.] Reply in Support of AOL's Motion for Summary Judgment of Invalidity Under Section 102(b) Based on AT&T WorldNet, Sep. 13, 2005.

MyMail's Sur-Reply to Defendants' Motion for Summary Judgment of Invalidity Based on the On-Sale Bar, Sep. 16, 2005, including exhibits: • MyMail's Exhibit A—Excerpts from U.S. Patent No. 6,571,290; and • MyMail's Exhibit B—Excerpt from transcript of Markman Hearing Before the Honorable Leonard Davis, Apr. 6, 2005.

Plaintiff MyMail's Sur-Reply to UOL Defendants' Motion for Summary Judgment of Patent Invalidity, Sep. 16, 2005.

Plaintiff MyMail's Sur-Reply to Defendants' Motion for Summary Judgment of Invalidity Under Section 102(B) Based on Sales and Public Use of the Inventors' "NEAT" Software System and Memorandum in Support Thereof, Sep. 21, 2005.

Plaintiff MyMail's Sur-Reply to AOL's Motion for Summary Judgment of Patent Invalidity, Sep. 23, 2005.

Engst, Adam C., et al., "Spry Internet in a Box," Internet Starter Kit for Windows, Hayden Books, 1995.

Groves, Dawn with John Overbaugh, *Mosaic in a Box/World Wide Web: 101—A step-by-step guide for getting connected to the Internet*, 1995.

Travel the Information Highway on Your PC, Byte.com, Apr. 1994.

Defendants' Joint Motion for Summary Judgement of Unenforceability Due to Inequitable Conduct, Aug. 2, 2005, including exhibits: • Exhibit A—Excerpt from U.S. Patent No. 6,571,290 (Selgas); • Exhibit B—File History of U.S. Appl. No. 09/100,619/ U.S. Patent No. 6,571,290; • Exhibit C—U.S. Appl. No. 60/050,186; • Exhibit D—Excerpts from WebTV Technical Spec., Aug. 19, 1997; • Exhibit E—Excerpts from WebTV Technical Spec.; • Exhibit F—Excerpts from transcript of deposition of Thomas D. Selgas, Dec. 9, 2004; • Exhibit G—Email from Tom Selgas to Bob Derby, Jun. 22, 1997; • Exhibit H—Letter from Thomas D. Selgas to Gregory W. Carr, Jul. 22, 1997; • Exhibit I—Excerpt from transcript of the deposition of Gregory W. Carr, Dec. 7, 2004; • Exhibit J—WebTV: Microsoft's Consumer Foothold; • Exhibit K—Email from Tom Selgas to Bob Derby, Aug. 23, 1997; • Exhibit L—Combined Declaration and Power of Attorney re U.S. Appl. No. 09/100,619/ U.S. Patent No. 6,571,290; • Exhibit M—Carr & Storm, LLP invoice to Netsafe, Inc., Aug. 7, 1998; • Exhibit N—Memo from Gregory W. Carr to Tom Selgas re: Valuation of Certain Netsafe, Inc. Intellectual Properties, Jul. 24, 1998; • Exhibit O—Memo from Gregory W. Carr to Tom Selgas re: Search for Patent of WebTV Technology, Oct. 7, 1998; • Exhibit P—Index re: WebTV patent search; • Exhibit Q—Confidential Business Plan; • Exhibit R—Excerpt from the transcript of the deposition of Carl A. Erickson, Jul. 27, 2005; • Exhibit S—Information Disclosure Statement re U.S. Appl. No. 09/100,619/ U.S. Patent No. 6,571,290, Sep. 9, 1999; • Exhibit T—Office Action U.S. Appl. No. 09/100,619/ U.S. Patent No. 6,571,290, Dec. 20, 2000;• Exhibit U—Preliminary Amendment re: U.S. Appl. No. 09/100,619/ U.S. Patent No. 6,571,290, Aug. 15, 2001; • Exhibit V—Office Action re: U.S. Appl. No. 09/100,619/ U.S. Patent No. 6,571,290, Jun. 5, 2002; • Exhibit W—Excerpt from Manual of Patent Examining Procudure, Latest Revision, Feb. 2000; • Exhibit X—Examiner Interview Summary re U.S. Appl. No. 09/100,619/ U.S. Patent No. 6,571,290, Sep. 17, 2002; • Exhibit Y—Draft Amendment re: U.S. Appl. No. 09/100,619/ U.S. Patent No. 6,571,290, and • Exhibit Z—Notice of Allowability re: U.S. Appl. No. 09/100,619/ U.S. Patent No. 6,571,290, Sep. 26, 2002. *Continued* exhibits from Defendants' Joint Motion for Summary Judgment of Unenforceability Due to Inequitable Conduct, Aug. 2, 2005: • Exhibit AA—Request for Continued Examination re: U.S. Appl. No. 09/100,619/ U.S. Patent No. 6,571,290, Jan. 2, 2003; • Exhibit BB—Information Disclosure Statement re: U.S. Appl. No. 09/100,619, U.S. Patent No. 6,571,290, Mar. 27, 2003; • Exhibit CC—Notice of Allowance and Fees Due re: U.S. Appl. No. 09/100,619/ U.S. Patent No. 6,571,290, Sep. 26, 2002; • Exhibit DD—Excerpt from Plaintiff MyMail, Ltd.'s Objections and Responses to Defendant's Second Set of Common Interrogatories (Nos. 13-14); • Exhibit EE—Excerpts from transcript of deposition of John Everett Gmuender, Nov. 7, 2004; • Exhibit FF—NetSafe Consumer Records; • Exhibit GG—Statement of Holman (Tex) H. Wooters, Feb. 2, 2005; • Exhibit HH—Netsafe PowerPoint presentation, 1997; • Exhibit II—PowerPoint presentation; • Exhibit JJ—Attorney Notes; and • Exhibit KK—Draft IDS for MyMail Application.

Plaintiff's Response to Defendant's Joint Motion for Summary Judgment of Unenforceability Due to Inequitable Conduct, Aug. 29, 2005 Plaintiff's Declaration of Scott L. Cole, with exhibits: • Exhibit A—U.S. Patent No. 5,862,339 (Bonnaure); • Exhibit B—Expert Report of Gregory Lavender, Ph.D.; • Exhibit C—Excerpts from the transcript of the deposition of Richard D. Grauer, Aug. 15, 2005; • Exhibit D—Excerpts from the transcript of the deposition of Gregory W. Carr, Dec. 7, 2004 ; • Exhibit E—Excerpts from the transcript of the deposition of Gregory W. Carr, Dec. 8, 2004; • Exhibit F—Excerpts from the transcript of the deposition of Thomas D. Selgas, Dec. 10, 2004; and • Exhibit G—Excerpt from Manual of Patent Examining Procedure § 2004 (8$^{th}$ Ed., 2002) entitled "Aids to Compliance with Duty of Disclosure".

Defendants' Reply in Support of Their Motion for Summary Judgment of Unenforceability Due to Inequitable Conduct, Sep. 9, 2005, including exhibits: • Exhibit A—Excerpt from transcript of the deposition of Gregory W. Carr, Aug. 31, 2004; • Exhibit B—Excerpt from transcript of the deposition of Richard Grauer, Aug. 15, 2005; • Exhibit C—Excerpt from transcript of the deposition of Gregory W. Carr, Dec. 7, 2004; • Exhibit D—Excerpt from transcript of the deposition of Gregory W. Carr, Dec. 7, 2004; • Exhibit E—Excerpt from transcript of the deposition of Gregory W. Carr, Jun. 1, 2005; • Exhibit F—Excerpt from transcript of the deposition of Gregory W. Carr, Dec. 8, 2004; • Exhibit G—xcerpt from transcript of the deposition of Richard Grauer, Aug. 15, 2005; • Exhibit H—Excerpt from transcript of the deposition of Thomas D. Selgas, Dec. 9, 2004 ; and • Exhibit I—Excerpt from transcript of the deposition of Thomas D. Selgas, Dec. 10, 2004.

Plaintiff's Sur-Reply to Defendants' Joint Motion for Summary Judgment of Unenforceability Due to Inequitable Conduct, Sep. 19, 2005.

1.3 I Defendants' Motion to Dismiss for Lack of Standing, Jul. 27, 2005 • Defendants' Exhibit A—Excerpt of transcript of deposition of Thomas D. Selgas, Dec. 8, 2004 • Defendants' Exhibit B—Excerpt of transcript of deposition of Robert T. Derby, Jun. 16, 2005 • Defendants' Exhibit C—Purchase Agreement/Letter of Intent between Netsentinel and Netsafe Inc., • Defendants' Exhibit D—Patent Assignment Records re: U.S. Patent No. 6,571,290 • Defendants' Exhibit E—Record of Assignment re: U.S. Patent No. 6,571,290 • Defendants' Exhibit F—Promissory Note between Robert T. Derby and Netsafe, Inc. • Defendants' Exhibit G—Original Petition from *Robert T. Derby v. Netsafe, Inc.*, • Defendants' Exhibit H—Judgment from *Robert T. Derby v. Netsafe, Inc.*, • Defendants' Exhibit I—Original Petition from *Robert T. Derby v. Netsafe, Inc.*, and Promissory Note between Robert T. Derby and Netsafe, Inc., • Defendants' Exhibit J—Title Page from U.S. Patent No. 6,571,290, and handwritten notes.

MyMail, Ltd.'s Response to Defendants' Motion to Dismiss for Lack of Standing, Aug. 12, 2005, including exhibits: • MyMail's Exhibit 1—Declaration of Thomas Selgas, Aug. 10, 2005, with: Exhibit A to MyMail's Exhibit 1—Cyrix Corporation Employee Stock Purchase Plan; Exhibit B to MyMail's Exhibit 1—Cyrix Corporation Incentive Stock Option Agreement; and Exhibit C to MyMail's Exhibit 1—Assignment, Jun. 19, 1997. • MyMail's Exhibit 2—Declaration of Andrew Viger, Aug. 10, 2005, with: Exhibit A to MyMail's Exhibit 2—Cyrix Corporation Employee Stock Purchase Plan; and Exhibit B to MyMail's Exhibit 2—Cyrix Corporation Incentive Stock Option Agreement. • MyMail's Exhibit 3—Promissory Note; • MyMail's Exhibit 4—Texas Certificate of Involuntary Dissolution; • MyMail's Exhibit 5—Judgment from *Robert T. Derby v. Netsafe, Inc.*; • MyMail's Exhibit 6—Declaration of James Keifer, with: Exhibit A to MyMail's Exhibit 6—Assignment of Invention; and Exhibit B to MyMail's Exhibit 6—Articles of Conversion. • MyMail's Exhibit 7—Excerpts from transcript of deposition of Thomas D. Selgas, Jan. 25, 2005 (w/ attached Deposition Exhibit 5—U.S. Patent No. 6,571,290); • MyMail's Exhibit 8—Excerpts from transcript of deposition of Michael B. Massing, Nov. 9, 2004; • MyMail's Exhibit 9—Declaration of Lucien Ostenkowski, with: Exhibit A to MyMail's Exhibit 9—Cyrix Corporation Employee Stock Purchase Plan; and Exhibit B to MyMail's Exhibit I—Cyrix Corporation Incentive Stock Option Agreement.

Southwestern Bell Internet Services, Inc.'s and Prodigy Communications Corporation's Reply Brief in Support of Defendants' Motion to Dismiss for Lack of Standing, Aug. 22, 2005, including exhibits: • Exhibit A—Excerpt from transcript of the deposition of Holman Wooters, Jul. 28, 2005; • Exhibit B—Netsafe balance sheet, Jun. 1998; • Exhibit C—Excerpt from transcript of the deposition of Robert Derby, Jun. 16, 2005; and • Exhibit D—Excerpt from transcript of the deposition of Andrew Viger, Aug. 15, 2005.

MyMail, Ltd.'s Sur-Reply to Defendants' Reply Brief in Support of Defendants' Motion to Dismiss for Lack of Standing, Aug. 30, 2005, including exhibit: • MyMail's Exhibit A—Excerpt from transcript of the deposition of Andrew Viger, Aug. 15, 2005.

Supplement in Support of Defendants' Motion to Dismiss for Lack of Standing, Sep. 29, 2005, including exhibits: • Defendants' Exhibit A—Docket sheet re: *Robert T. Derby v. Netsafe, Inc.*, Jan. 24, 2000; • Defendants' Exhibit B—Texas Secretary of State documents; • Defendants' Exhibit C—Original Petition from *Robert T Derby v. Netsafe, Inc.*; • Defendants' Exhibit D—Certificate of Unclaimed Service, Sep. 26, 2005; • Defendants' Exhibit E—Transmittal letter re: Certificate of Unclaimed Service, Apr. 6, 2000; and • Defendants Exhibit F—Judgment from *Robert T. Derby v. Netsafe, Inc.*, Apr. 12, 2000.

MyMail's Motion to Strike Defendants' Emergency Supplement in Support of Defendants' Motion to Dismiss for Lack of Standing, Sep. 30, 2005.

Earthlink's Notice of Reliance on Supplemental Authority Regarding Defendants' Motion for Summary Judgment of Invalidity Based on the On-Sale Bar, Sep. 27, 2005, including: Earthlink's Exhibit A—Case cite re: *Pandrol USA, LP, et al. v. AirBoss Railway Products, Inc., et al.*, 2005 U.S. App. LEXIS 20054, Sep. 19, 2005.

Transcript of Pretrial Conference and Summary Judgment Hearing Before the Honorable Leonard David, Oct. 3, 2005.

Memorandum Opinion and Order re: Earthlink's Motion for Summary Judgment of Non-Infringement, UOL's Motion for Summary Judgment of Non-Infringement, Southwestern Bell Internet Services and Prodigy's Motion for Summary Judgment of Non-Infringement, and MyMail's Motion for Leave to Supplement the Summary Judgment Record, Oct. 28, 2005.

Non-Confidential Brief for Plaintiff/Appellant MyMail, Ltd., Mar. 7, 2006.

Non-Confidential Brief for Defendants/Appellees/Cross-Appellants NetZero, Inc., Juno Online Services, Inc. and Netbrands, Inc., May 17, 2006.

Non-Confidential Brief of Defendant/Counterclaimaint/Cross-Apellant Earthlink, Inc. and Defendants/Appellees Prodigy Communications Corporation, SBC Internet Services, Inc. and Southwestern Bell Internet Services, Inc., May 17, 2006.

Non-Confidential Reply Brief of Plaintiff/Appellant MyMail, Ltd., Jul. 13, 2006.

Corrected Non-Confidential Reply Brief of Defendant/Cross Appellant Earthlink, Inc. and Defendants/Cross Appellants NetZero, Inc., Juno Online Services, Inc. and NetBrands, Inc. Aug. 24, 2006.

Court Opinion, Feb. 20, 2007.

Deposition of Thomas Blahuta, Jul. 22, 2005.

Deposition of Gregory W. Carr, Dec. 7, 2004, with deposition exhibits: • Exhibit 30—Subpoena; • Exhibit 31—37 CFR 1.56; • Exhibit 32—Email from Bob Derby; • Exhibit 33—Mr. Carr's Objections and Responses to America Online's subpoena; • Exhibit 34—Nondisclosure or Confidentiality Agreements between NetSafe, Inc.; • Exhibit 35—Memorandum from Mr. Carr to Mr. Selgas; • Exhibit 36—Document titled NetSafe, Inc. with listing of 10 items; • Exhibit 37—Provisional patent application file; • Exhibit 38—MyMail file history leading to patent; • Exhibit 39—Information Disclosure Statement; and • Exhibit 40—Bonnaure patent 5,862,339.

Deposition of Gregory W. Carr, Dec. 8, 2004, with deposition exhibits: • Exhibit 41—U.S. Patent issued to Mighdoll; • Exhibit 42—Office Action; • Exhibit 43—Draft IDS for MyMail Applications; • Exhibit 44—Nondisclosure or Confidentiality Agreement with handwritten notes; and • Exhibit 45—Document titled Netscape or.

Deposition of Gregory W. Carr, Jun. 1, 2005, with deposition exhibits: • Exhibit 46—Subpoena; • Exhibit 47—Email to O'Neil from Carr, Sep. 21, 1998; • Exhibit 49—Newspaper article; • Exhibit 50—WebTV Company Background; • Exhibit 51—Letter to Carr from Selgas, Jul. 22, 1997; • Exhibit 52—Email to O'Neil from Carr, Jul. 21, 1998; • Exhibit 53—Letter to Selgas from Carr, Oct. 7, 1998; • Exhibit 54—NetSafe Confidential Business Plan; • Exhibit 55—Fax to Selgas from Carr, Jul. 24, 1998; • Exhibit 56—Carr & Storm Invoice 1026; • Exhibit 57—Email to Erickson from Carr, Mar. 24, 1999; • Exhibit 58—Handwritten stickie note; • Exhibit 59—Carr's Handwritten notes; • Exhibit 60—Carr & Storm Invoices 154, 436, 437, 438, 475, 439, 788, 834, 2062; • Exhibit 61—Email to Wall from Carr, Sep. 25, 1998; • Exhibit 62—Email to Gibson from Carr, May 4, 1999; and • Exhibit 63—Email to Maynard from Carr, Sep. 11, 1998.

Deposition of Gregory W. Carr, Aug. 31, 2005, with deposition exhibit: • Exhibit 1—Amended Deposition Notice.

Deposition of Greg Collins, Oct. 13, 2004.

Deposition of Greg Collins, Jun. 27, 2005, with deposition exhibits: • Exhibit 1—Notice of Deposition, Sep. 20, 2004; and • Exhibit 2—Presentation to Earthlink re: U.S. Patent No. 6,571,290 B2.

Deposition of Channing Corn, Jun. 3, 2005, with deposition exhibits: • Exhibit 1—Subpoena; • Exhibit 2—Confidentiality and Nondisclosure Agreement; • Exhibit 3—Page of Code; • Exhibit 4—Service Ticket; • Exhibit 5—Customer and User List; • Exhibit 6—Internal Use Definitions; • Exhibit 7—PowerPoint Presentation; • Exhibit 8—Gmuender Task List; • Exhibit 9—Software Module—Test Application; • Exhibit 10—Massing Associative Array Source Code; • Exhibit 11—Massing Dialer Test Application; • Exhibit 12—Corn38-40; • Exhibit 13—Database Dump; • Exhibit 14—Gmuender GTE Account Source Code; • Exhibit 15—Netrepreneur Registration Form; • Exhibit 16—'290 Patent; • Exhibit 17—Witness Handwritten Note; • Exhibit 18—Gmuender Task List; • Exhibit 19—Witness Toolbar Application Code, Feb. 28, 1996; • Exhibit 20—Witness Toolbar Application Code, Mar. 2, 1996; • Exhibit 21—Witness Toolbar Application Code, Mar. 4, 1996; • Exhibit 22—Witness Toolbar Application Code, Mar. 5, 1996; • Exhibit 23—Witness Toolbar Application Code, Mar. 6, 1996; • Exhibit 24—Text File of WSFTP Program; • Exhibit 25—Witness FTP Code File; • Exhibit 26—Delphi 2.0 Web Apps Printout; • Exhibit 27—ar. 1999 E-mail string; • Exhibit 28—"Message of the Day" software; and • Exhibit 29—Packet of Customer Service Tickets.

30(b)(6) Deposition of Sky Dayton (Earthlink), Aug. 24, 2005, with deposition exhibit: • Exhibit 1—Notice of Deposition, Aug. 5, 2005.

Deposition of Robert T. Derby, Jun. 15, 2005, with deposition exhibits: • Exhibit 1—Subpoena; • Exhibit 2—Promissory Note not signed by Selgas; • Exhibit 3—MyMail, Ltd.'s Objections and Responses to Southwestern Bell Internet Services, Inc.'s Interrogatories (Nos. 1-4); • Exhibit 4—Verification; • Exhibit 5—Plaintiff MyMail Ltd.'s Objections and Responses to Defendants' First Set of Common Interrogatories (Nos. 1-12); and • Exhibit 6—Plaintiff MyMail Ltd.'s Amended Objections and Responses to Defendants' First Set of Common Interrogatories (Nos. 1-12).

Deposition of Robert T. Derby, Jun. 16, 2005, with deposition exhibits: • Exhibit 1—Limited Partnership Agreement of MyMail, Ltd.; • Exhibit 2—Jul. 15, 1996 letter regarding employment confirmation; • Exhibit 3—Handwritten document, not identified by witness; • Exhibit 4—Compilation of documents beginning with Judgment, re: *Derby v. NetSafe*; • Exhibit 5—Oct. 22, 1996 memo from Derby to Tex Wooters; • Exhibit 6—Jun. 22, 1997 e-mail string between Derby and Selgas; • Exhibit 7—Original Petition, re: *Derby v. NetSafe*; • Exhibit 8—NetSafe, Inc. Presentation; • Exhibit 9—Dec. 3, 1996 e-mail from Tex Wooters to John Gmuender, Joe Gallagher, Tom Selgas, Subject: Spouse involvement; • Exhibit 10—Handwritten documents, not identified by witness; • Exhibit 11—Spreadsheet of the ownership as of Dec. 31, 2004 for MyMail, Ltd.; • Exhibit 12—MyMail, Ltd. Loan Request, Jul. 16, 2004; • Exhibit 13—Aug. 22, 1997 e-mail from Bob Derby to Tom Selgas; and • Exhibit 14—Aug. 23, 1997 e-mail from Bob Derby to Tom Selgas.

Deposition of Bradley Ellis, Jun. 1, 2005, with deposition exhibits: • Exhibit 1—Non-disclosure of Confidentiality Agreements; • Exhibit 2—Non-disclosure of Confidentiality Agreements with handwritten notes; • Exhibit 3—USPTO Patent Full-Text and Image Database; • Exhibit 4—USTPO Patent search with Refined Search for AN/WebTV; • Exhibit 5—USPTO Patent search with Refined Search for AN/WebTV and IN/"mighdoll"; • Exhibit 6—USPTO Patent search, search 1999-2003; and • Exhibit 7—Mighdoll patents.

Deposition of Carl Erickson, Jul. 27, 2005, with deposition exhibits: • Exhibit 1—Subpoena to Tony Erickson; • Exhibit 2—Memo to Tom Selgas from G. Carr, Jul. 24, 1998; • Exhibit 3—Confidential Business Plan, 1999-2001; • Exhibit 4—NetSafe, Inc. Business Plan Synopsis; • Exhibit 5—E-mail to various persons from Tony Erickson, Mar. 24, 1999; • Exhibit 6—Letter to Tony Erickson from Sparrow Marcioni, Apr. 3, 1999; • Exhibit 7—Memo to NetSafe, Inc. Employees from Tony Erickson, Mar. 4, 1999; • Exhibit 8—Series of E-mails; • Exhibit 9—E-mail to toms@netsafe.net from William Wall, Apr. 6, 1999; • Exhibit 10—NetSafe Expense Summary; • Exhibit 11—E-mail to Tony Erickson from toms@netsafe.net, Mar. 5, 99; and • Exhibit 12—Memo to Tony Erickson from Lewis Parson, Mar. 8, 1999.

Deposition of Tim Gelinas, Aug. 9, 2005, with deposition exhibits: • Exhibit 1—Installation and Configuration Guide dated Jan. 1995; • Exhibit 2—Getting Started dated Aug. 1994; 118 pages; • Exhibit 3—Remote Account Maintenance Protocol DOF (RAMP); undated; • Exhibit 4—"Windows to the Internet" BYTE.com dated Jul. 1995; • Exhibit 5—ACW Connections by Fred Kemp undated; 5 pages; • Exhibit 6—"Travel the Information Highway on Your PC", BYTE.com dated Apr. 1994; • Exhibit 7—oreilly.com Online Catalog undated; • Exhibit 8—SprintLink Customer Handbook 2.1 dates Oct. 11, 1995; Exhibit 9—LANtastic 7.0: Netscape Navigator 2.01 and Sprynet Module NOS7006 dated Mar 28, 1996 • Exhibit 10—Claim Construction Document dated Jun. 3, 2005; • Exhibit 11—U.S. Patent No. 6,571,290 B2 dated May 27, 2003; and • Exhibit 12—Mosaic in a Box Product Information; undated.

Deposition of Richard C. Gibson, Jul. 26, 2005, with deposition exhibits: • Exhibit 1—Notice of Deposition of Richard Gibson; • Exhibit 2—Letter to R. Douglas from Richard Gibson, Jul. 29, 1999; • Exhibit 3—E-mail from Tony Erickson, re: Tom Selgas rights to prior art held at Cyrix; • Exhibit 4—Minutes of special meeting of the shareholders of NetSafe, Inc., Mar. 27, 1999; • Exhibit 5—Letter to Tony Erickson from Sparrow Marcioni, Apr. 2, 1999; • Exhibit 6—Memorandum to Tom Selgas from Gregory Carr, Jul. 24, 1998; • Exhibit 7—Notice of NetSafe, Inc. shareholders meeting; • Exhibit 8—Memo to NetSafe, Inc. employees; • Exhibit 9—E-mail from Gibsondick@aol.com, Jun. 29, 1999; • Exhibit 10—NetSafe expense summary, Mar. 21, 1999; • Exhibit 11—Judgment, *Derby v. NetSafe*; and • Exhibit 12—Confidential Business Plan, 1999-2001.

Deposition of John Everett Gmuender, Nov. 7, 2004, with deposition exhibits: • Exhibit 1—Subpoena; • Exhibit 2—NetSafe, Inc. Press Background Information; • Exhibit 3—E-mail string, May 3, 2004; • Exhibit 4—NetSafe, Inc. Presentation; • Exhibit 5—U.S. Patent No. 6,571,290; • Exhibit 6—File History of U.S. Patent No. 6,571,290; • Exhibit 7—Notes on NetSafe Navigation Center and attached e-mails; • Exhibit 8—NetSafe Agreement, Aug. 4, 1997; • Exhibit 9—Memorandum of Understanding, Aug. 29, 1997; • Exhibit 10—Fax memo to Tex Wooters, Oct. 22, 1996; • Exhibit 11—E-mail, Dec. 3, 1996, with attachments; • Exhibit 12—Listing of accounts; • Exhibit 13—GTE Invoices, 1996; • Exhibit 14—Listings of usage; • Exhibit 15—Assignment of Invention; • Exhibit 16—Netrepreneur Training Course printout, Mar. 21, 1996; • Exhibit 17—Netrepreneurial Network, Netrepreneur Training Course; and • Exhibit 18—NetSafe Neat Version 3.0 Beta Review.

Deposition of Richard D. Grauer, Aug. 15, 2005.

Deposition of James P. Keifer, Sep. 8, 2005, with deposition exhibits: • Exhibit 1—Amended Notice of Deposition to Plaintiff MyMail, Ltd. of Defendants NetZero, Inc., Juno Online Services, Inc., and NetBrands, Inc.; and • Exhibit 2—Handwritten notes.

(Deposition of Abhijit Khale (NetBrands, NetZero, Juno), Jul. 11, 2005).

Deposition of Bruce Lutz, Jun. 2, 2005, with deposition exhibits: • Exhibit 1—Notice of Service of Subpoena Duces Tecum and Testification by Defendant GTE.NET LLC; and • Exhibit 2—Carr & Storm Invoice Nos. 154, 436m 437, 438, 439, 788, 834 and 2062.

Deposition of Michael B. Massing, Nov. 9, 2004, with deposition exhibits: • Exhibit 19—Subpoena; • Exhibit 20—Document info; and • Exhibit 21—E-mail string, Mar. 14, 1996.

Deposition of Robert D. McCutcheon, Jun. 2, 2005, with deposition exhibits: • Exhibit 1—Notice of Service of Subpoena Duces Tecum and Testificandum by Defendant GTE.NET LLC; and • Exhibit 2—Provisional patent application filing.

Deposition of Lucien Ostenkowski, Sep. 15, 2004, with deposition exhibits: • Exhibit 1—Notice of Deposition; • Exhibit 2—U.S. Patent No. 6,571,290; • Exhibit 3—MyMail's Preliminary Infringement Contentions; • Exhibit 4—Slide Presentation to AOL; • Exhibit 5—Serial Monitor Screenshots; and • Exhibit 6—Drawing.

Deposition of Lucien Ostenkowski, Sep. 16, 2004.

Deposition of Lucien Ostenkowski, Aug. 3, 2005, with deposition exhibit: • Exhibit 1—Presentation to SBC Yahoo!

Deposition Mohammad Sanadidi, Oct. 5, 2005, with deposition exhibits: • Exhibit 1—U.S. Patent No. 6,571,290; • Exhibit 2—Court's Claim Construction; • Exhibit 3—Expert Report, Jun. 22, 2005; • Exhibit 4—Rebuttal Expert Report, Jul. 29, 2005; • Exhibit 5—Screen shots produced by MyMail; • Exhibit 6—Attachment to Expert Report re Juno 1.0 Use Cases; and • Exhibit 7—Claim chart pertaining to Juno 1.0.

30(b)(6) Deposition of Alex Sarafian (United Online Companies), Jul. 12, 2005, with deposition exhibit: • Exhibit 1—Plaintiff's Amended Notice of Deposition, Jun. 10, 2005.

Deposition of Michelle Selgas, Jun. 23, 2005, with deposition exhibits: • Exhibit 1—MyMail, Ltd. Capital Ownership, May 3, 2005; and • Exhibit 2—U.S. Patent No. 6,571,290.

Deposition of Thomas Selgas, Sep. 16, 2004, with deposition exhibits: • Exhibit 7—Notice of Deposition; • Exhibit 8—Slide Presentation to Earthlink; • Exhibit 9—MyMail's Preliminary Infringement Contentions; and • Exhibit 10—Drawing.

Deposition of Thomas Selgas, Oct. 27, 2004, with deposition exhibits: • Exhibit 11—Def. AT7T Corp.'s Amended First Notice of Deposition of Plaintiff MyMail, Ltd.; • Exhibit 12—'290 Patent Presentation to AT&T; • Exhibit 13—Handwritten Diagram by Mr. Selgas; • Exhibit 14—'290 Patent Presentation to AT&T; • Exhibit 15—Sam Spade related document; • Exhibit 16—Screen shot regarding MyMail testing; • Exhibit 17—Sam Spade related document; • Exhibit 18—Ethereal document; • Exhibit 19—Ethereal document; • Exhibit 20—Document pertaining to //cookies.js; and • Exhibit 21—Document regarding MyMail testing.

Deposition of Thomas Selgas, Nov. 3, 2004, with deposition exhibits: • Exhibit 3A—Preliminary Infringement Claim Chart for the '290 patent; • Exhibit 22—America Online's first amended notice of deposition to MyMail; • Exhibit 23—Hand-drawn sketch; • Exhibit 24; • Exhibit 25; Exhibit 26; Exhibit 27; and Exhibit 28.

Deposition of Thomas Selgas, Dec. 8, 2004, with deposition exhibits: • Exhibit 46—Notebook; and • Exhibit 47—Notebook.

Deposition of Thomas Selgas, Dec. 9, 2004, with deposition exhibits: • Exhibit 48; • Exhibit 49; • Exhibit 50; • Exhibit 51; • Exhibit 52; • Exhibit 53; • Exhibit 54; • Exhibit 55; • Exhibit 56; • Exhibit 57; and • Exhibit 58 .

Deposition of Thomas Selgas, Dec. 10, 2004, with deposition exhibits: • Exhibit 59—E-mail string; • Exhibit 60—Business plan; • Exhibit 61; and • Exhibit 62.

Deposition of Thomas Selgas, Jan. 25, 2005, with deposition exhibits: • Exhibit 1—Defendant GTE.NET LLC's First Notice of Deposition to Plaintiff MyMail, Ltd.; • Exhibit 2—MyMail's Preliminary Infringement Contentions for GTE.NET LLC; • Exhibit 3—Preliminary Infringement Claim Chart for U.S. Patent No. 6,571,290 B2, GTE.NET LLC; • Exhibit 4—Dec. 15, 2004 MyMail presentation to GTE.NET; and • Exhibit 5—U.S. Patent No. 6,571,290.

Deposition of Thomas Selgas, Mar. 1, 2005, with deposition exhibits: • Exhibit 6—Defendant GTE.NET LLC's Notice of Deposition to Plaintiff MyMail, Ltd. Regarding Source Code; • Exhibit 7—CD directories and files list; • Exhibit 8—CD directories and files list; • Exhibit 9—ASCII representation of NetSafe database; • Exhibit 10—ASCII representation of database and index files; • Exhibit 11—Version 3.0 database index files; • Exhibit 12—2.0 Beta Release Candidate 10; • Exhibit 13—ASCII representation of NSDB and NSDBX; • Exhibit 14—Wise installation script in ASCII form; • Exhibit 15—Wise installation script in ASCII form; • Exhibit 16—Version 3.0 Beta Review; NetSafe 3.0 (RC20) Beta Test; • Exhibit 17—Web page prototype; • Exhibit 18—Proposed help file and walk-through for alpha testers; • Exhibit 19—Netrepreneur Training Course; • Exhibit 20—Wise manifest, script summary; • Exhibit 21—Wise manifest document; • Exhibit 22—Wise manifest document, NEAT Phone Update; • Exhibit 23—Registration Wizard version 1.5 source code; • Exhibit 24—Combination of Wise manifest with complete Wise dump; • Exhibit 25—Wise Installation System Script; • Exhibit 26—Wise Installation System Script version 4.23; • Exhibit 27—Wise Installation System Script for NetSafe registration and configuration; • Exhibit 28—Snippet of code belonging to the Navigation Center; • Exhibit 29—Wise script for stamping tool; • Exhibit 30—Program Hwiz code; • Exhibit 31—Program credstf document; • Exhibit 32—Pascal unit PCODUtil; • Exhibit 33—Pascal unit PingUtl; • Exhibit 34—Pascal unit RegUtil; • Exhibit 35—Pascal unit Srvtype; • Exhibit 36—Pascal code NetSafe Dialer; • Exhibit 37—Pascal code unit Dialerl6; • Exhibit 38—Pascal code unit Dialer32; • Exhibit 39—Pascal code unit Dutil; • Exhibit 40—Perl code ISP Processing Module; • Exhibit 41—PERL code Transaction Processing Module; • Exhibit 42—PERL code Open Test DB; • Exhibit 43—Print-out not identified; and • Exhibit 44—Print-out not identified.

Deposition of Thomas Selgas, May 5, 2005, with deposition exhibits: • Exhibit 200—Selgas Amended Deposition Notice; • Exhibit 201—MyMail Objections to UOL Amended Deposition Notice; • Exhibit 202—Presentation to Juno; • Exhibit 203—Presentation to Juno; • Exhibit 204—Presentation to NetZero; • Exhibit 205—Presentation to BlueLight; • Exhibit 206; • Exhibit 207; • Exhibit 208; Exhibit 209; • Exhibit 210; • Exhibit 211; • Exhibit 212; • Exhibit 213; • Exhibit 214—Exhibit 5 U.S. Patent No. 6,571,290; • Exhibit 215—Preliminary Infringement Claim Chart for U.S. Patent No. 6,571,290 B2 NetZero, Inc.; • Exhibit 216—Preliminary Infringement Claim Chart for U.S. Patent No. 6,571,290 B2 Juno Online Services, Inc.; • Exhibit 217—Preliminary Infringement Claim Chart for U.S. Patent No. 6,571,290 B2 NetZero, Inc. NetBrands, Inc.; and • Exhibit 218—MyMail's Preliminary Infringement Contentions.

Deposition of Thomas Selgas, May 13, 2005.

Deposition of Thomas Selgas, Jun. 2, 2005, with deposition exhibits: • Exhibit 64—Notice of Service of Subpoena; • Exhibit 65—E-mail to Derby from Selgas, Jun. 22, 1997; • Exhibit 66—E-mail to Selgas from Derby, Aug. 22, 1997; • Exhibit 67—Email to Selgas from Derby, Aug. 23, 1997; and • Exhibit 68—Email to O'Neil from Carr, Sep. 21, 1998.

Deposition of Thomas Selgas, Sep. 16, 2005, with deposition exhibits: • Exhibit 1—Subpoena; • Exhibit 2—NetSafe, Inc. Net Cash Projection; • Exhibit 3—E-mail from Wooters to Gmuender, Gallagher and Selgas; • Exhibit 4—Unsigned promissory note; • Exhibit 5—Promissory note signed by Selgas; • Exhibit 6—Memo to NetSafe, Inc. Employees from Erickson, Mar. 4, 1999; • Exhibit 7—Timeline; • Exhibit 8—Memorandum Opinion; and • Exhibit 9—Selgas presentation to Earthlink.

Deposition of Jeffrey O. Smith, Aug. 18, 2005.

Deposition of Jeffrey O. Smith, Mar. 30, 2005, with deposition exhibits: • Exhibit 1—Subpoena for Appearance at Deposition; • Exhibit 2—Declaration of Jeff Smith; • Exhibit 3—U.S. Patent No. 6,571,290; and • Exhibit 4—VIN Drawing by Mr. Smith.

Deposition of Jeffrey O. Smith, Aug. 22, 2005, with deposition exhibits: • Exhibit 11—U.S. Patent No. 6,571,290; • Exhibit 230—Subpoena; • Exhibit 237—Court's Claim Construction Opinion; and • Exhibit 239—SPI Record Display.

Deposition of Andrew Viger, Aug. 15, 2005, with deposition exhibit: • Exhibit 1—Aug. 10, 2005 Declaration of Andrew Viger.

Deposition of Homan Wooters, Jul. 28, 2005, with deposition exhibits: Exhibit 1—Notice of Subpoena; • Exhibit 2—Statement of Holman Wooters; • Exhibit 3—E-mail re: Spouse involvement; • Exhibit 4—Public announcement; • Exhibit 5—Nondisclosure Agreement for Jim Leo; • Exhibit 6—Nondisclosure Agreement for David Johnson; and • Exhibit 8—Promissory Note.

*Non-confidential excerpt* of confidential deposition of Justin Newton, Nov. 10, 2004, with deposition exhibit 2.

*Non-confidential excerpt* of confidential deposition of Cyrus Pejoumand, May 26, 2005, with deposition exhibit 5.

*Non-confidential excerpt* of confidential deposition of Michael Sharp, Aug. 11, 2005, with deposition exhibit.

(Deposition of Frank Ambrose, Jun. 9, 2005, with deposition exhibits 1-30.).

(Deposition of James Anderson, Jul. 8, 2005, with deposition exhibits 1-8.).

(Deposition of Larry Baird, Jul. 14, 2005, with deposition exhibits 14-16.).

(Deposition of Lash Bellavia, Jun. 3, 2005, with deposition exhibit 1.).

(Deposition of Paul Bereyso, Oct. 11, 2005, with deposition exhibits 1-37.).

(Deposition of Paul Bereyso, Jun. 29, 2005, with deposition exhibits 1-74.).

(Deposition of Adam Bernstein, Aug. 18, 2005, with deposition exhibits 1-4.).

(Deposition of Joseph Bobek, Jun. 14, 2005.).

(Deposition of Walter Bratic, Sep. 7, 2005, with deposition exhibits 1-11.).

(Deposition of Johan Broekhuysen, Jun. 14, 2005, with deposition exhibits 1-10.).

(Deposition of Cliff Bryant, Aug. 9, 2005.).

(Deposition of Anthony Chiles, Jul. 17, 2005, with deposition exhibits 1-4.).

(Deposition of Greg Collins [EarthLink 30(b)(6) witness], Oct. 13, 2004, with deposition exhibits 1-2.).

(Deposition of Jeff Damick, Jul. 27, 2005, with deposition exhibits 1-3.).

(Deposition of Michael Dickerson, May 20, 2005, with deposition exhibits 1-8.).

(Deposition of Tom Donegan, Jun. 15, 2005, with deposition exhibits 1-8.).

(Deposition of Scott Dorfman, Jul. 27, 2005, with deposition exhibits 1.).

(Deposition of Sam Dworetsky, Aug. 15, 2005, with deposition exhibits 1-8.).
(Deposition of Neil Edwards, Jul. 15, 2005, with deposition exhibits 23-37.).
(Deposition of David Ely, Jun. 21, 2005.).
(Deposition of Josh Empson, Jul. 14, 2005, with deposition exhibits 17-22.).
(Deposition of Carl Erickson, Jul. 27, 2005, with deposition exhibits 1-8.).
(Deposition of Donald Erickson, Aug. 16, 2005, with deposition exhibits 12-17.).
(Deposition of Donald Erickson, Aug. 25, 2005, with deposition exhibits 56-62.).
(Deposition of Donald Erickson, Donald, Aug. 26, 2005, with deposition exhibits 1-3.).
(Deposition of Jamie Fisher, Sep. 1, 2005, with deposition exhibits 1-10.).
(Deposition of Michael Flanagan, Aug. 9, 2005.).
(Deposition of Andrew Fryefield, Jul. 29, 2005 with deposition exhibits 1-8.).
(Deposition of David Glenn, Jun. 17, 2005, with deposition exhibits 1-12.).
(Deposition of Veronica Glennon [Verizon Corp. 30(b)(6) witness], Jul. 26, 2004, with deposition exhibits 1-17.) (Deposition of Dennis Gordon, Jul. 13, 2005, with deposition exhibits 1-9.).
(Deposition of Dennis Gordon, Jul. 13, 2005, with deposition exhibits 1-9).
(Deposition of David Haug, Aug. 4, 2005, with deposition exhibits 1-40.).
(Deposition of Eric Heien, Mar. 25, 2005, with deposition exhibits 1-7.).
(Deposition of Eric Heien, Aug. 5, 2005, with deposition exhibits 1-15.).
(Deposition of Tim Hirsch, Aug. 11, 2005, with deposition exhibits 1-5.).
(Deposition of Darvin Hooey, Sep. 21, 2004, with deposition exhibits 1-2.).
(Deposition of Geoffrey Howard, Jun. 20, 2005, with deposition exhibits 1-10.).
(Deposition of Ericka Jolly, Ericka, Jun. 27, 2005.).
(Deposition of Henry Kim, Jul. 13, 2005, with deposition exhibits 10-13.).
(Deposition of Matt Korn, Matt, Jun. 28, 2005, with deposition exhibits 1.).
(Deposition of Gregory Lavender, Aug. 12, 2005, with deposition exhibits 1-6.).
(Deposition of Gregory Lavender, Mar. 31, 2005, with deposition exhibits 1-14.).
(Deposition of Gregory Lavender, May 27, 2005, with deposition exhibits 1-8.).
(Deposition of Russell Mangum, Aug. 11, 2005, with deposition exhibits 1-8.).
(Deposition of Patrick Meenan, Jul. 21, 2005, with deposition exhibits 1-4.).
(Deposition of Brian Napper, Jul. 20, 2005 with deposition exhibits 1-4).
(Deposition of Brian Napper, Sep. 18, 2005, with deposition exhibits 5-16.
(Deposition of Brian Napper, Sep. 21, 2005, with deposition exhibits 1-4.).
(Deposition of Thodinh Nguyen, Oct. 6, 2005.).
(Deposition of Phillip Orin, Phillip , Oct. 6, 2005.).
(Deposition of John Owens, Jul. 21, 2005, with deposition exhibits 1-5.).
(Deposition of Cyrus Pejoumand, May 26, 2005, with deposition exhibits 1-5.).
(Deposition of Edgar Ramos, Oct. 13, 2005, with deposition exhibits 1-9.).
(Deposition of Wendy Rosenberg, Jul. 13, 2005, with deposition exhibits 1-3.).
(Deposition of Rey Santelises, Aug. 11, 2005, with deposition exhibits 1-3.).
(Deposition of Joseph F. Schober [AOL 30(b)(6) witness], Nov. 4, 2004, with deposition exhibits 1-3.).
(Deposition of Joseph F. Schober, May 11, 2005.)
(Deposition of Denis Slattery, May 26, 2005, with deposition exhibits 1-5.).
(Deposition of Charlie Smiley, Aug. 9, 2005.).
(Deposition of Jeff Smith, Aug. 19, 2005, with deposition exhibits 1-8.).
(Deposition of Richard Thornberg, May 11, 2005, with deposition exhibits 4-13.).
(Deposition of Alexander Trevor, Aug. 4, 2005, with deposition exhibits 1-5.).
(Deposition of Joseph Unger, Feb. 25, 2005, with deposition exhibits 1-16.).
(Deposition of Saeid Vafaeisefat, Jun. 21, 2005, with deposition exhibits 1-2.).
(Deposition of Scott Varner, Oct. 6, 2005, with deposition exhibits 1-2.).
(Deposition of John Vollbrecht, Aug. 12, 2005 with deposition exhibits 1-23.).
(Deposition of Terrell Warren, Oct. 6, 2005, with deposition exhibits 1-2.).
(Deposition of Ellen Zegura, Sep. 21, 2005, with deposition exhibits 1-8.).
(Deposition of Robert Zinnel, May 19, 2005, with deposition exhibits 1-25.).
Plaintiff MyMail's Response to Defendants' Motion for Summary Judgment of Invalidity Under Section 102(B) Based on Sales and Public Use of the Inventors' "NEAT" Software System and Memorandum in Support Thereof, Aug. 26, 2005, including exhibits:
Exhibit A—Declaration of Thomas D. Selgas, Aug. 25, 2005.
Exhibit D—Internet Access Service Agreement between GTE Intelligent Network Services Incorporated and Netsafe, Inc., Dec. 5, 1995.
Exhibit H—Netrepreneurial Network Training Course manual, Nov. 7, 2004.
Exhibit O—Netsafe Announces First Suite of Integrated Customizable Internet Tools and Services, Oct. 23, 1996.
Exhibit Q—Excerpts from transcript of deposition of John Everett Gmuender, Nov. 7, 2004.
Exhibit R—Excerpts from transcript of deposition of Channing Corn, Jun. 3, 2005.
Gonzalez, Fred; "Massing/Gmuender Declaration" Electronic Mail of Mar. 12, 2009.
Selgas, Thomas; "Admission by Applicant as Prior Art Under MPEP § 2129"; Apr. 24, 2009.
U.S. Appl. No. 10/417,853; Office Action; Jul. 8, 2004.
U.S. Appl. No. 10/417,853; Examiner's Interview Summary; Oct. 13, 2004.
U.S. Appl. No. 10/417,853; Response with Petition; Jan. 13, 2005.
U.S. Appl. No. 10/417,853; Decision on Petition; May 4, 2005.
U.S. Appl. No. 10/417,853; Office Action (RR); Aug. 31, 2005.
U.S. Appl. No. 10/417,853; Response to Restriction Requirement; Sep. 12, 2005.
U.S. Appl. No. 10/417,853; Office Action (final); Feb. 10, 2006.
U.S. Appl. No. 10/417,853; Response; Jul. 31, 2006.
U.S. Appl. No. 10/417,853; Advisory Action; Aug. 9, 2006.
U.S. Appl. No. 10/417,853; Examiner's Interview Summary; Sep. 29, 2006.
U.S. Appl. No. 10/417,853; Office Action; Nov. 2, 2006.
U.S. Appl. No. 10/417,853; Examiner's Interview Summary; Dec. 6, 2006.
U.S. Appl. No. 10/417,853; Response; May 7, 2007.
U.S. Appl. No. 10/417,853; Notice of Non-Responsive Amendment; Aug. 3, 2007.
U.S. Appl. No. 10/417,853; Response; Sep. 4, 2007.
U.S. Appl. No. 10/417,853; Office Action (RR); Nov. 16, 2007.
U.S. Appl. No. 10/417,853; Response to Restriction Requirement; Dec. 17, 2007.
U.S. Appl. No. 10/417,853; Office Action (final); Mar. 26, 2008.
U.S. Appl. No. 10/417,853; Examiner's Interview Summary; May 28, 2008.
U.S. Appl. No. 10/417,853; Response; Jul. 3, 2008.

U.S. Appl. No. 10/417,853; Examiner's Interview Summary; Sep. 9, 2008.
U.S. Appl. No. 10/417,853; Office Action; Sep. 25, 2008.
U.S. Appl. No. 10/417,853; Examiner's Interview Summary; Feb. 2, 2009.
U.S. Appl. No. 10/417,853; Response with Petition, Affidavits/Exhibits; Mar. 19, 2009.
U.S. Appl. No. 10/417,853; Decision on Petition; Jun. 8, 2009.
U.S. Appl. No. 10/417,853; Examiner's Interview Summary; Sep. 29, 2009.
U.S. Appl. No. 10/417,853; Examiner's Interview Summary; Oct. 19, 2009.
U.S. Appl. No. 10/417,853; Applicant's Interview Summaries; Oct. 26, 2009.
U.S. Appl. No. 10/417,853; Applicant's Interview Summaries; Nov. 16, 2009.
U.S. Appl. No. 10/417,853; Examiner's Interview Summary; Nov. 23, 2009.
U.S. Appl. No. 10/417,853; Applicant's Interview Summary; Mar. 15, 2010.
U.S. Appl. No. 10/417,853; Office Action; Mar. 16, 2010.
U.S. Appl. No. 10/417,871; Office Action; Feb. 6, 2007.
U.S. Appl. No. 10/417,871; Response; Aug. 6, 2007.
U.S. Appl. No. 10/417,871; Office Action; Oct. 15, 2007.
U.S. Appl. No. 10/417,871; Response; Jan. 15, 2008.
U.S. Appl. No. 10/417,871; Advisory Action; Jan. 25, 2008.
U.S. Appl. No. 10/417,871; Response; Apr. 15, 2008.
U.S. Appl. No. 10/417,871; Office Action; Oct. 15, 2008.
U.S. Appl. No. 10/417,871; Notice of Abandonment; Jun. 23, 2009.
U.S. Appl. No. 10/417,821; Office Action; Jul. 13, 2004.
U.S. Appl. No. 10/417,821; Response with Petition; Jan. 13, 2005.
U.S. Appl. No. 10/417,821; Decision on Petition; Mar. 2, 2005.
U.S. Appl. No. 10/417,821; Request Reconsideration of Petition; May 2, 2005.
U.S. Appl. No. 10/417,821; Office Action; May 15, 2005.
U.S. Appl. No. 10/417,821; Response; Jul. 11, 2005.
U.S. Appl. No. 10/417,821; Office Action; Aug. 01, 2005.
U.S. Appl. No. 10/417,821; Response; Sep. 12, 2005.
U.S. Appl. No. 10/417,821; Decision on Petition; Sep. 14, 2005.
U.S. Appl. No. 10/417,821; Office Action; Feb. 7, 2006.
U.S. Appl. No. 10/417,821; Response; Jul. 31, 2006.
U.S. Appl. No. 10/417,821; Office Action; Oct. 23, 2006.
U.S. Appl. No. 10/417,821; Examiner's Interview Summary; Dec. 6, 2006.
U.S. Appl. No. 10/417,821; Response; Apr. 23, 2007.
U.S. Appl. No. 10/417,821; Office Action; Jul. 13, 2007.
U.S. Appl. No. 10/417,821; Examiner's Interview Summary; Nov. 21, 2007.
U.S. Appl. No. 10/417,821; Response; Dec. 12, 2007.
U.S. Appl. No. 10/417,821; Office Action; Jun. 13, 2008.
U.S. Appl. No. 10/417,821; Response; Dec. 15, 2008.
U.S. Appl. No. 10/417,821; Office Action; Mar. 18, 2009.
U.S. Appl. No. 10/417,821; Response; Mar. 27, 2009.
U.S. Appl. No. 10/417,821; Office Action; Jun. 23, 2009.
U.S. Appl. No. 10/417,821; Response; Aug. 14, 2009.
U.S. Appl. No. 10/417,821; Office Action; Sep. 4, 2009.
U.S. Appl. No. 10/417,821; Examiner's Interview Summary; Oct. 7, 2009.
U.S. Appl. No. 10/417,821; Response; Mar. 4, 2010.
U.S. Appl. No. 10/417,821; Applicant's Interview Summary; Mar. 15, 2010.
U.S. Appl. No. 10/417,862; Office Action; Jul. 12, 2004.
U.S. Appl. No. 10/417,862; Response, Rule 131 Affidavit, and Petition; Jan. 12, 2005.
U.S. Appl. No. 10/417,862; Petition and Declaration in Support; Jan. 12, 2005.
U.S. Appl. No. 10/417,862; Office Action; Jul. 26, 2005.
U.S. Appl. No. 10/417,862; Response; Sep. 12, 2005.
U.S. Appl. No. 10/417,862; Office Action; Nov. 29, 2005.
U.S. Appl. No. 10/417,862; Response; May 30, 2006.
U.S. Appl. No. 10/417,862; Supplemental Amendment; Jul. 31, 2006.
U.S. Appl. No. 10/417,862; Office Action; Aug. 23, 2006.
U.S. Appl. No. 10/417,862; Response with Petition; Jun. 25, 2007.
U.S. Appl. No. 10/417,862; Notice of Abandonment; Oct. 31, 2007.
U.S. Appl. No. 10/417,862; Decision on Petition; Dec. 27, 2007.
U.S. Appl. No. 10/417,862; Office Action; Aug. 11, 2008.
U.S. Appl. No. 10/417,862; Examiner's Interview Summary; Sep. 9, 2008.
U.S. Appl. No. 10/417,862; Response; Sep. 10, 2008.
U.S. Appl. No. 10/417,862; Office Action; Dec. 11, 2008.
U.S. Appl. No. 10/417,862; Response; Jun. 11, 2009.
U.S. Appl. No. 10/417,862; Final Office Action; Oct. 5, 2009.
U.S. Appl. No. 10/417,862; Response; Nov. 13, 2009.
U.S. Appl. No. 10/417,862; Office Action; Feb. 3, 2010.
U.S. Appl. No. 10/417,862; Response; Feb. 26, 2010.
U.S. Appl. No. 10/417,862; Applicant's Interview Summary; Mar. 15, 2010.
U.S. Appl. No. 08/827,691, filed Apr. 10, 1997.
U.S. Appl. No. 08/827,691; Office Action; Apr. 16, 1999.
U.S. Appl. No. 08/827,691; Response; Jul. 15, 1999.
U.S. Appl. No. 08/827,691; Final Office Action; Sep. 22, 1999.
U.S. Appl. No. 08/827,691; Examiner's Interview Summary; Jan. 10, 2000.
U.S. Appl. No. 08/827,691; Preliminary Amendment and RCE; Jan. 24, 2000.
U.S. Appl. No. 08/827,691; Final Office Action; Apr. 4, 2000.
U.S. Appl. No. 08/827,691; Appeal Brief; Nov. 30, 2000.
U.S. Appl. No. 08/827,691; Notice of Allowance, Notice of Allowability, Examiner's Amendment, Examiner's Interview Summary; Mar. 1, 2001.
U.S. Appl. No. 09/872,474, filed Apr. 10, 1997.
U.S. Appl. No. 09/872,474; Office Action; Jun. 1, 2001.
Ask Apache; "Alexa Toolbar Add-On for Firefox Works!"; http://www.askapache.com/tools/alexa-toolbar-firefox.html; Aug. 20, 2007.
Berners-Lee, T. and Connolly, D.; "Hypertext Markup Language—2.0"; http://tools.ietf.org/html/rfc1866; Network Working Group, Nov. 1995.
Connolly, D. and Masinter, L.; "The 'text/html' Media Type"; http://tools.ietf.org/html/rfc2854; Network Working Group, The Internet Society; Jun. 2000.
Cutts, Matt; "Gadgets, Google, and SEO—Toolbar Beta 4"; http://www.mattcutts.com/blog/toolbar-beta-4/; Jan. 30, 2006.
Dictionary.Com; "database definition"; http://dictionary.reference.com/browse/database, Apr. 8, 2009.
Free Online Dictionary of Computing; "Browser"; http://foldoc.org/?query=browser; May 31, 1996.
Free Online Dictionary of Computing; "Database"; http://foldoc.org/index.cgi?query=database; Nov. 17, 2005.
Free Online Dictionary of Computing; "Document"; http://foldoc.org/index.cgi?query=document; Oct. 25, 2003.
Free Online Dictionary of Computing; "MIME==> Multipurpose Internet Mail Extensions"; http://foldoc.org/?query=MIME; Apr. 4, 1995.
Free Online Dictionary of Computing; "Toolbar"; http://foldoc.org/?query=toolbar; Oct. 24, 2003.
Free Online Dictionary of Computing; "Window System"; http://foldoc.org/?query=window+system.
Freedman, Alan; "The Computer Glossary—The Complete Illustrated Dictionary, Eight Edition"; pp. 90-91, 428, 463; The Computer Language Company, Inc., Point Pleasant, PA / American Management Association, New York, NY; 1998.
Hardmeier, Sandi; "The History of Internet Explorer"; http://www.microsoft.com/windows/ie/community/columns/historyofie.mspx; Microsoft Corp., Aug. 25, 2005.
Highbeam Research; "Free utility from Infoseek adds live search box to browser"; http://www.highbeam.com/doc/1G1-18752480.html; Information Today, Oct. 1, 1996.
Highbeam Research; "Infoseek Introduces Utility to Add Search Capabilities to Netscape Navigator"; http://www.highbeam.com/DocPrint.aspx?DocId=1G1:18633135; PR Newswire, Sep. 3, 1996.
Highbeam Research; "New Version of Infoseek Quickseek Lets Users Search the Internet Directly From the Browser Address/Locator Bar"; http://www.highbeam.com/DocPrint.aspx?DocId=1G1:19146270; PR Newswire, Feb. 24, 1997.

Merriam-Webster; "Database—Definition from the Merriam-Webster Online Dictionary"; http://www.merriam-webster.com/dictionary/database, Apr. 8, 2009.
Microsoft Corp., "Customizing the Standard Buttons toolbar in Internet Explorer"; http://support.microsoft.com/kb/198177; Microsoft Corp., May 10, 2007.
Microsoft Corp., "How to Customize the Quick Launch Toolbar"; http://support.microsoft.com/kb/171206; Microsoft Corp., Jun. 5, 2007.
Microsoft Corp., "How to Customize the Toolbars in Internet Explorer"; http://support.microsoft.com/kb/153593; Microsoft Corp., Jan. 19, 2007.
Microsoft Corp., "How to Re-create the View Channels Icon on Quick Launch Toolbar"; http://support.microsoft.com/kb/195737; Microsoft Corp., Feb. 27, 2007.
Microsoft Corp.; "About Dynamic Data Exchange"; http://msdn.microsoft.com/en-us/library/ms648774(printer).aspx; Microsoft Corp., 2009.
Microsoft Corp.; "Introduction to ActiveX Controls"; http://msdn.microsoft.com/en-us/library/aa751972(VS.85,printer).aspx; Microsoft Corp., 2009.
Microsoft Corp.; "Windows History—Internet Explorer History"; http://www.microsoft.com/windows/WinHistoryIE.mspx; Microsoft Corp., Jun. 30, 2003.
Microsoft Corp.; "How to Package Components for Internet Distribution"; http://msdn.microsoft.com/en-us/library/aa741200(VS.85).aspx.
Microsoft Corp.; "Registry (Windows)"; http://msdn.microsoft.com/en-us/library/ms724871.aspx, Apr. 2, 2009.
Microsoft Corp.; "NT 4.0 Resource Kit Utilities Corrections and Comments"; http://support.microsoft.com/kb/159564, Jan. 19, 2007.
Microsoft Corp.; "SysAdmin Installs Incorrectly from Normandy Beta 2 CD"; http://support.microsoft.com/kb/158988, Sep. 30, 2003.
Microsoft Corp.; "Microsoft Announces Record Fiscal 1996 Revenues and Income"; http://download.microsoft.com/download/9/6/7/9671cf43-454f-4cde-b2d6-dc49c9a4a57a/FY1996Q4_earnings.doc, Jul. 22, 1996.
NC State College; "Parts of a Web Browser;" http://www.ncstatecollege.edu/Webpub/ccraig/images/Searching_the_Web.pdf; North Carolina State College; Jan. 31, 2006.
Osier, Dan, et al.; "Sams Teach Yourself Delphi 3 in 14 days"; p. 277, Sams Publishing, Indianapolis, Indiana; 1997.
Pogue, David and Biersdorfer, J. D.; "The Internet: The Missing Manual"; pp. 47-50; O'Reilly Media, Inc., Sebastopol, California; 2006.
Ragget, Dave et al (Ed.); "HTML 4.0 Specification—W3C Recommendation, revised on Apr. 24, 1998"; http://www.w3.org/TR/1998/Rec-html40-19980424/; W3C; Apr. 24, 1998.
Ragget, Dave et al (Ed.); "HTML 4.01 Specification—W3C Recommendation Dec. 24, 1999"; http://www.w3.org/TR/html401/; W3C; Dec. 24, 1999.
Ragget, Dave: "HyperText Markup Language Specification Version 3.0 <draft-ietf-html-specv3-00.txt>"; http://www.w3.org/MarkUp/html3/CoverPage; Internet Engineering Task Force; Sep. 28, 1995.
Ragget, Dave; "HTML 3.2 Reference Specification—W3C Recommendation Jan. 14, 1997"; http://www.w3.org/TR/REC-html32.html; W3C; Jan. 14, 1997.
Schnoll, Scott; "The History of Internet Explorer"; http://www.nwnetworks.com/iehistory.htm; 2001.
Sinha, Alok and Clore, Don and Phurrough, Dale; "Behind the Scenes at MSN 2.0: Architecting an Internet-Based Online Service"; http://www.microsoft.com/msj/0497/msn20/msn20.aspx; Microsoft Systems Journal, Apr. 1997.
Web Basics Tutorial; "Parts of a Web Browser: Overview"; http://www.lib.unc.edu/instruct/community_tutorials/web/browsers/overview.html; University of North Carolina Library, Jan. 31, 2006.
Webopedia; "Browser"; http://www.webopedia.com/TERM/B/browser.html; WebMediaBrands Inc., May 5, 2008.
Wikipedia; "Browser Helper Object"; http://en.wikipedia.org/wiki/Browser_Helper_Object; Wikimedia Foundation, Inc., Feb. 16, 2009.
Wikipedia; "History of Internet Explorer"; http://en.wikipedia.org/wiki/History_of_Internet_Explorer; Wikimedia Foundation, Inc., Feb. 11, 2009.
Wikipedia; "Internet Explorer 3"; http://en.wikipedia.org/wiki/Internet_Explorer_3; Wikimedia Foundation, Inc., Feb. 28, 2009.
Wikipedia; "Internet Explorer"; http://en.wikipedia.org/wiki/Internet_Explorer; Wikimedia Foundation, Inc., Mar. 2, 2009.
Wikipedia; "Layout Engine"; http://en.wikipedia.org/wiki/Layout_engine; Wikimedia Foundation, Inc., Feb. 2, 2009.
Wikipedia; "List of Microsoft Windows application programming interfaces and frameworks"; http://en.wikipedia.org/wiki/List_of_Microsoft_Windows_application_programming_interfaces_and_frameworks; Wikimedia Foundation, Inc., Feb. 7, 2009.
Wikipedia; "Netscape Navigator"; http://en.wikipedia.org/wiki/Netscape_Navigator; Wikimedia Foundation, Inc., Feb. 26, 2009.
Wikipedia; "Window (computing)"; http://en.wikipedia.org/wiki/Window_(computing); Wikimedia Foundation, Inc., Apr. 4, 2009.
Wikipedia; "ActiveX"; http://en.wikipedia.org/wiki/ActiveX; Wikimedia Foundation, Inc., Apr. 2, 2009.
Wikipedia; "Browser"; http://en.wikipedia.org/wiki/Browser; Wikimedia Foundation, Inc., Mar. 15, 2009.
Wikipedia; "DDE"; http://en.wikipedia.org/wiki/DDE; Wikimedia Foundation, Inc., Jan. 14, 2009.
Wikipedia; "Dynamic Data Exchange"; http://en.wikipedia.org/wiki/Dynamic_Data_Exchange; Wikimedia Foundation, Inc., Mar. 5, 2009.
Wikipedia; "MIME"; http://en.wikipedia.org/wiki/MIME; Wikimedia Foundation, Inc., Apr. 1, 2009.
Wikipedia; "MIME Type"; http://en.wikipedia.org/wiki/MIME_type; Wikimedia Foundation, Inc., Mar. 24, 2009.
Wikipedia; "Tabbed Browsing"; http://en.wikipedia.org/wiki/Tabbed_browsing; Wikimedia Foundation, Inc., Mar. 30, 2009.
Wikipedia; "Web Browser"; http://en.wikipedia.org/wiki/Web_browser; Wikimedia Foundation, Inc., Apr. 3, 2009.
Wikipedia: "Database"; http://en.wikipedia.org/wiki/Database; Wikimedia Foundation, Inc., Mar. 30, 2009.
Wikipedia; "Mosaic (web browser)"; http://en.wikipedia.org/wiki/Mosaic_(web_browser); Wikimedia Foundation, Inc., Apr. 22, 2009.
Edell, Richard, et al.; "Billing users and pricing for TCP": IEEE Journal on Selected Areas in Communications; Sep. 1995; vol. 13, pp. 1162-1175.
Newsome, M. et al., "HyperSQL: web-based query interfaces for biological databases," Proceedings of the Thirtieth Hawaii International Conference on System Science, Wailea, HI, USA, Jam. 7-10, 1997 (abstract).
Maher, R.C.; Simple But Useful Tools for Interactive WWW Development, Proceedings of the 26th Annual Conf. Frontiers in Education Conference, Nov. 1996, p. 1035-1038 vol. 3.
Hsieh et al.; JAVA Bytecode to Native Code Translation: The Caffine Prototype and Preliminary Results, Proceedings of the 29th Annual IEEE/ACM Inter. Symposium on Microarchitecture, Dec. 1996, p. 90-97.
Meyer, B. et al.; Enabling networking between heterogeneous distributed platforms, Distributed Platforms: Client/Server and Beyond: DCE, CORBA, ODP and Advanced Distributed Applications, Proceedings of the IFIP/IEEE International Conference on; p. 329-341; Feb./Mar. 1996 (abstract).
Kronick, S.; "Netscape Navigator Handbook"; Netscape Communications Corp., ed. Aug. 1, 1996.
Carr, Gregory W.; Letter to General Counsel USPTO via First Class Mail; Feb. 2, 2010.
Carr, Gregory W.; Letter to General Counsel USPTO via Hand Delivery; Feb. 2, 2010.
Carr, Gregory W.; Letter to General Counsel USPTO via First Class Mail regarding U.S. Appl. No. 10/417,821, filed Feb. 23, 2010.
Carr, Gregory W.; Letter to General Counsel USPTO via Hand Delivery regarding U.S. Appl. No. 10/417,821, filed Feb. 24, 2010.
Carr, Gregory W.; Letter to General Counsel USPTO via First Class Mail regarding U.S. Appl. No. 10/417,862, filed Feb. 23, 2010.
Carr, Gregory W.; Letter to General Counsel Uspto via Hand Delivery regarding U.S. Appl. No. 10/417,862, filed Feb. 24, 2010.

Carr, Gregory W.; Letter to Director David Kappos, USPTO; Feb. 25, 2010.
Apple Computer; "*Inside Macintosh: Networking With Open Transport*"; Apple Computer, Inc., Jan. 15, 1998; http://developerapple.com/documentation/mac/NetworkingOT/NetworkingWOT-2.html.
Wikipedia; "*AppleTalk*"; Jun. 3, 2009; http://en.wikipedia.org/wiki/AppleTalk.
Thorbjornsen, Thorbjorn; "Make Profit Reading Internet Ads"; CORDIS Archive; May 22, 1997; http://cordis.europa.eu/infowin/acts/ienm/newsclips/arch1997/970597no.htm.
Alternet, product literature, (Jun. 1992), MYMAIL 631808-631812.
Anderson, Tim; "Visual Basic—A programming language and IDE developed by Microsoft"; Aug. 2008; http://knol.google.com/k/visual-basic.
Banner, The : Second-Generation Web Services Promise Advertisers A Faster, Smarter Experience, (Jul. 1996), U 001099-001101.
Berners-Lee, T. et al; "Hypertext Transfer Protocol—Http/1.0"; Network Working Group, (May 1996); http://tools.ietf.org/html/rfc1945.
Compuserve, Network Access Numbers, (Aug. 1995), AOL 086221-086243.
Connect Atlanta, Access America Agreement, (Jan. 1995), ELNKMM 013101-013104 and ELNKMM 013107.
Davis, Frederic E., "Windows 95: The Internet's Built In—Microsoft's Internet-savvy operation system will make online exploration a snap (Frontiers, Both Old and New)," Netguide, No. 210, (2004), ELNKMM 005706-005711.
Davis, Steve, CompuServe: Complete Handbook and Membership Kit, 2nd Edition, Prima Publishing, (1996) AOL 085208-085740.
Messina, Judith, Delivering On-Line, Crain's New York Business, vol. 14, Issue 13, p. 3, (Mar. 30, 1998), U001136-001137.
Fielding, R. et al; "Hypertext Transfer Protocol—Http/1.1"; Network Working Group, (Jan. 1997); http://tools.ietf.org/html/rfc2068.
Fielding, R. et al; "Hypertext Transfer Protocol—Http/1.1"; Network Working Group, (Jun. 1999); http://tools.ietf.org/html/rfc2616.
Freed, N. et al.; "Multipurpose Internet Mail Extensions (MIME) Part One: Format of Internet Message Bodies"; Network Working Group RFC 2045; Nov. 1996; http://www.ietf.org/rfc/rfc2045.txt.
GTE, Internet Access Kit, version Windows 95, (date unknown), GTE 004532-004563.
GTE, Internet Solutions Dial-Up Access Directory, (date unknown), GTE 004634-004644.
GTE, Internet Installation Guide, version 3.01, (1994-1996), GTE 004512-004531.
Holonet UUCP, product literature, (Dec. 17, 1994), ELNKMM 013123-013130.
Internet Atlanta, Inc., product literature, (date unknown), ELNKMM 013118-013122.
Kiely, Don; "Breezing to Visual Basic 4.0"; Information Week, Apr. 1996; http://www.informationweek.com/574/74advis.htm.
Klein, Amit; "META REFRESH as a Response Header"; Beyond Security; Nov. 2006; http://www.securiteam.com/securityreviews/6Z00320HFQ.html.
Marshall, James; "HTTP Made Really Easy, A Practical Guide to Writing Clients and Servers"; (1997); http://www.jmarshall.com/easy/http.
Merrriam-Webster Online, excerpts re "800 Number" and "modified"; (Feb. 3, 2005).
Netsafe, Inc., Neat! Download Instructions for 2.1 Full Release, (date unknown), MYMAIL 058724-058728.
Netsafe, Inc., Neat! Installation Help File print-out, (date unknown), MASS 000285-000288.
Nelson, Larry; "Developing and distributing audio applications with Visual Basic and ToolBook"; Australian Journal of Educational Technology 1994, 10(2), 119-127; http://www.ascilite.org.au/ajet/ajet10/nelson.html.
Netcom On-Line Communications Services, product literature, ELNKMM 013114-013117.
Netsafe, Inc., Press Background Information, (date unknown), MYMAIL 003288-003301.
Netsafe, Inc., Neat! Product literature, (date unknown), MYMAIL 001371-001417.
Netsafe, Inc., Neat! product literature, (date unknown), MYMAIL 009231-009258.
Netsafe, Inc., Neat! product literature, (date unknown), MYMAIL 009260-009268.
Netsafe, Inc., Neat! product literature and installation materials, (date unknown), MYMAIL1 009270-009289.
Netsafe, Inc., Neat! product literature, (date unknown), MYMAIL 009301-009308.
Netsafe, Inc., Neat! product literature, (May 26, 1997), MYMAIL 009677-009686.
Netsafe, Inc., Neat! Quick Start Guide, (May 1997), MYMAIL 009690-009701.
Netsafe, Inc., Neat! version 3.0 Beta Review, (Oct. 1996), MASS 000106-000109.
Netsafe, Inc., Neat! Software Literature, (date unknown), MYMAIL 005131-005143.
Netsafe, Inc., Netrepreneur Introduction Manual, (Nov. 1996), MYMAIL 003368-003391.
Netsafe, Inc., Netrepreneur Training Course, (Nov. 7, 2004); pp. 1-40.
Netsafe, Inc., product literature, (date unknown), MYMAIL 003313-003342.
Netscape; "An Exploration of Dynamic Documents"; 1999; http://web.archive.org/web/20020802170847/http://wp.netscape.com/assist/net_sites/pushpull.html.
Spry, Inc., Online Catalog: Internet in a Box, www.oreilly.com; (2005).
Netsafe, Inc., Owning a Toll Booth on the Information Super Highway, (1996), MYMAIL 003398-003416.
Netsafe, Inc., product literature re: Plans, Services, and Options, (1996), MYMAIL 000934-000937.
Prometheus Information Network Group, Inc. (PING), product literature, (Apr. 1, 1994), ELNKMM 013108-013113.
Random Access, Inc., product literature, (date unknown), ELNKMM 013149-013152.
Savetz, Kevin; "Browser Toolbar Roundup"; http://www.computerpowerusercom/Editorial/article.asp?article=articles/archive/c0411/39c11.asp&guid=;CPU Computer Power User, Nov. 2004.
Schroeder, Erica, "MFS-UUNet Merger Talks Bode Well for Online Users," vol. 13, Issue 18, p. 116, (May 6, 1996), ELNKMM 008051-008052.
Sirbu, M.; "A Content-Type Header Field for Internet Messages"; Network Working Group RFC 1049; Mar. 1988; http://www.ietf.org/rfc/rfc1049.txt.
Weingarten, Jan, et al., "The Microsoft Network Tour Guide," Ventanna Communications Group, Inc., 1995.
Wikipedia; "HTTP location"; Wikimedia Foundation, Inc.; Mar. 2010; http://en.wikipedia.org/wiki/HTTP_location.
Wikipedia' "Hyptertext Transfer Protocol"; Wikimedia Foundation, Inc.; May 2010; http://en.wikipedia.org/wiki/Hypertext_Transfer_Protocol.
Wikipedia; "Meta element"; Wikimedia Foundation, Inc.; May 2010; http://en.wikipedia.org/wiki/Meta_element.
Wikipedia; "Meta refresh"; Wikimedia Foundation, Inc.; May 2010; http://en.wikipedia.org/wiki/Meta_element.
Wikipedia; "URL redirection"; Wikimedia Foundation, Inc.; May 2010; http://en.wikipedia.org/wiki/URL_redirection.
Wikipedia; "Visual Basic Extension"; Wikimedia Foundation, Inc.; Jun. 2010 http://en.wikipedia.org/wiki/Visual_Basic_Extension.
Zixit Corporation, ZixMail marketing brochure, (Mar. 2000), MYMAIL 001594-001597.
Microsoft Normandy Beta overview (1996), MYMAIL 000503-000505.
Netsafe, Inc., NetSafe Plans, Services and Options summary, (Nov. 1996), MYMAIL 000934-000937.
Texas Secretary of State, documents re: NetSafe, Inc., with cover page (Apr. 6, 2000), MYMAIL 001042-001054.
Network Solutions, Inc., Service Agreement (date unknown), MYMAIL 001584-001586.
Zixit Corporation, Marketing Alliance Agreement and company literature, (Mar. 24, 2000) MYMAIL 001594-001597.

Network Solutions, Inc., Service Agreement and invoices, (Jan. 2001), MYMAIL 001652-001666.
Verisign, Domain name registration documents for MYMAIL.COM, (Nov. 10, 2001), MYMAIL 001739-001754.
Verisign, Domain name registration documents for MYMAIL.COM, (Dec. 6, 2002), MYMAIL 002222-002227.
Netsafe, Inc., Owning a Toll Booth on the Information Superhighway! (date unknown), MYMAIL 003398-003414.
Netsafe, Inc., Neat! product literature/NetSafe company literature, (1996), MYMAIL 005131-005143.
Netsafe, Inc., NetSafe Announces First Suite of Integrated, Customizable Internet Tools and Services/other product literature; (Oct. 23, 1996), MYMAIL 005144-005177.
Microsoft Corporation, undated letter from Microsoft Corporation to Tom and Michelle Selgas, MYMAIL 007262.
Netsafe, Inc. NetSafe's Security product literature (1998), MYMAIL 009120-009139.
Netsafe, Inc., Neat! product literature/NetSafe company literature, (date unknown), MYMAIL 009231-009258.
Netsafe, Inc., NetSafe company literature (date unknown), MYMAIL 009260-009268.
Netsafe, Inc., Neat! product literature/NetSafe company literature (date unknown), MYMAIL 009270-009289.
Netsafe, Inc., Neat! product literature/NetSafe company literature, (date unknown), MYMAIL 009301-009308.
Netsafe, Inc., Neat! product literature/NetSafe company literature (draft version), (May 26, 1997), MYMAIL 009677-009686.
Mymail, Ltd., Neat! product literature, (date unknown), MYMAIL 003421-003433.
GTE, Internet Installation Guide and materials (date unknown), GTE 04512-04531.
GTE, Internet Solutions Installation Guide—The Insiders Guide to the Outside World (date unknown), GTE 04532-04563.
GTE, Internet Solutions Dial-Up Access Directory, (date unknown), GTE 04634-04644.
Federal Communications Commission, CCB Pol. 96, Plan to Offer Comparably Efficient Interconnection, by Bell Atlantic (Mar. 8, 1996), GTE 16655-16683.
MYMAIL, Ltd., Collection of emails re: NetSafe (Jun. 1996), GTE 16684-16702.
Netsafe, Inc. Presentation Materials, (date unknown), MYMAIL 003313-003343.
Chen, Elaine, et al., "Data net," Electronic News (North America), vol. 42, Issue 2126, Jul. 22, 1996.
Clancy, Heather, "Internet service providers: Long term survival tied to value-added offerings," Computer Reseller News, Issue 674, p. 68, Mar. 11, 1996.
Covell, Andy, "Online services and the Internet: The network manager's friend or foe?", Network Computing, vol. 7, Issue 1, Jan. 15, 1996.
Heim, Judy, "The great e-mail shoot-out," PC World, vol. 14, Issue 2, p. 183, Feb. 1996.
Heim, Judy, et al., "42 tips for taming cyberspace," PC World, vol. 14, Issue 8, p. 122, Aug. 1996.
Jain, R., Fundamentals of Telecommunication, Ohio State University, Department of Computer Science, Apr. 3, 1999.
Lake, Matt, et al., "New looks for CompuServe and Prodigy," PC World, vol. 15, Issue 2, p. 92, Feb. 1997.
Log on and be counted, NetGuide, vol. 3, Issue 4, p. 20, Apr. 1996.
Net help online, Information Week, Issue 563, p. 90, Jan. 22, 1996.
Network Protocols Handbook, Second Edition, 2004-2005 Javvin Technologies Inc., Javin.com.
Performance Systems International, Inc., "PSI Interramp: Personal Internet Access Users Guide," Herndon, VA, PSI Inc., Oct. 1994.
ETSI ETS 300 535 GSM 03.22 V4.8.1 (Released on Feb. 1995).
ETSI ETS 300 599 GSM 09.02 V4.11.1 (Released on Nov. 1995).
ETSI ETS 300 557 GSM 04.08 V4.10.1 (Released on Feb. 1995).
ETSI ETS 300 596 GSM 08.58 V4.70 (Released on Jul. 1995).
Netscape Communications Corporation, AT&T Uses Netscape and the Web to Build a New Infrastructure for Information Access and Communication, 1997.
Legere, John, New Technologies, New Environment: A Blueprint for Continued Success in Asia Pacific, Nov. 22, 1996, AT&T.
AT&T, AT&T House of Style Planning, Programming Guidelines, product literature, 1997.
Microsoft Corp., Form SC 13G for Microsoft Corporation as filed with the SEC, Feb. 19, 1997, MYMAIL 016107-016111.
Gibbel, Stuart, et al. "CivNet hookup," HomePC, vol. 3, Issue 3, p. 157, Mar. 1996.
Stallings, Willliam, Data and Computer Communications, Seventh Edition, Pearson Prentice Hall, 2004.
Newton, Harry, Newton's Telecom Dictionary, Eighth Edition, Flatiron Publishing, Inc., (1994).
Tanenbaum, Andrew, Computer Networks, Third Edition, Prentice Hall, (1996).

* cited by examiner

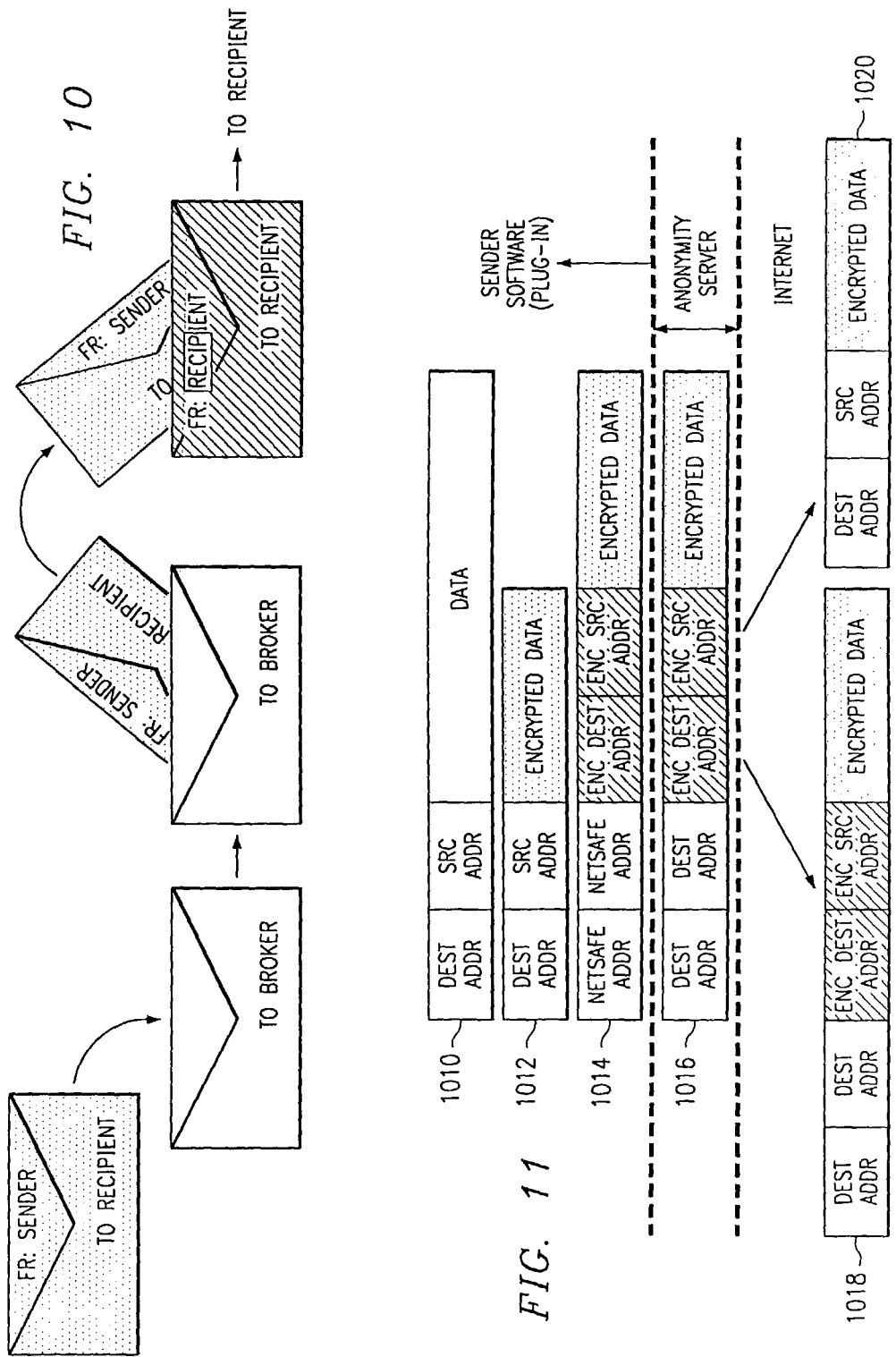

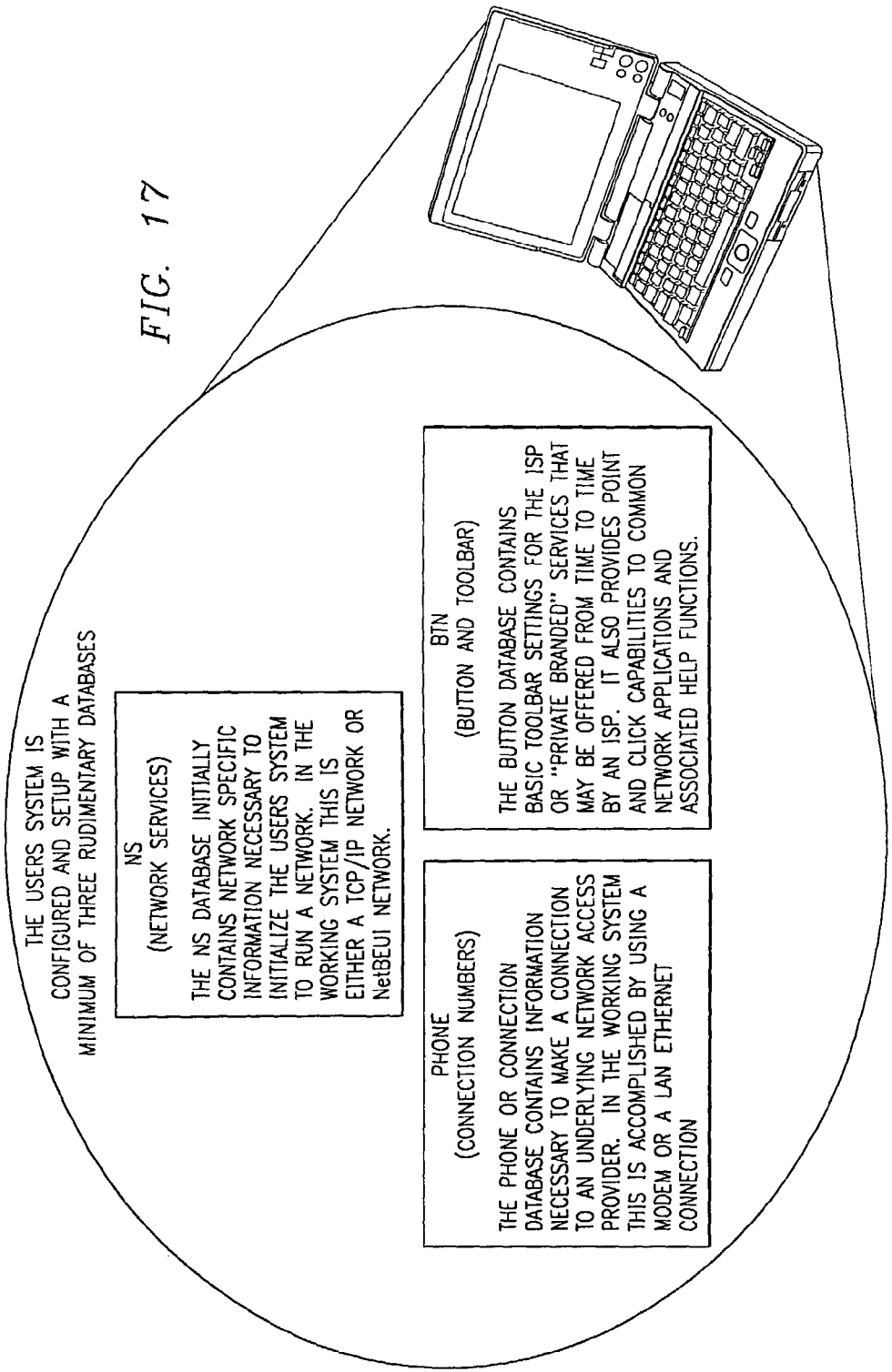

METHOD OF ACCESSING A SELECTED NETWORK

This application is a Division and a Continuation-in-Part Application of U.S. application Ser. No. 09/100,619, filed Jun. 19, 1998 now U.S. Pat. No. 6,571,290, and entitled "METHOD AND APPARATUS FOR PROVIDING FUNGIBLE INTERCOURSE OVER A NETWORK."

A CD_ROM appendix, Appendix A, having file named APP_A.TXT, totaling 78 kilobytes, and created on Aug. 15, 2001, consisting of a computer listing constitutes a part of the specification of this invention, pursuant to 37 C.F.R. Sections 1.77 and 1.96, the CD-ROM appendix being incorporated by reference herein for all purposes.

A portion of the disclosure of this appendix document contains material that is subject to copyright protection. The copyright owner has no objection to the facsimile reproduction by anyone of the patent disclosure, as it appears in the Patent and Trademark Office patent files or records, but otherwise reserves all copyrights whatsoever.

FIELD OF THE INVENTION

The present invention relates in general to digital data networks and, more particularly, to network access and to minimizing unauthorized interception of data and denial of network services.

BACKGROUND OF THE INVENTION

There are many networks of computers throughout the world and there is a need for the computers to communicate with each other across the network. To provide order and security, many networks require a computer wishing access to be authenticated before that computer is granted access. After establishing that the computer should be allowed to communicate over the network, it may be given an identification number so that the computer may be contacted by other computers on the network in accordance with network protocol. In general this process applies to a system designated as the Internet. The Internet comprises a network of computers that interconnect many of the world's businesses, institutions, and individuals. The Internet, which means interconnected network of networks, links tens of thousands of smaller computer networks. The Internet can be accessed directly through telephone lines with a device called a modem or indirectly though a local area network (LAN). Most users do not have the expertise to connect their computers and associated equipment to the Internet and/or finances to have a continuous connection to the Internet. Thus most users access the Internet through an Internet Service Provider (ISP). The ISP can distribute the costs of necessary equipment and telephone lines to many users on some time multiplexed basis. While an ISP may have access to only one server and a few modems for receiving incoming calls from users, some ISPs have access to hundreds and even thousands of modems and many servers to interface between users and one or more high speed telephone lines of at least DS1 standard communication capacity.

Usually the ISPs that charge the lowest prices to the user are the busiest and users often find that access to a low cost ISP is blocked by a "busy signal". On the other hand, a user of the high priced ISPs seldom encounters busy signals. The high priced ISPs have fewer customers, can afford to add modems as needed and are not confronted with suddenly increased demands on equipment capacity.

Some ISPs use less expensive (i.e. slower rate, poorer quality or lower capacity) telephone lines or equipment to provide low cost and as a result the data transmission rate of communications between the user and the Internet may be substantially less than the capability of the users modem. Many sets of information on the Internet, such as Web pages, include pictures, pointers to other pages, music etc, that require large amounts of data to be transmitted for ultimate display. When a user is attempting to access material requiring the transmission of large volumes of data, a low data transmission rate equates to a long time spent waiting to obtain that data.

When a user first installs software in a computer to be used in connecting the computer to a given ISP, many items of information need to be provided to the software before the user can communicate with the ISP and be connected to the Internet. While some of the information such as the specific communication port to be used (i.e. com1 or com2) and the modem type used in the computer would be universal and would be identical regardless of the ISP used, other information is ISP specific. ISP specific type information would include the ISP dial-in number, a Password Authentication Protocol (PAP) identification number and a PAP password for that ISP.

Different ISPs provide different services to users. Some ISPs (no or low service) may offer only a connection to the Internet without technical help to a user connected to that ISP and further without any additional features. Other ISPs (full service) may offer many features such as encyclopedia type information, interactive games, access to otherwise costly databases, etc.

A user in a commercial environment may operate a computer that is connected to a LAN and also is connected to a modem. There are often business considerations that require some communications with the Internet be accomplished through the LAN and other, especially personal, communications be accomplished through a modem. If a single software entity such as a browser is used for both types of Internet connection, several items of information need to be altered with the accompanying chance for error and frustration of the user.

When a computer is subjected to stress such as by a large and sudden variation in supply voltage (i.e. an electrical spike), there may be corruption of data in the software and/or data banks of the computer. When such corruption concerns the data needed to communicate with the Internet, a considerable amount of time is often required to ascertain the cause of the failure to attain communication and further time is required to correct the problem.

Some Internet users are highly mobile and may need to access the Internet from various locations, some of which locations do not have a local phone number for communicating with the normally used ISP. Such a user either must pay the cost of a long distance call or access a different ISP after modifying the appropriate data the operating system's networking, dial-up-networking, or communications properties used to accomplish such access. Such modification always invites a chance for erroneous data entry in the process and the accompanying time required to rectify the situation.

Another problem related to network use is related to electronic mail which terminology is popularly shortened to email. Email is used to quickly communicate with other users of connected network terminals. The process is normally accomplished by sending a set of data including a header portion, a message body and sometimes one or more file attachments. Typically, the header contains the name of the recipient in a TO line, the sender in a FROM line and a subject in a SUBJECT line. Even if the message body and the attachments are scrambled or otherwise encrypted a persistent entity monitoring the email being sent to and from a given terminal may glean considerable information from the subject matter listed and from the number of messages sent between same parties. This information is typically sent in clear text (unencoded) to facilitate the delivery of email to the proper temporary storage facility, normally a post office box like repository of the service provider of the recipient, until such time as the recipient retrieves the email from the service provider. The recipient also uses the header information in determining priority of messages to be read.

A further problem is third party mail relay. This is a process whereby junk emailers use a service system other than their own to send massive amounts of mail without paying for the service. The massive amount of mail can so overload the system that an invaded system can crash, overload or otherwise be damaged. This overload is termed in the art as a denial of service attack. The overall process of sending massive amount of junk email is termed "spamming". The third party mail relay process is also used to bypass other systems filters which are set up to block mail from the junk emailers system.

In view of the above, there exists a need to quickly and easily access the Internet from various locations, being able to access ISPs providing different types of services, using various adaptors (ie modem or LAN card) and being able to choose whether preference should be given to items such as cost and quality of service, without the user having to be concerned about correctly modifying associated data and parameters such as phone numbers, IDs, passwords etc used by the Internet software.

There is a further need to be able to send email to others in a manner which minimizes the possibility that unauthorized entities may be able to retrieve significant data from email header information.

Also there is a need to prevent junk emailers or other unauthorized parties from using the third party mail relay process in connection with a network service system.

SUMMARY OF THE INVENTION

The present invention comprises a method of and apparatus for simplifying the process of access to a network for a roaming computer user, divides the responsibility of servicing a given user wanting to access the network between multiple parties and minimizes the possibility of improper dissemination of email header data as well as improper use of network resources (including server systems) by non-clients.

BRIEF DESCRIPTION OF THE DRAWINGS

For a more complete understanding of the present invention, and the advantages thereof, reference is now made to the following descriptions taken in conjunction with the accompanying drawings, in which:

FIG. 10 comprises a simple diagrammatic showing of how the present invention may be used in combination with browser plug in software to minimize unauthorized viewing of email messages;

FIG. 11 provides more detail for illustrating the process of FIG. 10;

FIG. 17 summarizes the software installation process of a client users system that wishes to access the present invention:

DESCRIPTION OF THE INVENTION

Figure 1:
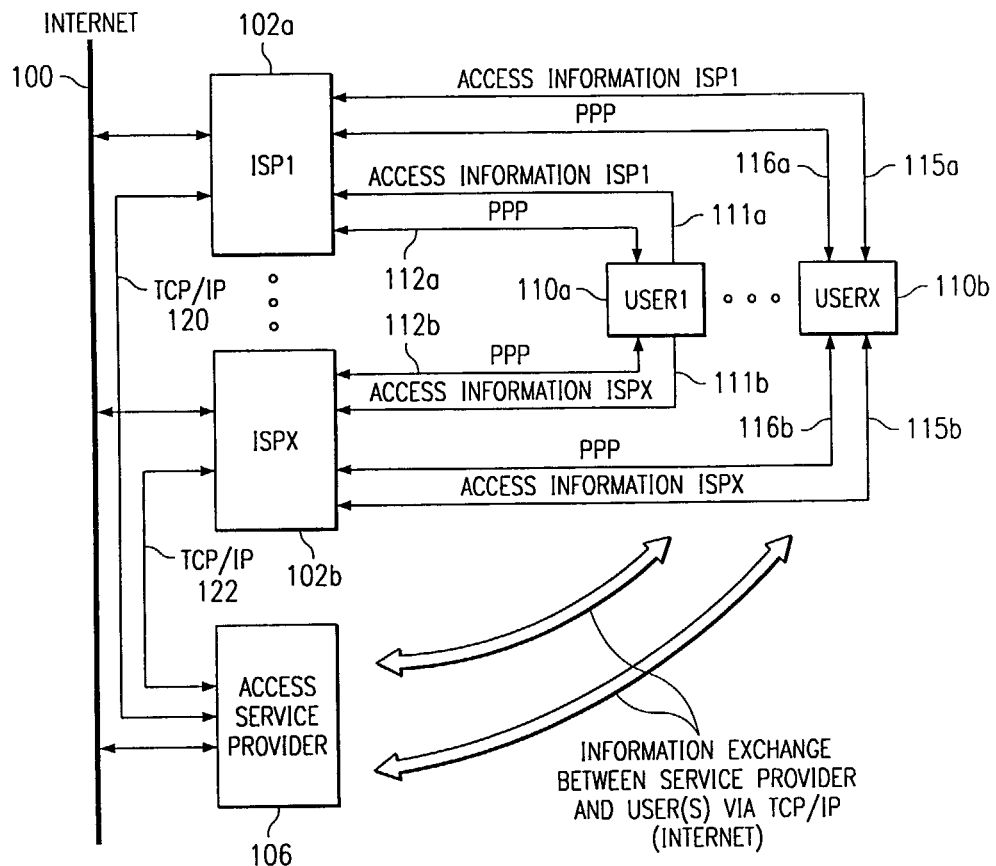
FIG. 1 illustrates signal communication paths between clients, ISPs and network access providers.

The entire contents of Provisional Patent Application Serial No. 60/050,186, entitled: "Multi-User Internet Dispatch System," filed on Jun. 19, 1997, including appendices, are incorporated herein by reference for all purposes.

It should be noted that the present invention applies to any network or interconnected set of networks. However, since the Internet is a well known example of an interconnected set of networks, Internet terminology and interaction examples will be used in the explanation of this invention.

The present invention solves all or some of at least ten problems:

1 Eliminates the need for a computer user to configure and reconfigure computer networking software for network access through a multiplicity of ISPs and Network Access Providers (NAP) (companies which own the telephone networks and modem banks such as AT&T, GTE, UUNet, PSI, etc.).

2 Allows a Network Re-seller such as an Internet Service Provider to offer network access via a multiplicity of Network Access Providers based on cost, location, availability, reliability, etc.

3 Allows a Network Re-seller to balance network loads through a multiplicity of Network Access Providers and across a multiplicity of network computer servers.

4 Eliminates, the need for a computer user to know or configure network access telephone numbers or network access protocol identification numbers.
5 Eliminates the need for a computer user or mobile computer user to reconfigure remote network access software to connect to a network from a remote location.
6 Allows multiple users to use a single computer each with their own unique networking attributes and unique network identity.
7 Allows separate and distinct identifications (ID) and passwords for different services and network functions such as PAP IDs and PAP password, Email ID and password, etc.
8 Provides a user with true network anonymity by assigning independent non-user specific identifications and passwords for such things as PAP authentication, FTP and Email logins, News Server logins, and network server logins.
9 Provides Email anonymity by transmitting and receiving all email through a third party (broker) wherein, if appropriate, aliases may be used for all un-encrypted data and these aliases may be changed periodically by the system in a manner transparent to the user.
10 Eliminates third party email relay (SPAMMING) by transparently authenticating each user-system prior to giving access to a sendmail server.

This invention relates to network connections, such as the Internet, and allows systems to be independently, transparently and dynamically connected or reconnected to a network based upon any number of attributes such as user or group identity, cost, availability, reliability, etc. Further this invention supports many types of physical connections such as telephone dial-up connections, ISDN connections, Ethernet, and other local area networking connections. It should be noted that while Internet terms such as ISP are used throughout this description, the invention is operable with any network or portion of any network and thus terms such as NSP (Network Service Provider) have been coined for use in the claims to identify similar or analogous systems and devices.

A traditional network connection requires someone skilled in the art of computer networking to setup and configure both network related hardware (such as modems or Local Area Network cards (Ethernet, Token-ring or other cards) and network software. The invention eliminates the need for such network configuration skills.

The invention configures and reconfigures network related software to support multiple users with multiple network protocols and/or multiple networks using the same protocol without the need of any computer network configuration skills and further allows the configuration to be changed or modified dynamically without any user intervention.

The principles of the present invention and their advantages are best understood by referring to the illustrated embodiment depicted in FIGS. 1-21 of the drawings, in which like numbers designate like parts.

The invention includes software which is sometimes referred to as middle-ware because it resides between an electronic device operating system and the end-users interface. The inventive software has all the attributes of middle-ware as it configures and manages network communication equipment such as modems and Ethernet cards, network protocols such as the Transmission Control Protocol/Internet Protocol (TCP/IP), and the associated interfaces between the communication equipment, network protocol and the computer's operating system for each individual user or groups of users.

Now referring to FIG. 1, there is illustrated a plurality of Internet service providers (ISP1 through ISPx) 102*a*, 102*b* connected to a network 100 (sometimes referred to as the Internet). As will be appreciated, an Internet service provider (ISP) provides access for one or more users 110*a*, 110*b* to the Internet 100 through a physical interface. The term "internet service provider" includes network access providers (NAPs) and Network Service Providers (NSPs) as well. In general terms, a user 110 connects to the ISP 102 via a communications link and the ISP 102 provides connection to the Internet 100. As will be appreciated by many users of the Internet, the ISP typically has many modems accessible from a limited number of telephone numbers. Each of these modems has an assigned internet protocol (IP) address and normally an assigned DNS name. Such assigned names and (IP) addresses will look something like "1cust239.tnt.orl1.da.uu.net" and [208.250.77.239] respectively. When a user contacts the ISP, the user is connected to the next available modem and the IP address of that modem becomes the IP address of that user for the remainder of that connection session. The user 110 may include a single computer, group of computers, local area network, or a larger network connected to the ISP 102 via a communications link. However, in most applications, the user 110 will include a single user requesting access time to the Internet 100.

The present invention provides a means for transmitting ISP-specific access information to a user 110 via a communications link (preferably, the Internet 100) that allows the user 110 to gain access to the Internet 100 through a selected one of the plurality of ISPs 102.

To begin the process of the present invention, the user 110 installs (downloads) a client dispatch application program 200 (see FIG. 2) that furnishes the user 110 with one or more ISP access telephone numbers, one or more valid test and Registration Password Authentication Protocol (PAP) identification (ID) numbers, and a valid PAP password associated with a predetermined one of the ISPs 102. The client dispatch application 200 will be described in more detail further below. The access information allows the user 110 to authenticate the user's right to connect to the Internet via the predetermined ISP 102. The access information mentioned comprises the previously mentioned access telephone number, the PAP ID, the PAP password and additional ISP-specific information required by the user 110 to gain access to the Internet 100 via the predetermined ISP 102 (collectively, ISP-specific configuration information) is initially provided by the client dispatch application 200. In addition, the client dispatch application 200 provides basic configuration and initialization information (installation and configuration) to the user's computer to configure and manage the network communication equipment, network protocols and the associated interfaces needed to develop the capability to access the Internet 100, regardless of the particular ISP.

After the client dispatch application 200 is installed and the initial ISP-specific information is known, the client dispatch application 200 causes the user 110 to automatically transmit access information to the predetermined ISP 102 (ISP1 102*a* or ISPX 102*b*). The line of communication through which the access information is transmitted to the predetermined ISP 102 by the user 110 (USER1 110*a* or USERX 110*b*) is identified by the reference numerals 111*a*, 111*b*, 115*a*, 115*b*, depending on the particular user (USER1 110*a* or USERX 110*b*) and the particular ISP (ISP1 102*a* or ISPX 102*b*). Upon receipt of the access information, the ISP "authenticates" the user 110. The ISP 102 checks to see whether the PAP ID and PAP password received from the user is valid. It will be understood that the authentication process performed by the ISP 102 utilizes one or more appropriate methods (such as Remote Authentication Dial-In User Service (RADIUS))

which are normally associated with an authentication server running a database at the ISP, Network Service Provider (NSP) or the NAP. If the PAP ID and/or PAP password are not valid, the ISP 102 will disconnect the user or notify the user that the PAP ID and/or PAP password is invalid. If valid, the user 110 and the ISP 102 create a point-to-point protocol (PPP) (i.e., communications connection) which is identified in FIG. 1 by reference numerals 112*a*, 112*b*, 116*a*, 116*b*, depending on the particular user (USER1 110*a* or USERX 110*b*) and the particular ISP (ISP1 102*a* or ISPX 102*b*). The PPP allows the ISP 102 to transmit/receive information to/from the user 110. As a result, the user 110 is given access to the Internet 100 and the ISP generates an internet protocol (IP) address to uniquely identify the user on the Internet 100. The particular IP address assigned to the user 110 depends on the IP addresses that are available and assigned to the particular ISP 102 to which the user 110 is connected. An IP address is presently 32 bits and is normally represented with four decimal numbers each ranging from 0 to 255 (e.g. 128.54.28.200) where each decimal number represents one byte of the 32 bits.

In accordance with the present invention, an Internet service provider access service or ASP (Access Service Provider) 106 is connected to the Internet 100. The external location, or physical address of the access service 106 is defined by a predetermined and unique address (i.e., IP address). After the user 110 gains access to the Internet 100 via one of the ISPs 102, the client dispatch application 200 resident in the user's computer transmits a data message to the access service 106 through the Internet 100 using the predetermined address of the access service 106. This data message is sent via a path identified as TCP/IP 120 or TCP/IP 122, depending on the particular ISP 102 to which the user 110 is connected for access to the Internet 100. The communications link protocol used for Internet 100 communications is defined as Transmission Control Protocol/Internet Protocol (TCP/IP) and is well known in the art. As will be appreciated, other network communications protocols and standards may be used during the present or in the future by the present system invention due to the flexibility provided in the use of multiple databases to store various types of data. The data message transmitted from the user 10 and received by the access service 106 contains information about the user, including the user's identification and address, current PAP ID, time stamp information, and version information of the client dispatch application 200 operating on the user's computer, etc. In response to the user information received, the access service 106 transmits an access information data message that includes access information for a particular ISP 102. The access information is specific to a dial-in telephone number of a particular ISP 102 and, upon receipt by the user 110, allows the user to gain access to the Internet 100 via that particular ISP 102. The ISP-specific access information includes an ISP phone number (for dial-in to the ISP), a PAP ID for the ISP 102, and a PAP password for the ISP 102, and may also include default routing information (i.e., gateway address information), default directory information (including domain name server information), sub-protocols for the PPP for the ISP 102, and configuration information for the hardware (i.e. modem) of the ISP 102 (to configure the user's modem), such as data compression information and speed. The ISP-specific information may also include service option defaults such as Email IDs, POP protocols and browser information. The PAP ID may or may not be sent depending on the current PAP ID information transmitted from the user 110 to the access service in the data message (e.g., if the current PAP ID and the new PAP ID are the same, a new PAP ID does not need to be sent).

After receiving the ISP-specific access information, the client dispatch application 200 may disconnect the user 110 from the current ISP 102 and automatically dial and reconnect the user 110 to the desired ISP 102 associated with the ISP-specific access information. As will be appreciated, the desired ISP 102 may be another ISP or may be the same ISP to which the user was previously connected, depending on the attributes of the particular ISP desired to be used for access to the Internet 100. If the ISP phone number (for dial-in to the ISP) and a PAP ID received with the new access information, refer to the same ISP, the client dispatch application 200 will not disconnect the user 100 and the user's session will continue uninterrupted.

The access information data message includes the information necessary (PAP ID, PAP password, and other information if needed) to access a desired ISP 102 and, may include information for a plurality of desired ISPs 102, or multiple PAP IDs and PAP passwords for a desired single ISP. It will be understood that more than one access information data message packet may be utilized and transmitted, each packet containing a portion of the information packet or each may contain access information for a specific ISP 102.

The access service 106 offers Internet 100 access to the user 110 via a plurality of ISPs 102 based on cost, location, availability, reliability, etc. Based on the geographic location of the user, the access service 106 identifies, to the user 110, one or more ISPs 102 that provide local access availability (via local telephone numbers or toll free numbers) and provide the user 110 with information needed to access one of the identified ISPs (using the ISP-specific access information). For desired low cost operation, the access service 106 identifies the ISP 102 that provides the lowest cost access service through which the user 110 may access the Internet 100 from the identified ISP 102 at the user's location. For the reliability operation, the access service 106 identifies one or more ISPs 102 that provide the highest reliability of connecting through which the user 110 may access the Internet 100 from the identified ISPs 102 at the user's location. For the availability operation, the access service 106 periodically receives availability information from each of the plurality of ISPs 102. In response to this information, the access service 106 identifies one or more ISPs 102 that provide the highest availability through which the user 110 may access the Internet 100 from the identified ISPs 102.

As will be appreciated, the location operation, reliability operation, and availability operation may each provide to the user 110 the identity of multiple ISPs 102 or multiple dial-in numbers for a particular ISP 102 whereby the user 110 will attempt connection in order of priority. For example, the user 110 may attempt access to a first ISP 102 contained in a list of multiple ISPs 102 that have been identified based on availability or reliability. If a connection is not successful with the first ISP 102, the user 110 will next try a second ISP 102 in the list, and so on, until a connection made. In another mode of operation example, the user 110 may attempt access to a first ISP 102 utilizing a first dial-in number contained in a list of multiple dial-in numbers for the first ISP 102 that have been identified based on availability or reliability. If a connection is not successful with the first dial-in number, the user 110 will next try a second dial-in number in the list, and so on, until a connection is made. Further a combination of multiple ISPs 102 and multiple dial-in numbers may be used.

Figure 2:
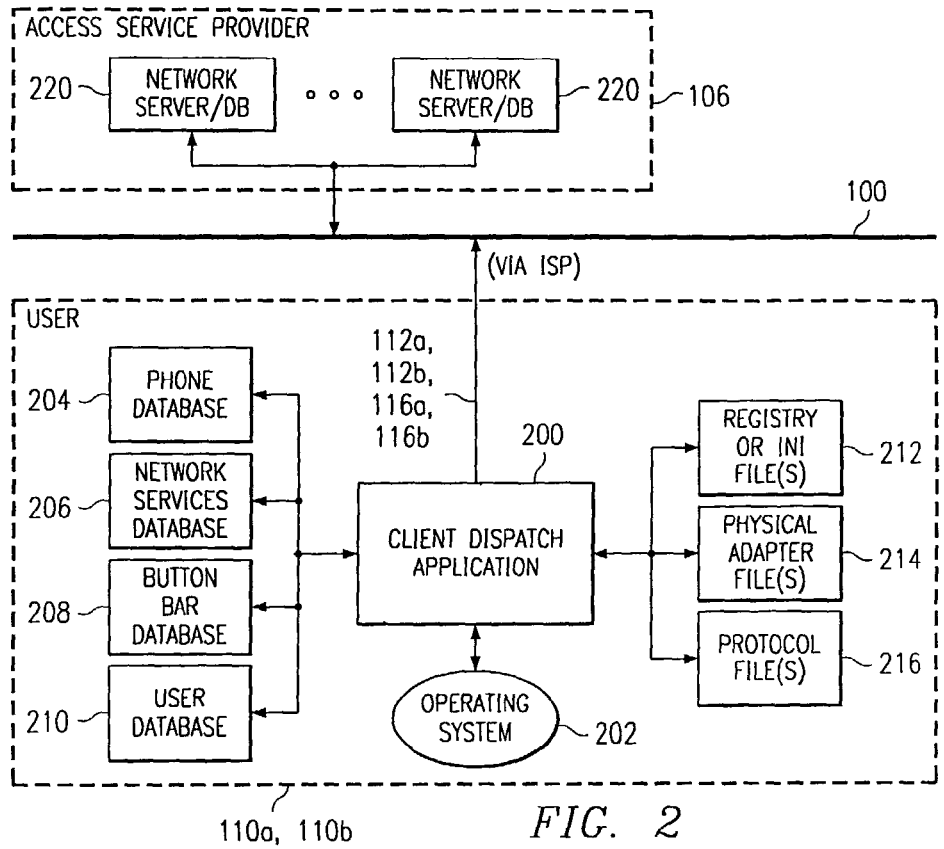
FIG. 2 illustrates in more detail the software interaction between a client and an access service provider.

Now referring to FIG. 2, there is illustrated a block diagram of the access service 106 connected to the Internet 100 and a block diagram of the user 110 connected to the Internet 100 via the ISP 102. The user 110 may be a computer system that includes the client dispatch application 200 and the computer's operating system 202, as well as a registry or initialization file(s) 212, a physical adaptor file(s) 214, and a protocol file(s) 216. The files 212, 214, 216 are operating system files (system configuration files) that provide the user 110 with system configuration information for supplying the basic capabilities needed to successfully connect the user 110 to a network, such as the Internet 100. The client dispatch application 200 correctly configures and sets the system configuration files 212, 214, 216 with the necessary system configuration information, including network protocols, adapter information, IP addresses, domain name system (DNS) server addresses, gateway addresses, other operating system binding functions, dynamic host control protocol options, and any other system options. As will be appreciated, the system configuration information necessary for the user 110 to access the Internet 100 is well known in the art.

The user 110 also includes several databases for storing information, including a phone database 204, a network services database 206, a button bar database 208, and a user database 210. As will be appreciated, the databases 204, 206, 208, 210 may be combined into a single database, may be separate, and/or may be relational. Generally, the client dispatch application 200 includes the databases, or generates the databases and stores pre-loaded information into the databases upon installation of the client dispatch application 200 on the user 110 computer.

The phone database 204 includes one or more dial-up telephone numbers for the access location(s) of each of the ISPs 102. Each dial-up number entry includes associated information including on-off field data, state (or a toll free number), city, dial-up telephone number, type of modems supported (analog or digital), whether the number is available for registration, identity of the ISP that owns the dial-in number (ID for provider), sequence number (order for putting number in a specific area). Some of the foregoing data is access information. An example of some of the contents of the phone database 204 and its data entries is set forth in Appendix A which is hereby incorporated by reference.

The network services database 206 includes access information for each dial-in number contained within the phone database 204. Each of the stored dial-in numbers is associated with an ISP 102. The access information for each dial-in number (for a particular ISP) includes one or more PAP IDs, one or more PAP passwords, default routing information (i.e., gateway address information), default directory information (including domain name server information), sub-protocols for the PPP, and configuration information for the hardware (i.e. modem of the ISP) to configure the user's modem, such as data compression information and speed. The network services database 206 may also include service option defaults such as Email IDs and the POP protocols and browser information associated with the dial-in number. The network services database 206 also includes the basic configuration and initialization information necessary to configure and manage the network communications equipment, network protocols and associated interfaces for the user 110 for basic communications between the user 110 and the Internet 100. In addition, the network services database 206 includes information relating to the type of service (type of account) requested by the user 110, such as the "lowest cost service", the "highest reliability service", the "most reliable service", or combinations thereof, plan pricing and descriptions, and includes information identifying one or more primary processes to be performed by the client dispatch application 200. As will be appreciated, some of the information in the network services database 206 and the phone database 208 may overlap. An example of the network services database 206 and its data entries is set forth in Appendix A which is hereby incorporated by reference.

The button bar database 208 includes information related to button bar creation and modification. All functions may be initiated through the human interface—a Toolbar (also described in the art as a button bar and basic examples of which may be found in many present day computer applications). The Toolbar of the present invention has some unique properties as it can be dynamically changed or updated via a Pinger process or a MOT script. As defined in this application and as will be described in more detail later, a Pinger process comprises an entity that acts transparently as a "services" coordinator to provide and/or administer the following:

1. Heartbeat service to help maintain network connectivity with a client.
2. Authentication services that securely authenticate client access to email, commerce, and other public and private network servers and services.
3. Update services that can perform client software, database, and maintenance services during periods of inactivity.

The Pinger entity, as suggested above, has, as one of its functions, the responsibility of providing database updates to the client user. When a MOT script is used, it can be part of an E-mail message, an HTTP web document download and so forth, which transparently automates the Toolbar update. The Toolbar can be integrated with ticker tape which can spawn MOT scripts, URLs, or execute programs. Each Toolbar button may be programmed with a function in the button bar database 210. The Toolbar reads a plurality, for this example five, of attributes from the button bar database 210:

1. Caption—Title or Button Name.
2. Enabled—Enables or disables the button function
3. Execution Type—This attribute supports the following types and further determines if the fifth attribute read by the toolbar would be "Execute File" (5a) or "URL" (5b)
    DDE to a URL
    DDE to a URL without going online
    Launch a Program or Script
    Launch a Program or Script and wait to complete before continuing
    Go online and then launch a program or Script
    Change Preferences
    Change Passwords
    Display Account Information
    Set Dialing Properties
    Execute a MOT script
    Jump to another Tab or Button on the Toolbar
    Reload the Toolbar's Tabs and/or Buttons
4. Hint—Button functionality description
5a. Execute File—Command line of file to be executed
5b. URL—URL for a browser to open whether remote or local When a user clicks on one of the Toolbar functions or the Ticker tape, the appropriate procedure is started. For example, if a button is programmed to go to the USA Today (button Caption) web site the Execution type would be set to "DDE to a URL" and the "URL" would be set to something similar to http://www.usatoday.com/ and the 'Hint" would be set to something similar to "Open to XXXXXXXXX Web site for the latest news!".

As will be appreciated, a MOT script defines how to build a button bar using the button bar database 210 and its database entries. The MOT script is typically associated with a Web page and when the user 110 clicks on the Web page, the MOT script associated with the Web page is read back by the client dispatch application 200. The client dispatch application 200 uses the particular MOT script and the button bar database 210 information and builds the button bar automatically according to the MOT script specifications. An example of the button bar database 208 and its data entries is set forth in Appendix A which is hereby incorporated by reference.

The user database 210 includes information related to the user 110, such as name, address, phone numbers, billing information, Email ID and Email password, type of account, and unique PAP ID and PAP password, if applicable. It will be understood that the user database 210 may be merged into the network services database 206. An example of the user database 210 and its data entries is set forth in Appendix A which is hereby incorporated by reference.

The access service 106 is connected to the Internet 100 and is defined by a predetermined and unique address (i.e., IP address). The access service 106 includes one or more network servers/databases 220. It will be understood that access service 106 includes a computer system having one or more processors, memory, and support hardware (all not shown in this figure) for processing and storing information and data communications. The network/databases 220 store information relating to the user(s) 110, including the same information that is (or would normally be) in the user database 208, and also includes session keys (transaction keys) billing data, connection history data, ISP-specific access information, and information about what procedures a user 110 has performed, and the like. Specific functions of the access service 106 have been described in the foregoing and will be described in more detail below. The Pinger entity may be a part of the access service provider 106 or it may be separate. For the present discussion, it will be assumed to be part of the access service provider 106.

After the user 110 connects to the Internet 100 via a predetermined ISP 102, the client dispatch application 200 dispatches an initial "pinger" message to the access service 106 via the Internet 100. Included within the pinger message is header information that includes the current user ID, account owner ID, PAP ID, the current IP address assigned to the user 110, Group ID, the users system's current time, database (204, 206, 208, 210) revisions levels, client dispatch application 200 and other related software revision levels.

All communications between the client dispatch application 200 and the access service 106 take place through a process identified as the Pinger. The Pinger provides secure and unsecure periodic bidirectional communication between the user 110 and the access service 106. The functions of the Pinger are as follows:

Read, Write or Update any entry in any of the databases 204, 206, 208, 210 of the user 110 and any of the databases 220 of the access service 106 and further initiate a secondary transmission when appropriate.

Execute a program or script with command line entries if appropriate.

Save a file or script and further initiate the execution of the file or script when appropriate.

Continue Transaction.

With these functions, the client dispatch application 200 can request database updates or save files for execution later, and the access service 106 can initiate events, database updates, or save files for execution later. The Pinger process also provides a "heartbeat" mechanism to prevent the premature disconnection of the user 110 from the network by an ISP 102. That is, many ISPs 102 have a modem inactivity timeout interval that disconnects users after some short interval of time if there has been no network activity during that interval of time. The heartbeat function is programmable and, in the preferred embodiment, is set at five minutes during the user's first three hours of connection time and increases by five minutes each half hour thereafter. In the heartbeat function, the client dispatch application 200 transmits the user's ID to the access service 106.

The pinger is initiated by the client dispatch application 200 upon connection to the network 100. The client dispatch application 200 transmits header information to the access server 106 using the IP address of the access server 106. The header information includes the current user ID, account owner ID, PAP ID, the current IP address assigned to the user 110, Group ID, the users system's current time, database (204, 206, 208, 210) revisions levels, and client dispatch application 200 and other related software revision levels. With this information, the access server 106 determines whether a user 110 is making two connections while only paying for one and thus needs to be disconnected, or is a user 110 that needs a database or file update. The Continue Transaction function provides a mechanism to partially transmit data and commands over multiple sessions (successive connections by the user 110 to the network 100) without having to restart the transaction from the beginning.

While the pinger process (transparent to the user) allows the client dispatch application 200 and the access service 106 to interact and download database updates (or other information) to the user 110, there is an alternative way to provide the updates to the databases, etc. at the request of the user 110. The access service 106 may provide a Web page whereby when the user 110 clicks on the Web page, a MOT script and other data associated with the Web page is transmitted from the Web page site to the client dispatch application 106. This gives the user 110 the capability to request a data update (or to receive other information). Alternatively a MOT script and other data can be transmitted via an email message, an FTP (file transfer procedure) site or other similar networking storage and transport mechanism to the client dispatch application.

Figure 8:
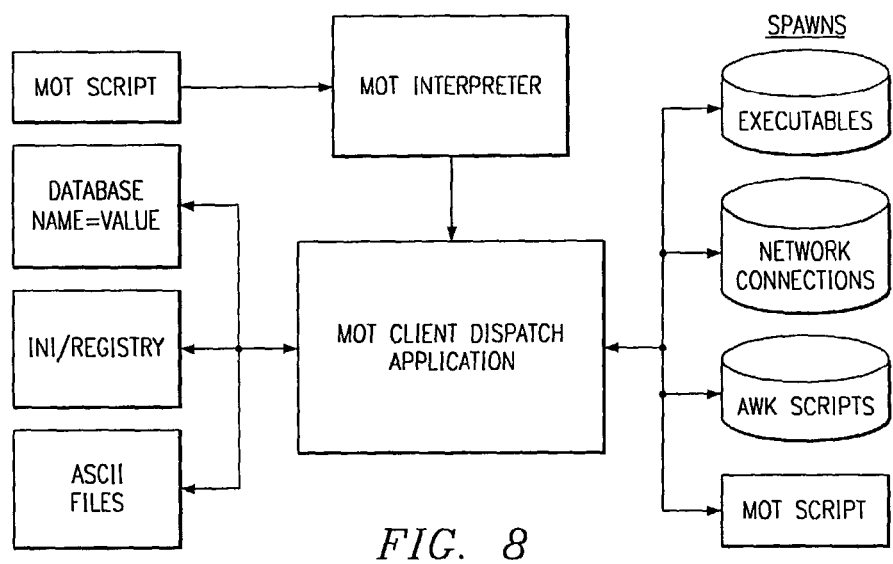
FIG. 8 illustrates a plurality of MOT (a computer script language) potential processes.

The Script Language used by the Pinger and elsewhere in this application for patent is designated by the term MOT (see FIG. 8). MOT is not, however, an acronym for anything meaningful. The script language is an interpretive language which is stored in an encrypted file from which the interpreter reads to initiate the MOT client dispatch application. The MOT client dispatch application can read and write database (db) entries, Operating System initialization file entries (INI and Registry Files), and ASCII Text files. Further, the MOT client dispatch application can spawn executable programs, network connection, AWK scripts, and other MOT scripts.

Now referring to FIGS. 3 through 7, there is illustrated the process of the client dispatch application 200. The flow diagrams of FIGS. 3-7 are representations of closed-loop programming (structured programming). The client dispatch application 200 performs five primary procedures or functions as set forth in the CASE block. These include the installation, registration, regular use, manual update, and multi-dial procedures. Within the multi-dial procedure are several sub-functions defined as the low cost, reliability, location, availability, busy-sequence, and single dial/multi-login sub-functions shown and explained subsequently in connection with FIG. 7. The client dispatch application 200 manages the procedures based upon data from one or more databases of the access service 106 or other inputs received from the access service 106, the user's databases 204, 206, 208, 210, and/or the user's computer operating system files. It will be understood that databases and database information may be encrypted to prevent a user from tampering with entries contained therein.

Figure 3:
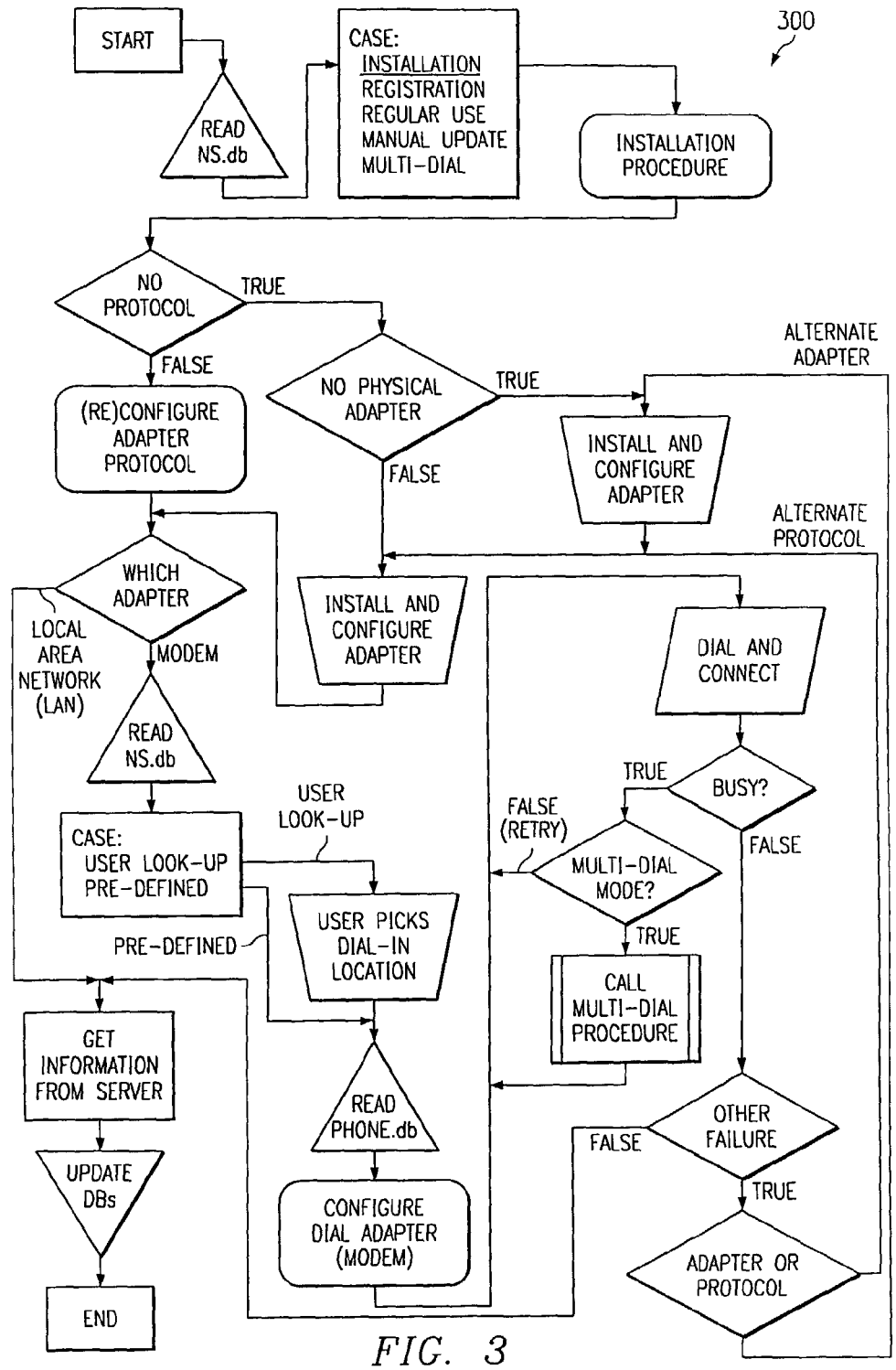
FIG. 3 illustrates a flow diagram of an installation procedure of the client dispatch application.

Now referring to FIG. 3, there is illustrated a flow diagram of an installation procedure 300 of the client dispatch application 200. The procedure 300 starts by reading information from the network services database 206. The network services database 206 forms part of the software package which is loaded into a network access device, such as the user 110 (computer). The network services database 206 includes basic configuration and initialization information necessary to configure and manage the network communication equipment, network protocols and the associated interfaces between the communication equipment and network protocols and the computer's operating system.

After the network services database 204 is read, the user's operating system files (which in the case of a Windows operating system comprises Registry and INI files, Protocol files, and Physical Adapter files) are examined to determine if any networking options have been installed and whether or not the files, if installed, are correct and configured properly as part of the "No Protocol" decision block. If no Protocol or Adapter has been installed, the "True" path will be followed whereby the Installation function will configure the Adapter and necessary Protocol to successfully connect the user 100 to a network such as the Internet 100. If the Protocol or Adapter that is installed is misconfigured, the "False" path will be used whereby the Installation function will reconfigure the Adapter and necessary Protocol to successfully connect the user 100 to a network such as the Internet 100. As part of the configuration process, it may be noted that the correct configuration for utilization of the TCP/IP Protocol would include configuring and setting the proper Operating System Registry and INI (initialization) files with the necessary Protocol configuration information in instances where the operating system is a version of windows. Such information includes: IP addresses whether statically or dynamically assigned, Domain Name System (DNS) name server addresses whether statically or dynamically assigned, Gateway Addresses whether statically or dynamically assigned, Other operating system Binding functions, Dynamic Host Control Protocol options, Windows Internet Naming Service (WINS) options whether statically or dynamically assigned, and the assignment of such Protocol functions to be utilized by the appropriate Adapter. The function of configuring or reconfiguring is executed near the beginning of each of the five primary procedural (300, 400, 500, 600, 700) tasks of the client dispatch application 200 to ensure successful operation of a network connection even for those instances where a computer user accidentally misconfigures their system and thereby makes networking inoperable.

After the successful configuration of both the Adapter and the Protocol, the procedure 300 proceeds to the "Which Adapter" decision block. The appropriate adapter is utilized which is either the adapter pre-programmed into the network services database 206 (if available) or if there is only one Adapter then it will be used. If the Adapter is a Modem, the "Modem" path will be followed to read from the network services database 204 to determine if the user 110 chooses a dial-in location under the case of "User Look-up" or if the modem shall be programmed to dial a "Pre-Defined" dial-in phone number reference in the network services database 204 and stored in the phone database 204. If a database entry in the network services database 206 is set to allow the user 110 to choose a dial-in location, then the user 110 chooses a location based on Country, State or Province, and City in accordance with the "User Picks Dial-In Location" block. After the user 110 selects the proper dial-in location, the installation procedure 300 reads from the phone database 204 to determine the dial-in phone number to use. If a given location has multiple dial-in phone numbers, a dial-in number is selected based upon attributes read from the network services database 206 (and/or the phone database 204). Such attributes include installation dial-in numbers (dial-in phone numbers which are only available during installation or testing). Although not pertinent to the installation procedure 300, other attributes of phone numbers appearing in the phone database 204 include Registration Dial-in Numbers (phone numbers and locations which appear to a user during registration), Sequence Numbers (a prioritized list of phone numbers which shall be tried in sequential order to produce the highest probability of connection), Available ISP numbers (phone numbers of a given ISP's modems), Currently Valid Numbers (phone numbers which are currently valid for use by a given users), or any combination of the aforementioned.

If a value in the network services database 206 is set for the user 110 to use a predefined dial-in number (such as an 800 type toll-free number) the client dispatch application 200 will read the appropriate predefined phone number entry from the phone database 204. After the client dispatch application 200 has determined the proper dial-in phone number, whether user selected or pre-defined, the user's modem is initialized and dialing occurs, as set forth in the "Dial & Connect" block. If the modem is busy, it will either continue to retry the same phone number or initiate a multi-dial procedure 700 (as set forth in FIG. 7) depending on the outcome of the "Multi-dial Mode?" decision block (from an entry in the network database services 206). If the "False (Retry)" path is followed, the same number is dialed until the user 110 "gives up". If a Multi-Dial mode "True" path is followed, based upon the entry in the network services database 204, the multi-dial procedure 700 is initiated and other dial-in numbers will be tried to gain access to the network. The multi-dial procedure 700 is one of the five primary procedures of the client dispatch application 200 and is explained in more detail in connection with FIG. 7.

Once a connection is made, the "False" path from the "Busy?" decision block is followed and communication with the access service 106 begins by sending an installation PAP ID and PAP password (read from the network services database 206) to the access service 106 for transparent login authentication as shown by the "Get Information From Server" block. Once the login has occurred, communication with the access service 106 is established, and transfer of data begins. The data transferred during the installation procedure 300 may contain some basic system information about the user's computer system, the type of connection being used and the location from which the connection has occurred. Once this information is received at the access service 106, the access service 106 sends appropriate information back to the client dispatch application 200. Such information may include updates to the phone database 204 including "Location" addition or subtractions, phone number changes, and updates to the network services database 206 including ISP additions and subtractions, group, user, or multiple user specific configuration, DNS and IP information, etc. Updates to the databases 204, 206, 208, 210 which reside on the user's computer can occur transparently to the user 110 whenever the user 110 is connected to the Internet 100; thereby ensuring that the user's network related information is always current and accurate. Any updates received from the access service 106 are written to the appropriate database (i.e. network services database 206, phone database 204, or others) by the client dispatch application 200. The client dispatch applicationtion 200 also updates the network services database 206 to reflect "installation complete". Thus, the client dispatch application 200 is informed that the next execution "Case" to start is "Registration" as will be shown in FIG. 4.

At this point, the dial-in location attributes (Installation dial-in numbers, Registration Dial-in Numbers, Sequence Numbers, Available ISP numbers, Currently Valid Numbers) provide control mechanisms to ensure that a user 110 receives the appropriate level of service for which they are subscribed such as "the lowest cost service", "the highest reliability service", "the most available service", or combinations thereof. Further, these updated and database stored attributes allow for remote testing of the network communications (full connection TCP/IP test to the Internet 100), the user's system for basic configuration, database integrity, network load balancing and the reduction of fraud by dynamic control of phone number validity.

If the Adapter used to connect to the network is a Local Area Network device such as an Ethernet card, the "LAN" path is followed from the "Which Adapter" decision block. In this situation, once communication with the access service 106 is established, transfer of data and updates begin as described in the paragraphs above.

Figure 4:
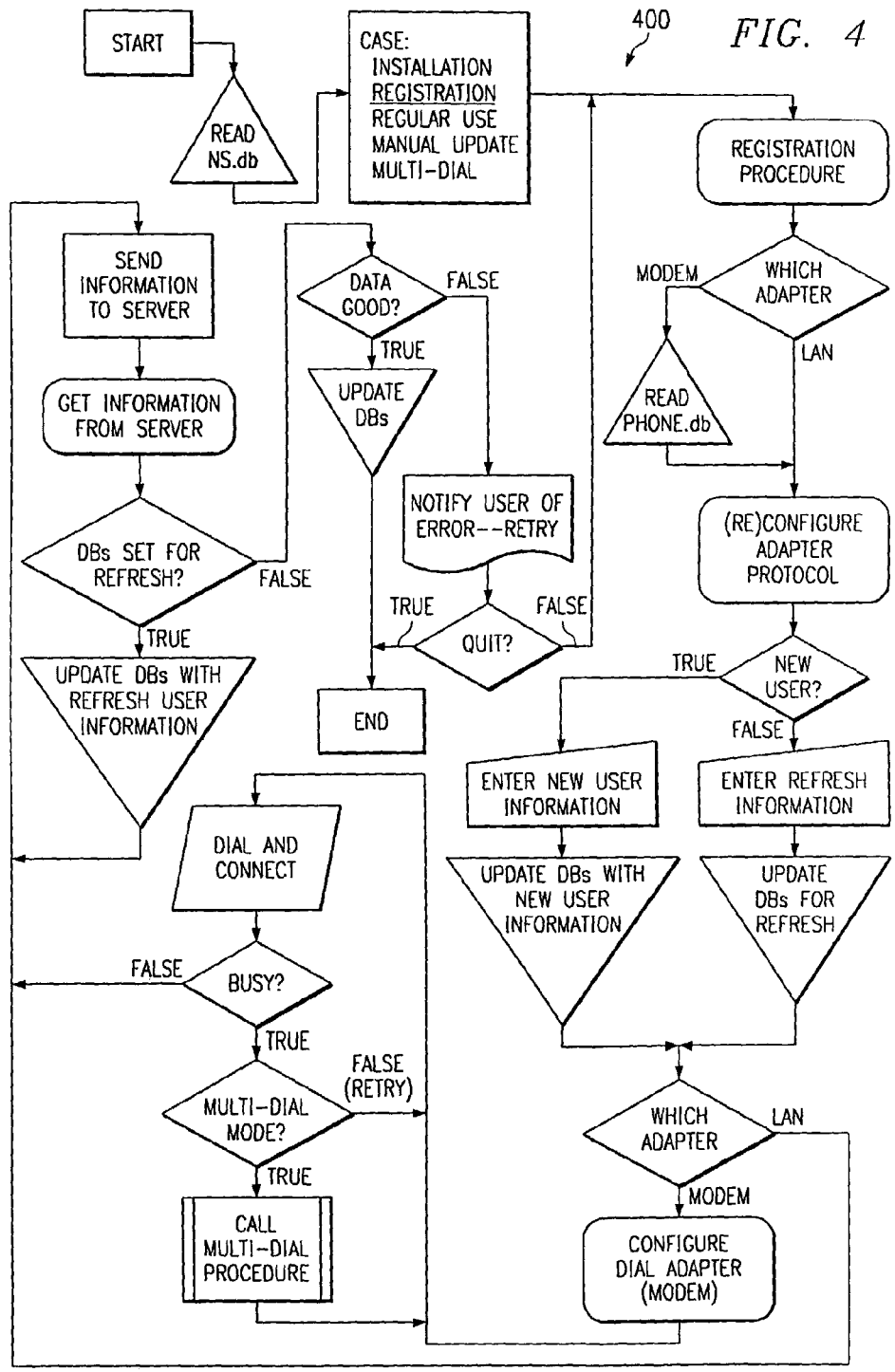
FIG. 4 illustrates a flow diagram of a registration procedure of the client dispatch application.

Now referring to FIG. 4, there is illustrated a flow diagram of the registration procedure 400 of the client dispatch application 200. The procedure 400, as all primary procedures, starts by reading the network services database 204 to determine the appropriate execution "Case", and in this case, the registration procedure 400. The registration procedure 400 starts by reading the network services database 206 to gather the necessary information, such as which Adaptor and Protocol to use and proceeds to configure and initialize the appropriate networking functions to start the user registration process. A "Which Adapter" decision block includes the two paths of "Modem" and "LAN". After a determination is made as to which Adapter and Protocol to use, the process proceeds to the "(Re)Configure Adapter Protocol" block to configure and initialize the appropriate networking functions to start the user registration procedure 400 (i.e. configuration process for the user's computer).

The registration procedure 400 comprises several forms (pop-up forms) into which the user 110 enters specific information about the user 110. Such information typically will include Name, Address, Phone Numbers, Credit Card and/or Banking Information, Referral Information (if available), Personal Security information (like: mother's maiden name), Birthdate, and Preferred E-mail Identity and Preferred E-mail Domain Choice. The registration information for each user 110 is stored in the network services database 106 and/or a user specific database 210, as well as information about the user's system and revision levels of the client dispatch application 200 and databases (204, 206, 208, 210). Upon completion of the new user registration forms as indicated by the "Update DBs with New User Information" block, the client dispatch application 200 initiates communications with the access service 106 as described earlier. The adapter used, as determined by the lower most "Which Adapter" decision block, will be the adapter determined and used during the installation process. Once communication with the access service 106 begins, the client dispatch application sends all the information that was added or updated into the network services database 206 (or user database 210) of the user 110 to the access service 106 as indicated by the "Send Information To Server" block. The access server 106 transmits the received information plus additional information, such as one or more user assigned PAP IDs and PAP passwords, Email IDs and Email Passwords, back to the client dispatch application 200 for comparison and verification of the information that was sent as indicated by the "Get Information From Server" block. If the information returned is not identical to the information which was sent, the client dispatch application will resend the information again to the access service 106 along the path commencing with the "Notify User of Error-Retry" block. This process will continue until all transmitted information from the client dispatch application 200 to the access service 106 matches all information returned to the client dispatch application 200 from the access service 106 or when a maximum retry value is reached in accordance with the "Quit?" decision block. In the preferred embodiment, the maximum retry value is five. If the client dispatch application 200 reaches a maximum retry value, an error message is sent to the user 110 notifying the user that an Error has occurred and to try reconnecting or registering again. This error message comprises a part of the "True" path output of the "Quit?" decision block.

It will be understood that registration procedure 400 may be designed to have an alternate process of prompting the user 110 to use an alternate Adapter or Protocol and then retry where such an alternate process may be deemed appropriate.

If other users (sub-users) are permitted to access the network under this initial user's authority, such as other family members, the registration process for these other users can be started during a regular use procedure 500 described in connection with FIG. 5. Upon completion of a user's initial registration, the user's network access display device will display an Electronic Registration Number (ERN) which, with other personal security information, can be used later to refresh a system as described below.

The registration procedure 400 also allows users registered with the access service 106 to temporarily use a computer or other network access device or permanently use a secondary network access device by using a refresh function which bypasses the standard registration form screens by asking the user if they have already registered. If the user has previously registered, the refresh process of the registration procedure 400 will connect, communicate with the access service 106 and download all the user information sent during the user's initial registration and the client dispatch application 200 will update the appropriate databases (204, 206, 208, 210) on the user's network access devices storage system.

Figure 5:
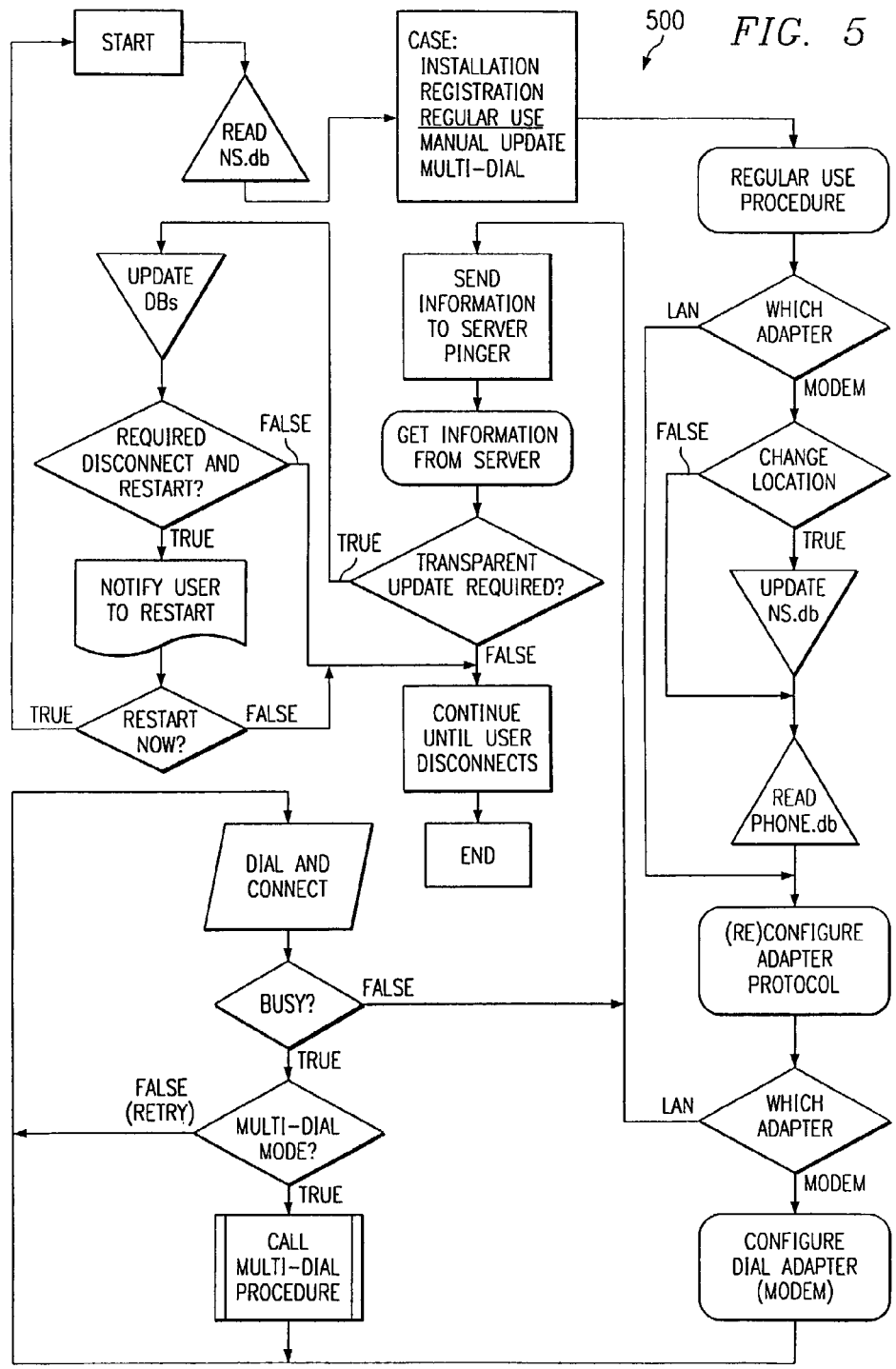
FIG. 5 illustrates a flow diagram of a regular use procedure of the client dispatch application.

Now referring to FIG. 5, there is illustrated a flow diagram of a regular use procedure 500 of the client dispatch application 200. The regular use procedure 500 is enabled after a user 110 has both installed client dispatch application 200 on a particular computer system or other network access device and registered with the access service 106.

The regular use procedure 500 functions to connect a user 110 to the network 100 using a login and password access which is transparent to the user 110. This is accomplished by reading the network services database 206 for login information such as the user PAP ID and PAP password as shown in the "Read NS.db" block. After reading the necessary information from the network services database 206 and prior to the user 110 logging onto the network 100, the user 110 is given an opportunity to change the user's dial-in Location if the user 110 is using a modem as an Adapter, as illustrated by the "Change Location" decision block. If the Adapter is a modem, and the user 110 desires to change locations, the user 110 is presented with a "chooses a location" form that may be identical to one seen by the user 110 during registration. The "chooses a location" form allows the user 110 to select a local dial-in location from pull down menu selections based on Country, State or Province, and City selections for a given ISP 102 for which the user PAP ID and PAP password are valid.

After the user 110 selects the proper dial-in location, the phone database 204 is read to determine what dial-in phone number to use.

If a given location has multiple dial-in phone numbers, a dial-in number is selected based upon attributes that are read from the phone database, user db, network services database 206 or any combination thereof as part of the "Dial & Connect" block. As discussed elsewhere, and in particular in connection with FIG. 3, such attributes include Installation dial-in numbers (dial-in phone numbers which are only available during Installation or testing), Registration Dial-in Numbers (phone numbers and locations which appear to a user during registration), Sequence Numbers (a prioritized list of phone numbers which shall be tried in sequential order to produce the highest probability of connection), Available ISP numbers (phone numbers of a given ISP's modems), Currently Valid Numbers (phone numbers which are currently valid for use by a given users), or any combination of the aforementioned.

After the user 110 establishes a connection to the access service 106, a "pinger" function is initiated as discussed previously. The pinger function causes the client dispatch application 200 to transmit header information to the access service 106, as set forth in the "Send Information To Server (Pinger)" block. The header information may include a Unique Identification string for the user (user ID, PAP ID, etc.), a unique computer identification string (IP address, etc.), time stamp information, and revision information for the client dispatch application 200 and databases 204, 206, 208, 210, as described earlier. After receipt, the access service 106 reviews the header information to determine what, if any, updates are required to be made to the user client's dispatch application, databases, or network access devices operating system. Such updates may include: new dial-in locations, new identification information such as PAP IDs, network authentication passwords such as PAP passwords, other IDs, other passwords, change of phone numbers, change of area codes, low cost ISP, dial-in location priority sequence numbers, or any combination thereof, or any other information relating to gaining access to the ISP 102. If any updates are required, these are supplied by the access service 106 and any necessary updates will take place transparent (automatic while the user is logged on) to the user 110 as part of the "True" process path emanating from the "Transparent Update Required?" decision block. If such updates require user intervention, such as rebooting the user's computer, the user 110 will be notified prior to the update and/or prior to a reboot as part of the "Notify User to Restart" block. Updates which require a lot of time, may span multiple log-ins (to the network 100) by the user 110 with partial updates being performed until the full completion of the update. The partial updates will take place when the users system is connected but idle and/or during a "pinger/heartbeat" function.

Figure 6:
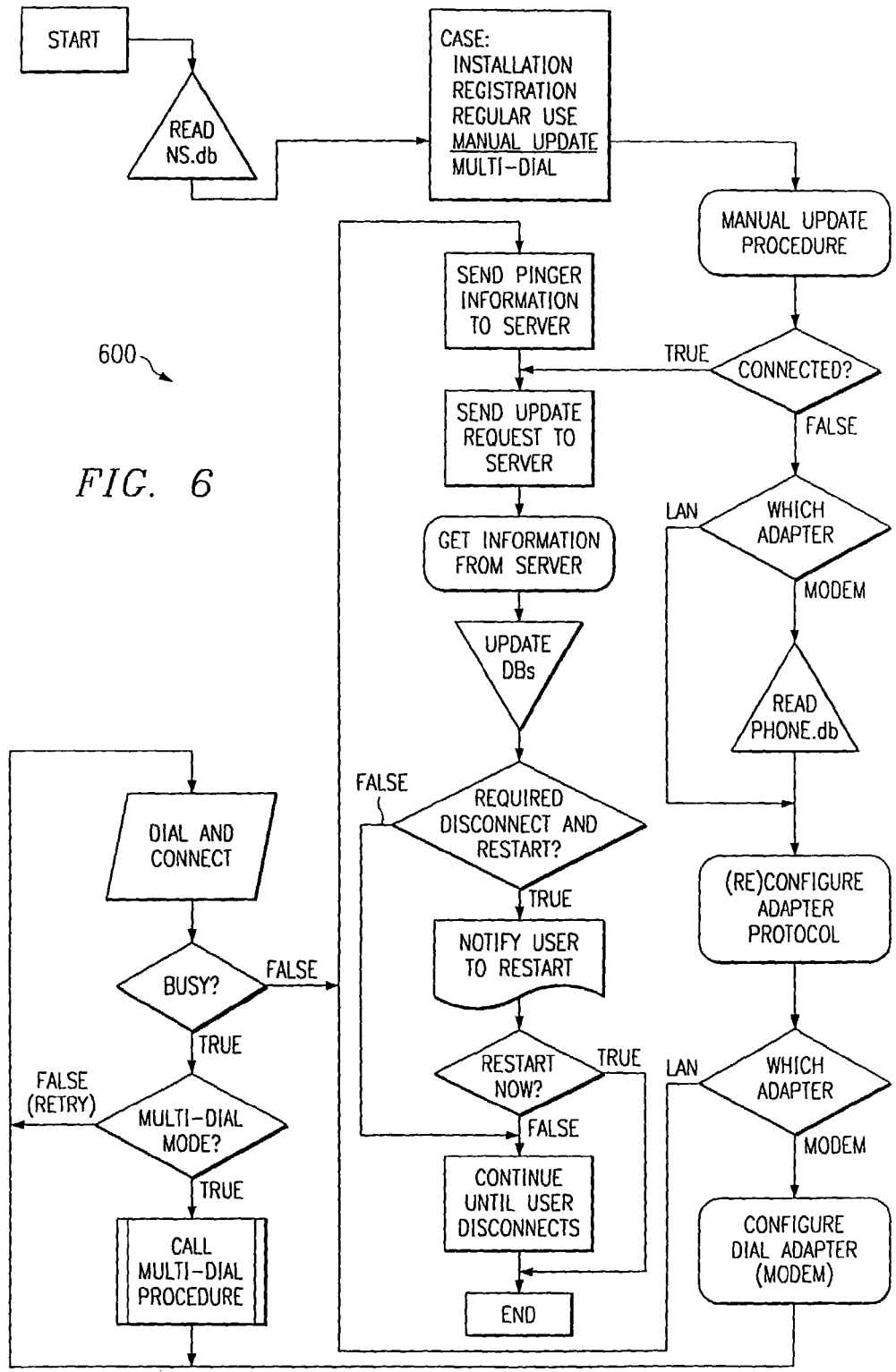
FIG. 6 illustrates a flow diagram of a manual update procedure of the client dispatch application.

Now referring to FIG. 6, there is illustrated a flow diagram of a manual update procedure 600 of the client dispatch application 200. The manual update procedure 600 provides a mechanism for a user 110 to manually recover, change, modify or update the client dispatch application 200 and the databases 204, 206, 208, 210. This capability is useful for ISPs managing customers with billing issues, as well as for servicing customers with special system configuration issues.

The manual update procedure 600 initiates and makes a network connection using a special set of log-in information defined herein as the "Manual Update PAP ID and PAP password" (the manual update PAP ID and PAP password, including the Installation, Multi-dial and Test PAP IDs and PAP passwords are incorporated into the user's installed client dispatch application 200 as part of the network services database 206 and are not easily accessible to the user 110). If a connection is not immediately obtained, the adapter and protocol checking is completed as set forth in connection with the previous Figure (and description thereof) and as set forth in this flow diagram, via the "False" path output of the "Connected?" decision block. Once the connection is established, either via the "LAN" path from the "Which Adapter" decision block or the "False" path from the "Busy?" decision block, the "pinger" function is initiated as indicated by the "Send Pinger Information to Server" block. If there already is a connection, the "True" path is followed from the "Connected?" decision block.

Once communication is established by the client dispatch application 200 with the access service 106, pinger header information, any special database update request, and the like, etc. is transmitted from the client dispatch application 200 (generated from the network services database 206 and/or the user database 210) to the access service 106, as shown by the "Send Update Request to Server", in order to establish the identity of the user 110 and system that is requesting an update of information from the access service 106. The access service 106 uses this update request information to generate any updated information which is needed to update a specific user, group of users, a specific network access device such as the computer, a group of computers, or any combination thereof and sends any required information back to the user 110 to update the appropriate databases 204, 206, 208, 210 or Registry or INI, Adapter, and/or Protocol files 212, 214, 216 (operating system files). Upon completion of the update, the client dispatch application 200 disconnects the user 110 from the network (breaks the network connection) and if appropriate, the user 110 will be notified that the network access devices operating system must be rebooted in order for the update to take effect.

Figure 7A:
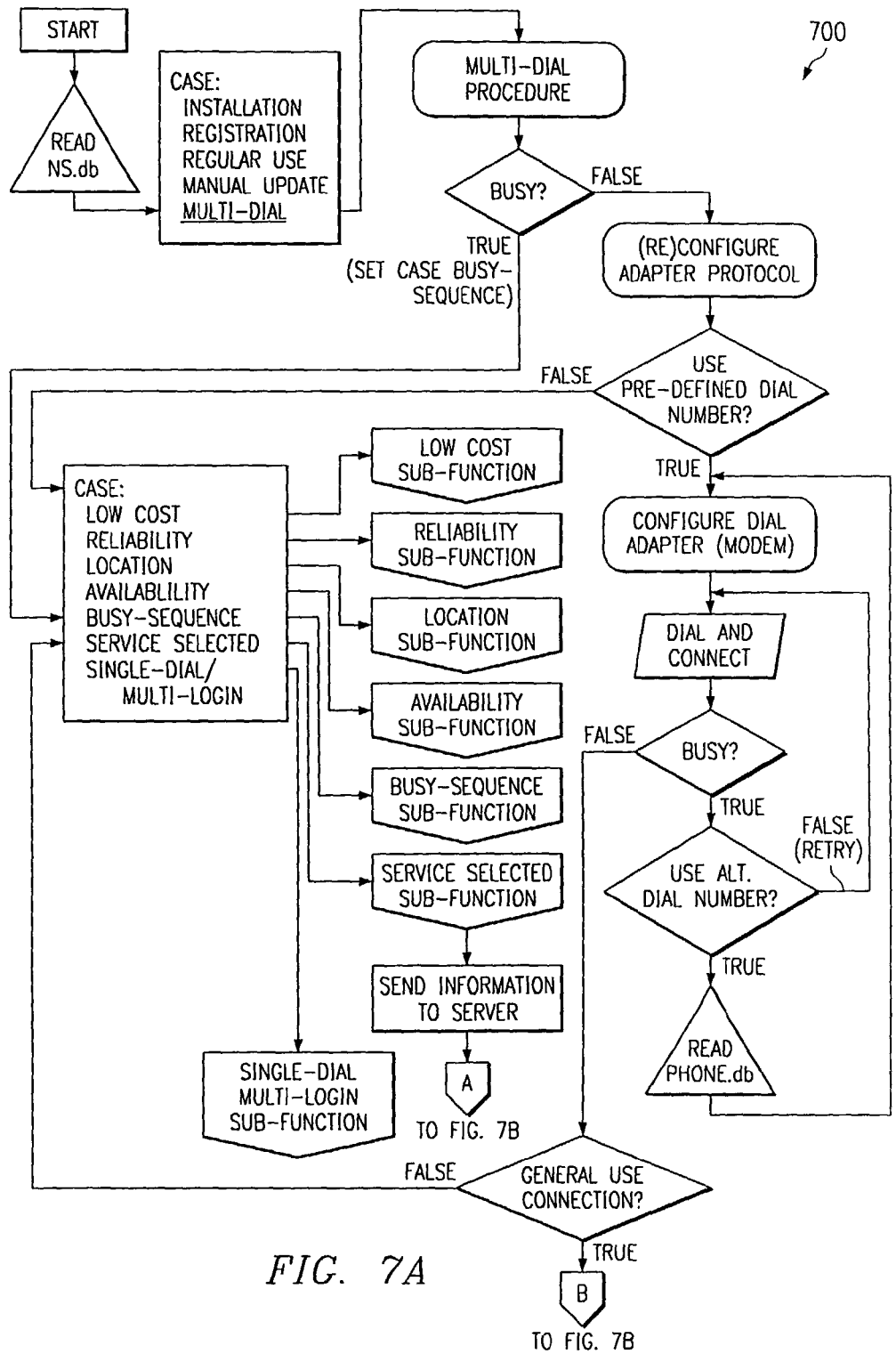
FIG. 7 illustrates a flow diagram of a multi-dial procedure of the client dispatch application.
Figure 7B:
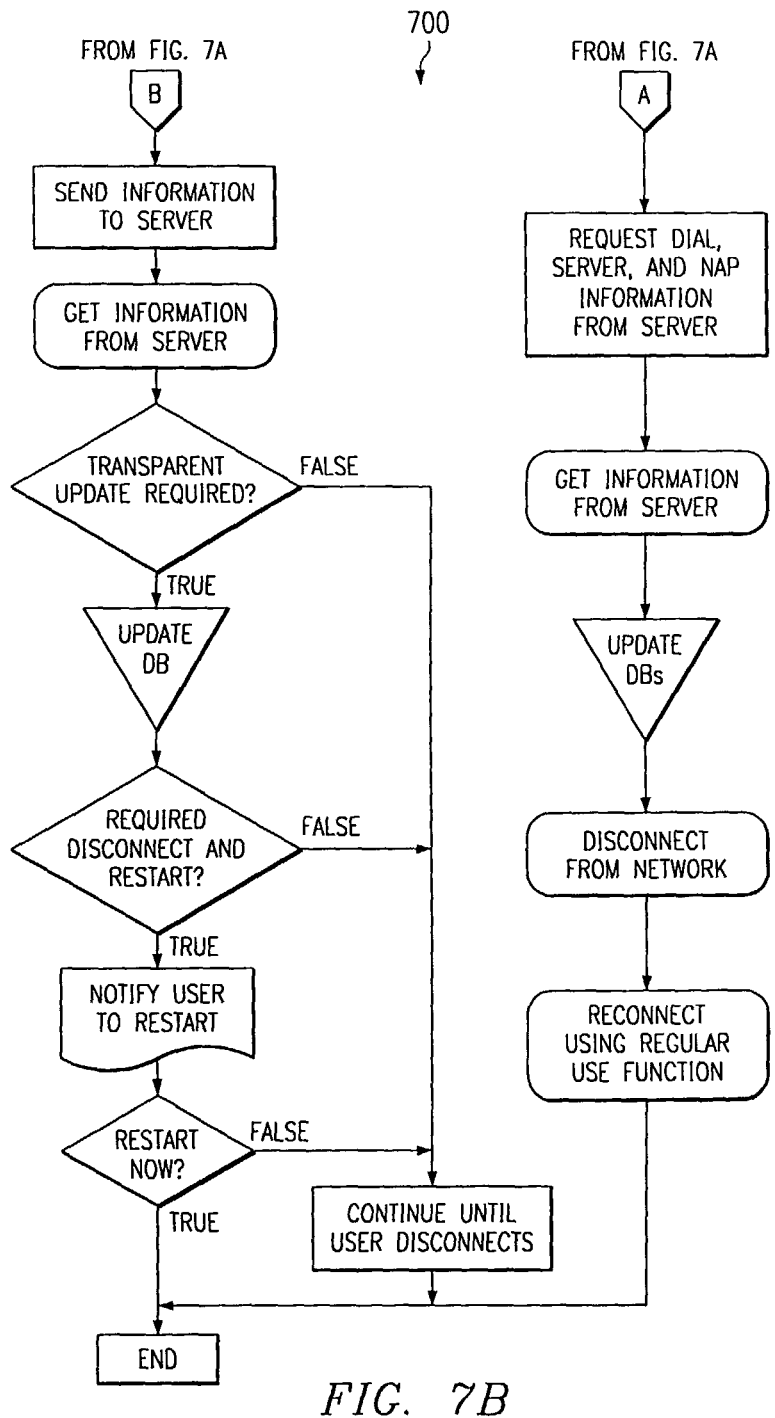

Now referring to FIG. 7, there is illustrated a flow diagram of a multi-dial procedure 700 of the client dispatch application 200. The multi-dial procedure 700 provides the access service 106 with a mechanism to control access by a user 110, a group of users, a computer, a group of computers, a local area network (LAN) of computers, or any combination thereof, to the Internet 100, based upon any one of the following seven sub-function attributes: Cost, Availability, Reliability, Location, Busy-Sequence, Service Selected, or Single Dial/Multi-Login. The multi-dial procedure 700 is initiated by one of the other primary procedures 300, 400, 500, 600 (see FIGS. 3 through 6) of the client dispatch application and/or by a multi-dial procedure tag programmed into the network services database 206.

When the multi-dial procedure 700 is initiated in response to a busy signal received during operation of one of the other primary procedures 300, 400, 500, 600 and the multi-dial procedure tag is enabled in the network services database 206, the multi-dial procedure 700 initiates a Busy-Sequence sub-function. The Busy-Sequence sub-function initiates one of the other multi-dial procedure sub-functions, re-dials the same dial-in number before initiating one of the other multi-dial procedure sub-functions, or dials a new dial-in number identified in the next sequential "area" location from a list of area locations available, all in response to database information based on the user's selected plan. The list of "area locations available" is based on the type of service plan (also found in the network services database 206) subscribed to by the user 110 and/or on PAP IDs and PAP passwords stored in the network services database 206. If the user 110 has chosen to subscribe to a higher cost plan, multiple PAP IDs and PAP passwords for multiple ISPs 102 may be stored in the network services database 206 (certain locations may only have a single ISP). As a result, a list of available dial-in locations may contain one or more dial-in numbers from one or more ISPs 102. Alternatively, multiple ISPs 102 may have PAP ID and PAP password sharing agreements allowing a single user PAP ID and PAP password entry in the network services database 206 to generate a dial-in location list from multiple ISPs 102. In any case, the Busy-Sequence sub-function sequentially attempts to make a connection to an ISP 102 at each location until either a successful connection is made or the user 110 aborts the connection attempt.

When the multi-dial procedure 700 is initiated for any reason other than a busy signal, the client dispatch application 200 reconfigures or reinstalls the system configuration adaptor and protocol information necessary for network connection. Thereafter, based on data in network services database 206, it is determined whether or not to initiate a connection attempt to the Internet 100 using a pre-defined dial-in number or location. If a connection is desired using a predefined dial-in number or location, the multi-dial procedure 700 uses one of four types of possible PAP IDs and PAP passwords. These types are defined as a "multi-dial PAP ID and PAP password", a "group PAP ID and PAP password", a "user PAP ID and PAP password", and a "test PAP ID and PAP password."

When both the "pre-defined dial-in number" entry and a "General Use" entry are enabled in the network services database 206, a general use connection to the Internet 100 is established using either the "group PAP ID and PAP password" or the "user PAP ID and PAP password." When the "pre-defined dial-in number" entry is enabled and the "General Use" entry is disabled, then the multi-dial procedure 700 establishes a connection to the Internet 100 using either the "multi-dial PAP ID and PAP password" or the "test PAP ID and PAP password". In either case, the user's dial adaptor (modem) is configured with the ISP-specific access information associated with the predefined dial-in number. After proper configuration, the client dispatch application 200 automatically dials and attempts connection to the ISP 102. If the line is busy, it is determined whether an alternate dial-in number should be used. If an alternate number is not to be used, the dial and connect is retried with the previous dial-in number. If an alternate number is to be used, the alternate dial number is read from the phone database 204 and the user's dial adaptor (modem) is configured with the ISP-specific access information associated with the alternate dial-in number.

Upon successful connection, if the connection is not a "general use" connection, the Service Selected sub-function is initiated (a double dial procedure). If the connection is a "general use" connection, the client dispatch application 200 transmits pinger header information to the access service 106. In response, the access service 106 transmits information to the user 110 (client dispatch application 200). The multi-dial procedure 700 determines from this received information whether a transparent update is needed (i.e., update information in the database(s) without user intervention). If so, the client dispatch application 200 updates the database(s) and determines whether a disconnect is required. If not, the user 110 continues regular use until disconnected by some other means. If so, the user 110 is notified and may be given the option to choose to disconnect or may be forced to disconnect.

If after a connection is made and the user 110 has used a PAP ID and PAP password that is used by another in order to establish the user 110 connection, then the access service 106 updates the user's database(s) (possibly with a new and valid PAP ID and PAP password) and the client dispatch application 200 either disconnects the user 110 (and notifies the user 110 that the PAP ID is not valid) or allows the user 110 to stay connected (if the user 110 has received a new and valid PAP ID). This particular process also applies to the regular use procedure 500 (see FIG. 5).

In the preferred embodiment, when a "pre-defined dial-in number" entry in the network services database 206 is disabled, then the multi-dial procedure 700 executes one or more of the seven sub-functions in response to entries in the network services database 206.

The Service Selected sub-function reads pinger header information from the network services database 206 and the user database 210 and sends this information in a data message to the access service 106 (to the network server/database 220). The access service 106 uses the information to generate database updates (including new PAP ID, etc.) which may or may not assign, reassign, or update ISPs, dial-in locations, PAP IDs and PAP passwords, dial-in numbers, network routing information, Adapters, Protocol, or any other information stored in the databases 204, 206, 208, 210. Such database updates are then transmitted to the user 110 and the client dispatch application 200 to update the appropriate database 204, 206, 208, 210. After the database information is updated, the user 100 is disconnected, and the Regular Use primary procedure is initiated using the updated information received from the access service 106.

The "Low Cost" sub-function obtains information from both the network services database 206 and the phone database 204 and determines which ISP 102 and what locations (dial-in phone numbers for local access) have the lowest priced service for a given user's dial-in location. The lowest cost sub-function next determines if the user's PAP ID and PAP password stored in network services database 206 are valid (compare the current user's PAP ID and PAP password with the user's currently selected dial-in location) for the ISP 102 that provides the low cost connection point-of-presence at the user's location. If the user PAP ID and PAP password are valid, the network connection sequence will dial and connect as described in the regular use procedure 500. If the user PAP ID and PAP password are invalid then this sub-function will initiate the manual update procedure 600 requesting from the access service 106 a valid user PAP ID and PAP password for the ISP's dial-in network at the user selected location. Then, the network connection sequence will dial as described in the regular use procedure 500.

The "Reliability" sub-function obtains information from both the network services database 206 and the phone database 204 and determines which ISP 102 and what locations (dial-in phone numbers for local access) have the highest reliability of connecting the user to the Internet 100. This determination is based upon prior data (reliability data) transmitted to the client dispatch application 200 from the access service 106 that is used to update the user databases. This data transmission occurs during a previous session when the user 110 is connected to the Internet 100. The reliability data is transferred by the access service 106 to the users 110 who have a reliability entry enabled in their network services database 206. The reliability sub-function next determines if the user PAP ID and PAP password stored in the NS.db are valid (compare the current user's PAP ID and PAP password with the user's currently selected dial-in location) for the ISP that provides the highest reliability at the selected location. When the user PAP ID and PAP password are valid, the network connection sequence will dial and connect as described in the regular use procedure 500. When the user PAP ID and PAP password are invalid, then this sub-function will initiate the manual update procedure 600, as described in connection with FIG. 6, requesting from the access service 106 a valid user PAP ID and PAP password for the ISP's dial-in network at the user selected location. Then, the network connection sequence will dial as described in the regular use procedure 500 of FIG. 5.

Reliability refers to the ability to reliably connect on a first or second attempt (availability) and the ability to stay connected for a substantial period of time without disconnection, due mainly because of line noise problems, faulty equipment, etc. (integrity). Availability information used to determine availability of various ISPs 102 (and dial-in numbers) may include at least three types of information. The first type of information includes availability information that is received by the access service 106 from the ISPs 102 themselves (typically updated periodically). The second type of information includes information in a client histogram (client specific) that is generated by the client dispatch application 200 of the user 110. Over an extended time during which the user 110 makes more and more connections to the Internet 100 (via an ISP 102), the client dispatch application 200 keeps track of the times a connection is made on the first try, second try, etc. for each dial-in phone number (and/or ISP) used by the user 100. From this, a client-specific histogram is generated that contains information about the past history of the user's connections. The third type of information includes information in a server histogram that is generated by the access service 106. The access service 106 tracks and stores information relating to all ISPs 102 and dial-in numbers regarding past history connections. See also, the description set forth below in the availability sub-function description. As will be appreciated, the reliability sub-function may use any one of the types of availability information, or combination thereof, for determining the dial-in number (or multiple numbers in priority) that will provide the user 110 with a high reliability connection.

With respect to the integrity information used to determine the integrity of the various ISPs 102 (and dial-in numbers), there are at least two types of information. The first type of information includes information received via technical support inquiries to the access service 106 by the users 110. If the access service 106 receives a call (or calls) from users 110 regarding faulty lines and/or premature disconnects, this information can be tabulated and stored for determining integrity. Since the access service 106 stores data relative what ISP(s) 102 (and dial-in number(s)) a particular user 110 has been using (through information in the access service 106 database gained through the pinging or heartbeat process—described earlier), the access service 106 can determine which ISP(s) 102 (and/or dial-in number(s)) have relatively high and/or low integrity. In response to this information, the access service can update the user's databases with this information. The second type of information includes information automatically gathered by the access service 106 that includes a history of the number of users, how long each has been connected, and what ISP(s) 102 (and/or dial-in number(s)) to which each user has been connected (through information in the access service 106 database gained through the pinging or heartbeat process described earlier). The access service 106 can transmit the integrity data to the user 110 for use by the reliability sub-function of the client dispatch application 200. As will be appreciated, the reliability sub-function may use any one of the types of integrity information, or combination thereof, for determining the dial-in number (or multiple numbers in priority) that will provide the user 110 with a high reliability connection.

From a combination of the availability information and the integrity information, the reliability sub-function determines the dial-in number (or multiple numbers in priority) that will provide the user 110 with high reliability connection.

The "Location" sub-function obtains information from the phone database 204 and determines all the dial-in phone numbers available to a user 110 from a selected location. The location sub-function generates a list of "surrounding area" locations into which user 110 may dial. The user 110 then selects a dial-in number from this list. The location sub-function next determines if the user PAP ID and PAP password stored in the network services database 206 are valid (compare the current user's PAP ID and PAP password with the user's currently selected dial-in location) for the ISP 102 in which the user's computer will dial into the selected location. When the user PAP ID and PAP password are valid, the network connection sequence will dial and connect as described in the regular use procedure 500. When the user PAP ID and PAP password are invalid, this sub-function will initiate the manual update procedure 600 requesting from the access service 106 a valid user PAP ID and PAP password for the ISP's dial-in network at the user selected location. Then, a network connection sequence will dial as described in the regular use procedure 500 of FIG. 5.

The "Availability" sub-function generates a dial-in location (number) list based upon user PAP IDs and PAP passwords stored in the network services database 206 and the type of service plan (also found in the network services database 206) to which a user 110 has subscribed. If a user 110 has chosen to subscribe to a higher cost plan, multiple PAP IDs and PAP passwords for multiple ISPs 102 may be stored in the network services database. Accordingly, the list of available dial-in locations may contain one or more (multiple) dial-in numbers from one or more (multiple) ISPs 102. Alternatively, multiple ISPs 102 may have PAP ID and PAP password sharing agreements allowing a single user PAP ID and PAP password entry in the network services database 206 to generate a dial-in location list from multiple ISPs 102.

As will be appreciated, the availability sub-function utilizes the same type of availability information as described above in the reliability sub-function.

The availability sub-function utilizes one or more methods or the service selected sub-function to increase the probability that the user 110 at a given location will successfully connect on the first try. This functionality is based upon historical data (Histogram data) or real time data supplied by an ISP to the access service 106. The historical data may include two types of data—Client Histogram data or Server Histogram data. To accomplish the availability function, the Server Histogram data, Client Histogram data, or the service Selected sub-function is utilized, or any combination thereof is utilized, as desired.

The Client Histogram data is based upon connection history of the user 110. The Client Histogram data is not as beneficial, as other data, until a particular user 110 has consistently established a network connection (to the Internet 100) for a period of time sufficient to create a meaningful histogram. It has been determined that a period of at least ninety days is sufficient if a user accesses regularly. After a sufficient period of time, a Client Histogram can be built to determine the probability of success of the user 110 connecting to the network the first time. This minimizes the necessity of having the client dispatch application 500 perform a second dial-attempt to connect to the network 100.

The Server Histogram data is based upon the connection history of each particular ISP 102 and its dial-in numbers. This information is stored in the access service 106 in response to the monitoring of all the users 110 (through the "pinging" process). The Server Histogram data is transmitted to the user's network services database 206 upon any connection to the network 100 when the availability sub-function is enabled within the client dispatch application 200.

In the preferred embodiment, the Server Histogram data is normally used in conjunction with the Client Histogram data (when appropriate) to determine the highest probability of success of connecting to the network 100 without a second dialing attempt. Accordingly, upon the user 100 initiating a connection to the network 100, the client dispatch application 200 automatically selects a dial-in phone number that it has determined to have a high probability of success for connection. Thus, the Client Histogram data and the Server Histogram data are used to facilitate a statistical approach to determine the highest probability of a user 110 connecting to the network on the first attempt.

However, there may be times when a user 110 desires a very high confidence (near 100% or 100%) connection, or the Histogram data is not desired to be used, such as when the data for a particular area is unreliable (i.e. certain geographic areas may have insufficient telecommunications infrastructure that may skew the data) and therefore possibly useless. In these cases the service selected sub-function is initiated and a "double dial" process takes place (see FIG. 7 and the description of service selected sub-function). In the service selected sub-routing, availability information of ISPs 102 is used by the access service 106 to give the user 110 a dial-in number that is available. This availability information for the ISPs 102 is periodically transmitted or given to the access service 106, typically every five minutes. The "double dial" process is also exemplified in FIG. 7 and the accompanying text.

The last sub-function of the multi-dial procedure 700 is the "Single-dial Multi-Login" sub-function. Initiation of the single-dial/multi-login sub-function requires a "multi-dial" attempt only when the user 110 receives a busy signal; otherwise this sub-function is a single-dial function with a multiple PAP ID and PAP password assignment/reassignment function. This function (the assignment/reassignment) requires that all user (client) 110 authentication for all ISPs 102 happens at the access service 106 (i.e., all authentication for all ISPs is centralized) or at a centrally located database point. Thus, this function works with multiple ISPs 102 when each allows user authentication to take place at a centrally located server independent of each ISP's own user authentication server. For example, an ISP that has its own Authentication Server, and who resells the underlying ISPs modem access to a user 110, may support this function by allowing a user 110 to dial and connect using an "Initial Access PAP ID and PAP password", then assigning a unique session PAP ID and PAP password and "re-logging" into the Authentication server without disconnecting the user 110. This eliminates the time that would otherwise be required to disconnect and re-dial using a newly assigned PAP ID and PAP password.

The client dispatch application 200 also functions to provide users 110 with network identity anonymity. That is, the architecture of the client dispatch application 200 provides anonymity for users 110 during access to the network 100 as IDs and passwords (such IDs and passwords would include PAP IDs and PAP passwords, Email IDs and Email passwords, NEWS IDs and NEWS passwords, FTP and Web Space IDs and passwords, and custom network application IDs and passwords) can be dynamically reassigned for a given user, a given system, a given group of users, a given group of systems, or any combination thereof. Thus, if a user 110 has three computer systems (A_Computer, B_Computer, and C_Computer) each requires a unique user/system identification which is generated during installation and registration and stored in the client's network service database 206 and/or the user database 204. This unique user/system identification allows the access service 106 to maintain unique and independent IDs and passwords for the user/system pair. Thus, when a user 110 connects the A_Computer to the network, unique IDs and passwords which may be distinctly different from the B_Computer and C_Computer's IDs and passwords (stored in the network services database 206 and/or the user database 204) may be used to transparently log the user into such things as the network, Email, FTP/Web Space, NEWS groups, Bulletin Boards, or any other application requiring login identification and password. Thus, the architecture supports single life IDs and/or passwords for all network and application logins.

Figure 9:
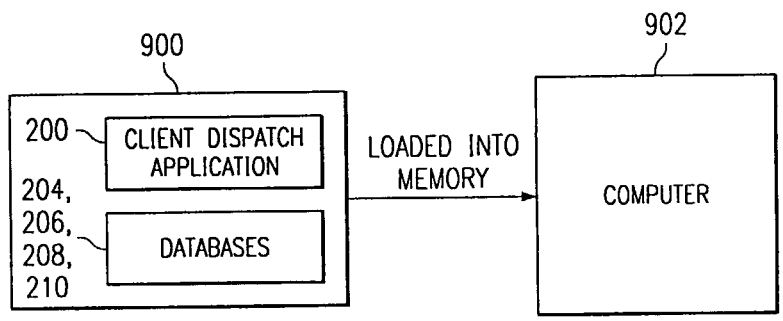
FIG. 9 is a block diagram of a storage medium comprising the client dispatch application for causing a computer to function in accordance with the present invention.

Now referring to FIG. 9, there is illustrated a block diagram of a storage medium 900 and a computer 902. The storage medium 900 includes client dispatch application 200 (computer program) and may also include the databases 204, 206, 208, 210. The computer 902 also includes a means (not shown) for reading or downloading the client dispatch application 200 (computer program) into the computer 902 to cause the computer 902 to perform one or more steps in accordance with the principles of the present invention. As will be appreciated, the storage medium 900 may include a floppy or hard disk, magnetic or optical taps; or any other data storage medium known presently or developed in the future for storing a computer program, such as the client dispatch application 200 of the present invention.

As will be realized by those skilled in the art of email (electronic mail) sent between parties on a network, email is typically held in a post office box type storage facility at the recipients ISP until retrieved by the recipient. However the ISP typically keeps a copy of the email for a period of time after receipt thereof for various purposes. Many people have the technical capability to access and read these stored messages at the ISP. Even where the message body is encrypted, considerable information may be gleaned over a period of time by keeping track of who is sending messages to whom, the frequency of messages to given parties and data gleaned from the subject matter portion of the header.

The structure of the present invention combined with an email program, software plug-in for a standard email program or browser lends itself to a method of minimizing the possibility of unauthorized gleaning of information from email and further minimizes the possibility of spamming where spamming is defined as the sending of large amounts of email to a given recipient for harassment like purposes.

One way to minimize the gleaning of information is to send all mail through a third party to recipients. The third party acts as a trusted banker or broker. Such an operation is shown diagrammatically in FIG. 10 where the sender sends the email to a Broker. The broker repackages email as deemed appropriate by agreement with the sender and/or the recipient and sends it on its way. The simplest form is to merely place the entire original message including header information in message body of the email and send the package to the recipient with the recipient also listed as the sender and placing an innocuous subject in the visible header.

A next level of security is for either the sender or the broker or both to encrypt the package sent by that party to the next party. This could result in double encryption of the message body. Similar plug-in software comprising part of the recipients email program, software plug-in for a standard email program or browser may be used to decipher the received package and the original email would then be recreated for reading by the recipient. The deciphering may be accomplished by keys transmitted by the pinger entity to the recipients software. As part of this next level of security, the email sent to the broker or third party in a preferred embodiment of this invention has the TO and FROM portions of the visible header listing the broker, has the subject changed to innocuous data and the entire original message encrypted as shown in the drawing.

FIG. 11 presents the above process in a slightly different format where a row labeled 1010 illustrates the original message composed by the sender. Either the sender of the plug-in software may then provide a first level of encryption to the data as shown in row 1012. Transparent to the user, the plug-in software then repackages the original message by encrypting the entire message and generating a new header with the third party (here the third party is listed as NetSafe) listed as both the sender and the recipient. The email sent to the broker is labeled 1014. Since the broker is in contact with the data bases in the plug-in software via the pinger entity, the broker may decipher to second layer of encryption to determine the destination address. The broker may then re-encrypt and send the email 1018 if the recipient is also a client of that broker and/or has similar plug-in software in contact with a network pinger. Otherwise, the originally composed, and possibly encrypted, message is sent to the recipient as shown by the labeled message 1020

Figure 12:
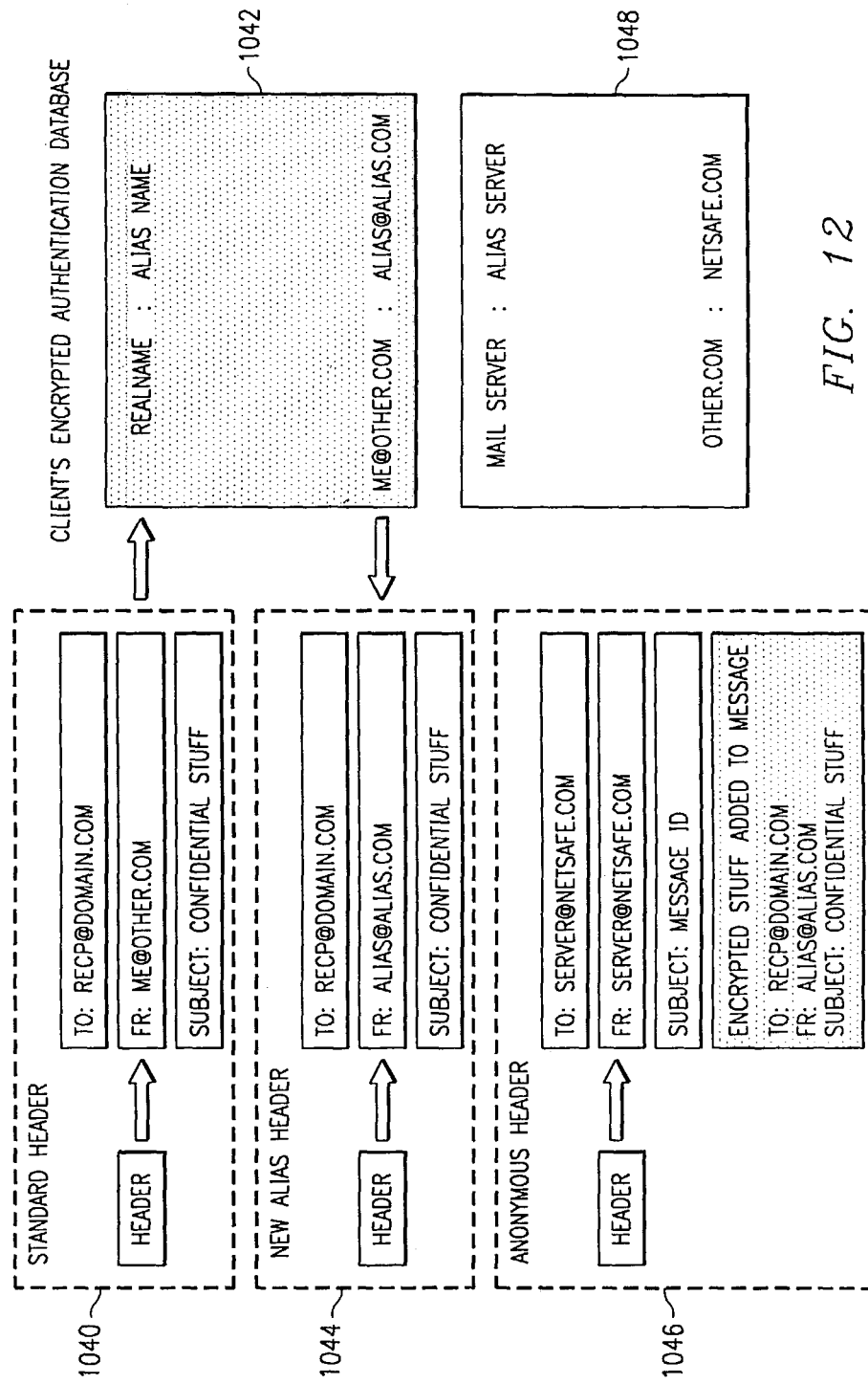
FIG. 12 shows details of sender plug-in software process for email transmission that is more secure than that shown in FIG. 11.

There may be times that the sender of email may not want the recipient to know the senders true identity or even the network service provider of the sender. Alternatively, the sender may wish to use different aliases or names for different classes of email contacts so that the sender may quickly sort incoming mail into a set of priority stacks. Further the recipient of email in a system using the present invention may have similar requirements. FIG. 12 illustrates a second order anonymity header process for email transmission.

In this figure a block 1040 represents a standard header of email composed by the sender. When the sender has completed the email and posts it, the senders email program, software plug-in for a standard email program or browser plug-in intercepts the email and checks the appropriate database. It is determined in block 1042 that for identity "me@other.com" the address "alias@alias.com" should be used. The plug-in software thus creates a new header in substitution for the one composed by the sender and encrypts the entire message including the altered header as shown in the lower portion of block 1046. The software then consults the database represented by block 1048 and determines that the most recent data received from the pinger entity suggests that the network service provider to be used for "other.com" in this instance should be "netsafe.com". Accordingly, a new anonymous header is prepared in accordance with that shown in block 1046 before the message is forwarded to a third party for retransmission to the recipient.

Figure 13:
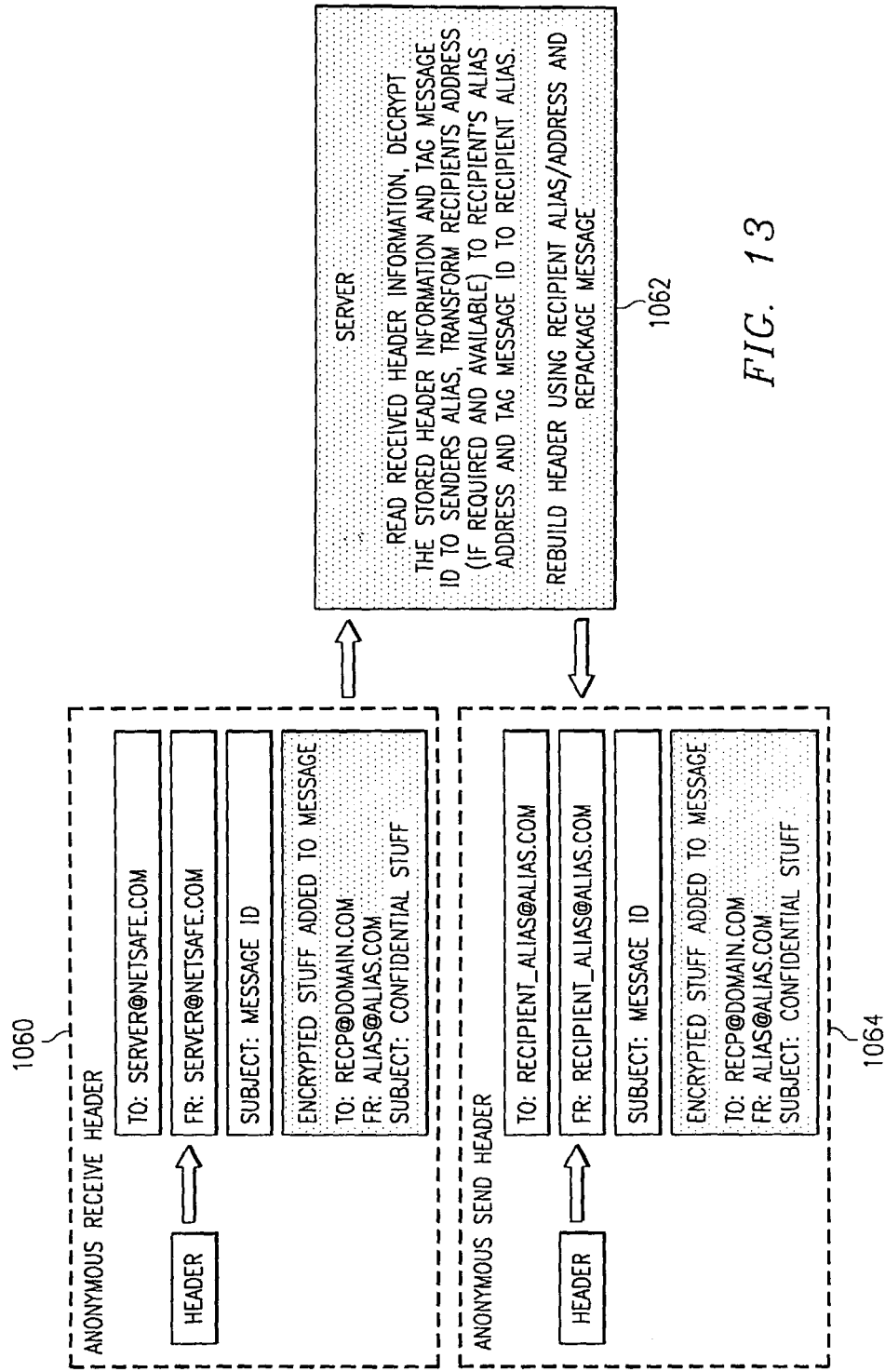
FIG. 13 shows details of the process of FIG. 12 at a third party site.

As shown in FIG. 13, the third party or broker receives the email as represented by block 1060 where 1060 is identical to block 1046. The software in the server of the third party, as set forth in block 1062, decrypts the stored header information after noting the form of the visible header information. It is able to do so because the pinger entity that determines the encryption code to be used in the senders encryption process and provides the senders database with the third party to be used, also informs the third party the encryption code to be used for deciphering. This code may be part of the visible message id or may be inserted in the server database of that specific third party. If the recipient has signed up for anonymity service, the server will retrieve from its database a presently assigned alias for the recipient. Whether or not an alias is used for the recipient, the third party server will rebuild the header using an address for the recipient in both the TO and FROM portions of the visible header as shown in block 1064.

Figure 14:
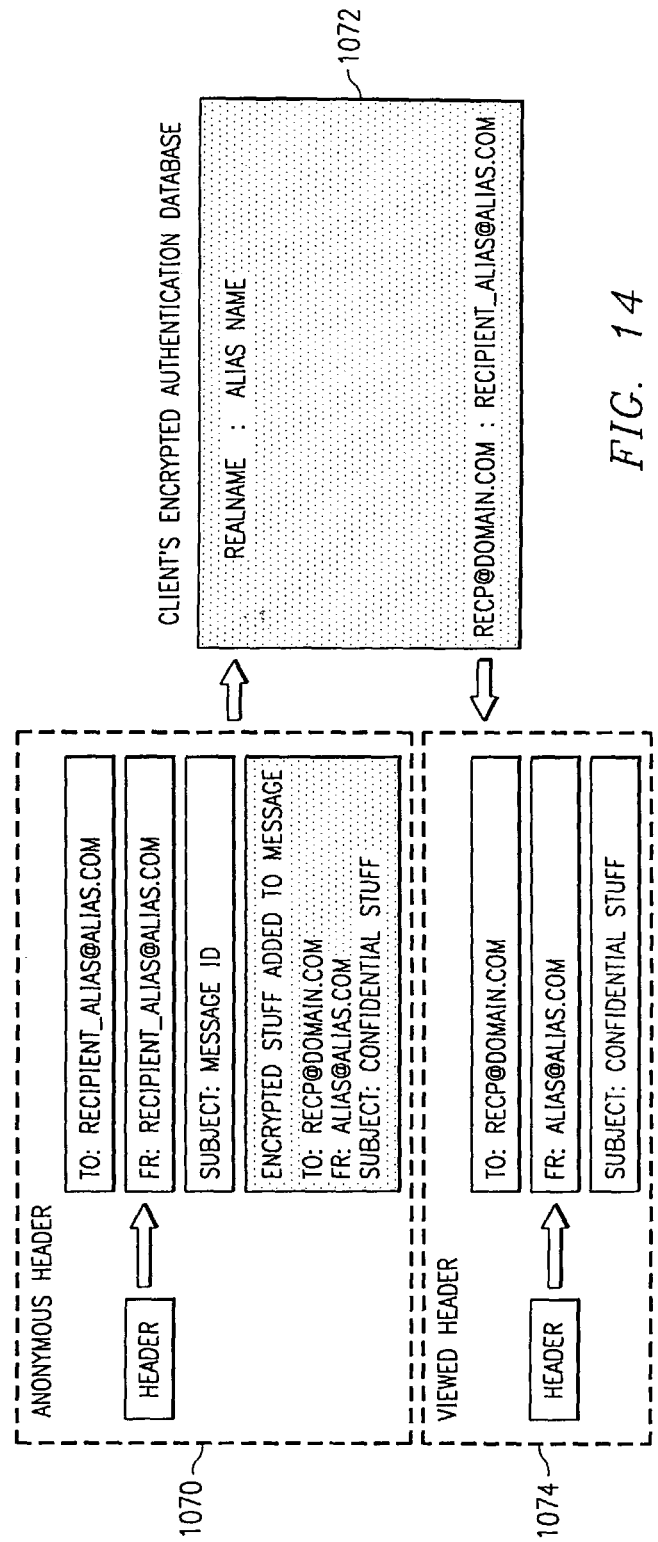
FIG. 14 shows details of the process of FIG. 12 at a recipient site.

FIG. 14 presents a block 1070 representing a received email as retrieved from the server storing email for alias.com. This message is identical to the previously designated block 1064. The recipients software checks the database and in accordance with block 1072 deciphers the message and creates the viewable header set forth in block 1074.

Figure 15:
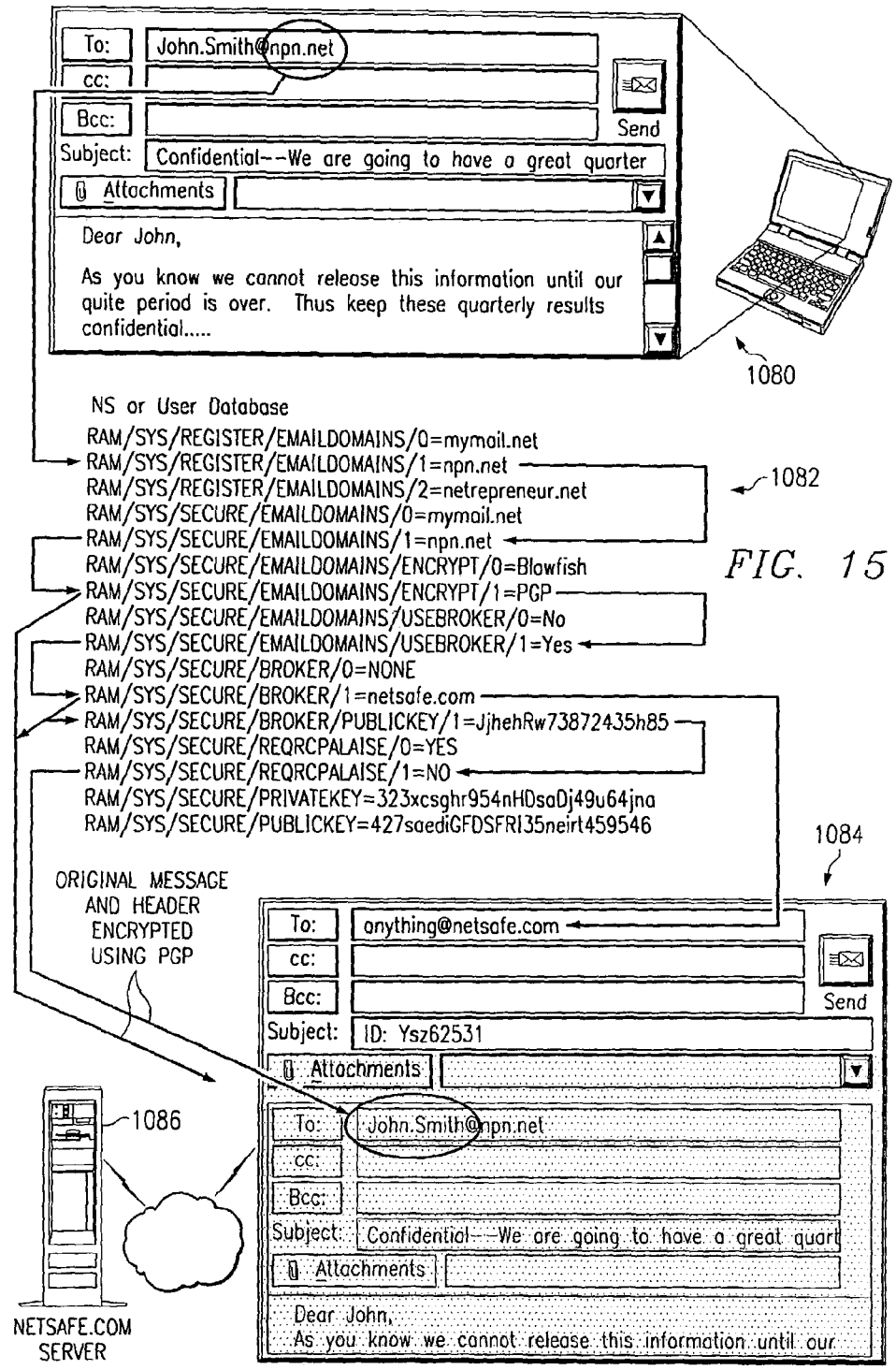
FIG. 15 shows the process of FIG. 12 as applied to a changeable internal database.

FIG. 15 shows a sender composed message designated as 1080 and a partial representation of a sender computer stored database 1082 along with a revised message 1084 wherein block 1084 corresponds with previously designated block 1046 in FIG. 12. The software checks the database and notes the subscript 1 for the server listed as "npn.net" in the registered email domain portion of the database. The same subscript is checked under the SECURE/EMAILDOMAIN portion to determine whether or not to encrypt the message, the encryption code whether or not to use a third party and if so the address to be used. As may be observed by the arrow lines, for npn.net, a PGP encryption is to be used, a broker is to be used and the broker listed with a subscript "1" is "netsafe.com". Thus "netsafe.com" is inserted in the visible header of the message shown as 1084. The database also specifies the public key to be used for the encryption and deciphering processes. The NO in the third to the last line of the illustrated database 1082 provides an indication that the sender wants the recipient to be advised of the senders name as composed on his computer. This is in contradistinction to that shown FIG. 12 previously. When the server 1086 receives the message 1084, it will consult a database similar to that illustrated as 1082 and perform the functions set forth in FIG. 13

The generation of software for intercepting a message, consulting a database, altering header data in accordance with the database, encrypting the entire message including the altered header and then creating a new header before sending the entire data package is well within the capability of anyone skilled in the art of network computer programing in view of the presentation in FIGS. 10-15 and the accompanying explanatory material. As will be apparent, the software will be different for each different operating system email program, software plug-in for a standard email program or browser and thus no pseudo code or detailed flow diagram has been presented herein.

Figure 16:
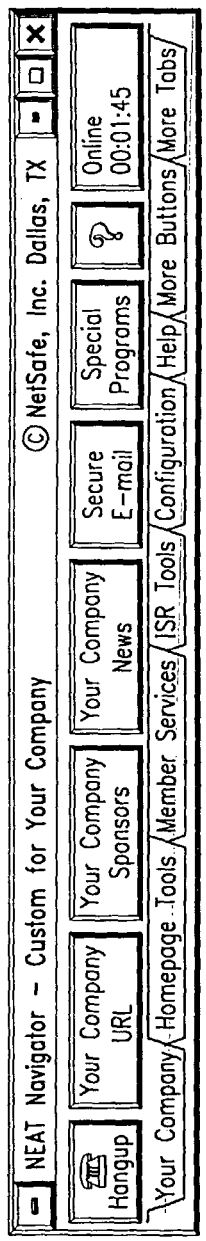
FIG. 16 illustrates a an example of a customized button bar that may be generated using the MOT script in accordance with the teachings of this invention.

FIG. 16 provides a simplified example of a button bar, power bar, or tool bar that can be generated using the referenced MOT script language in combination with data retrieved from the data bases. If a client were traveling away from home and accessed the network from New York, this information would be provided to the pinger entity. If the client then logged onto a web page of an airline who was also a client of a service using the present inventive components, the web page could be programed, since data would be available that the clients home was for example Dallas Tex., to immediately bring up a list of all flights leaving New York and bound for other destinations that the client had regularly traveled to in the recent past such as Dallas. The MOT generated bar or graphic in one implementation including a moving display. Such a display may provide advertising or information like ticker tape like stock market data.

In FIG. 17, an illustrative commentary is provided of the databases and their contents upon initial installation of software of a new client wishing to access the services of the present invention.

Figure 18:
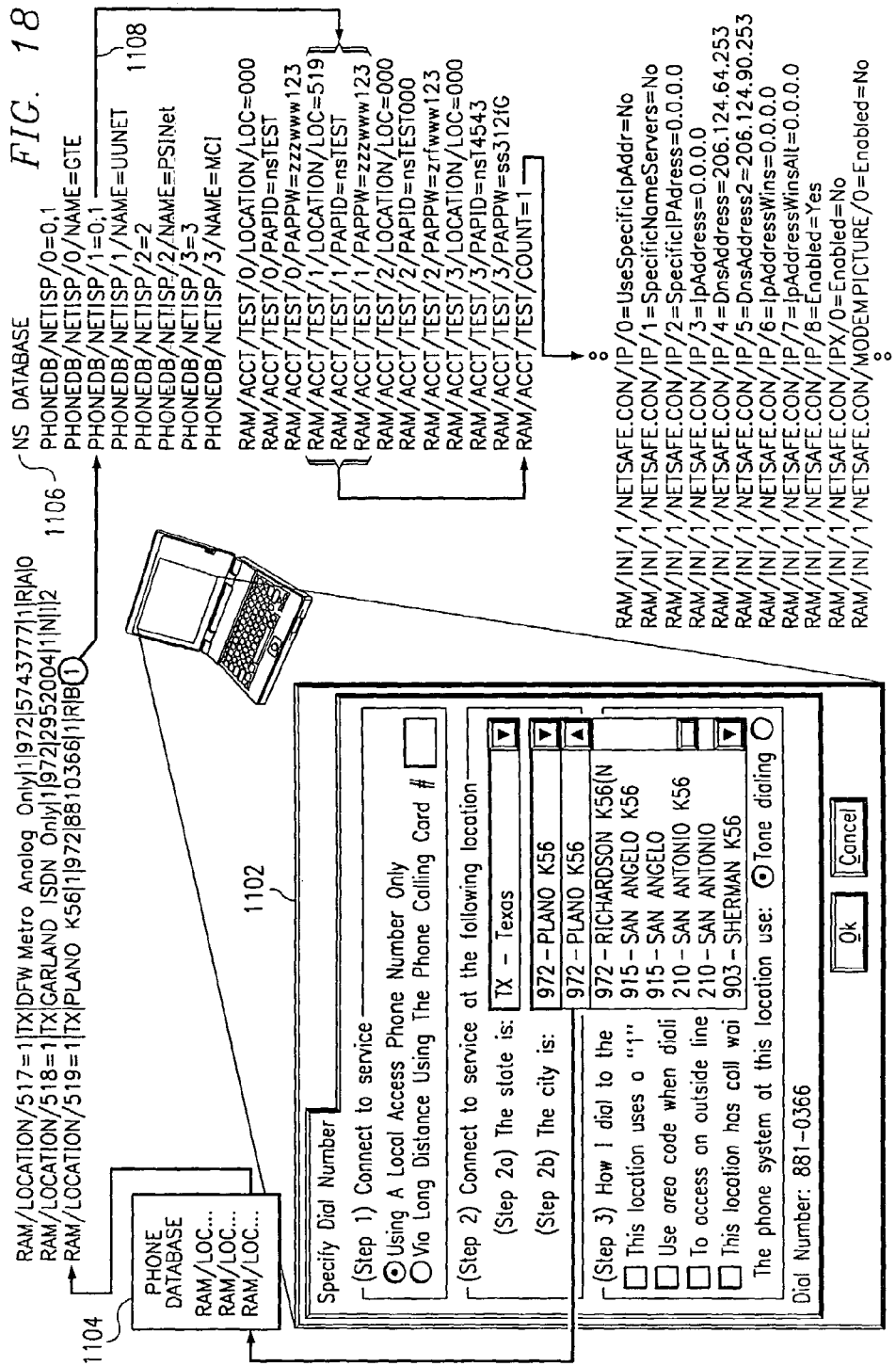
FIG. 18 provides a graphic description of the procedure used by a client in testing the installed software by selection a location from which to access the components of the present invention.

In FIG. 18 a selection menu 1102 is representative of a display that would be presented upon a clients system for selecting a test location to initially use the software installed in FIG. 17. The phone database is represented by 1104 while the NS (network services) database is represented by 1106. When the client selects a city in Tex. such as Plano, the software will note the number "1" at the end of the data of database 1104. In the NS database a "1" is shown to refer to UUNET services. As may be observed, if Garland had been picked, a "2" would have been detected and PSINet services would be used. As shown by arrow line 1108, the software would determine that the test location number is "519", the PAPID to be used is "nsTEST" and the PAP password is "zzzwww123". Other data that may be utilized is also contained in the database.

Figure 19:
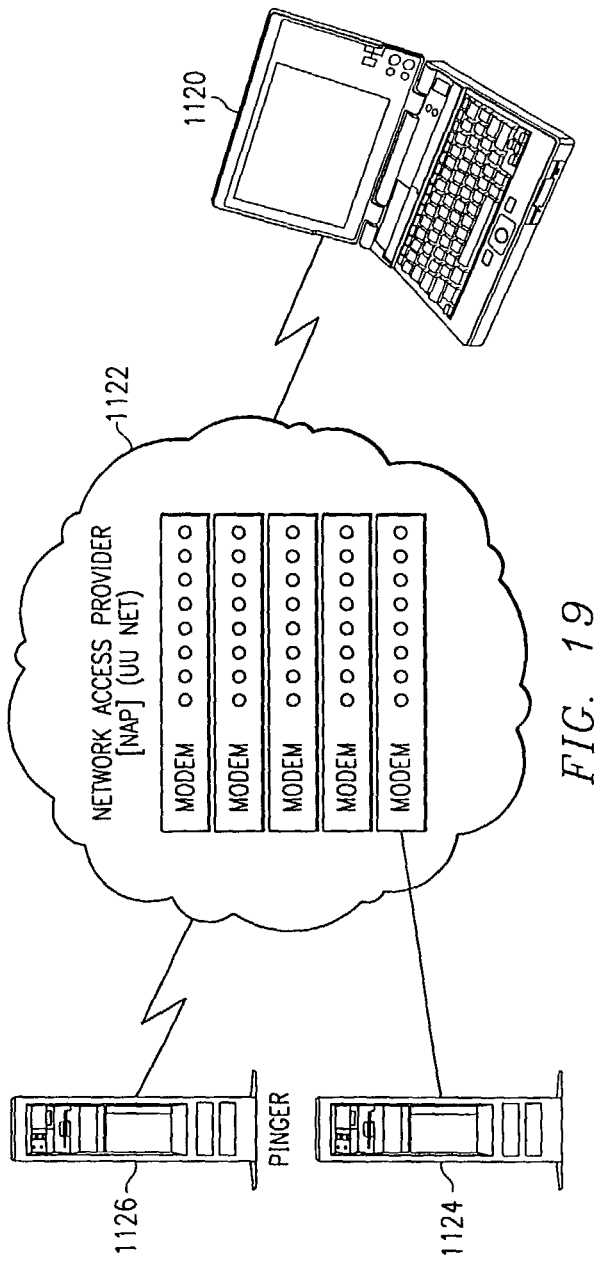
FIG. 19 further illustrates the network test and client system update procedure.

In FIG. 19 the clients computer is designated as 1120, the network as 1122, the network access provider as 1124 and the pinger entity as 1126. The test and update procedure is illustrated. The first action is for 1120 to connect through the NAP shown within network cloud 1122 to 1124 using the PAPID and PAP passwork in the the NS database for the selected NAP. As set forth in FIG. 18, these values would be "nsTEST" and "zzzwww123". The NAP 1124 validates or authenticates the ID and password. For security reasons, the test ID and registration ID network connection, in a preferred embodiment of the invention, is limited to 90 seconds. The system 1120 initiates a full network protocol test to the pinger 1126 by sending information about the client's system (1120) and the software revision installed therein. As will be realized, the installed database includes the address of an appropriate pinger 1126. The pinger 1126, after receiving the information, performs minimal processing on the received data and sends back any update information such as DNS changes, Phone number updates and the like. The pinger may then send back some static information as well as any further update information that the system 1120 may require. The client software in 1120 checks the static information received, validates a reliable connection and then processes any update information for storage in an appropriate location(s).

Figure 20:
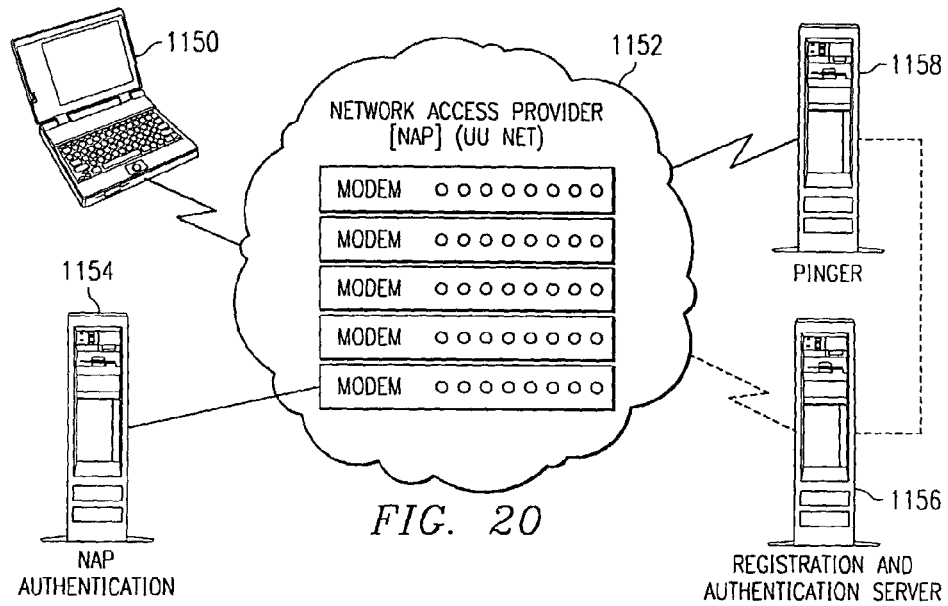
FIG. 20 illustrates the system interaction for providing client registration with the inventive system.

FIG. 20 is presented to help in the description of client registration. The clients system 1150, connects to an NAP in the network 1152 using the registration PAPID and PAP password stored in the NS database for a selected NAP as provided in the originally installed software. Such data may be found in the appendix A NS database in the appropriate lines RAM/ACCT/REG. The authentication portion of the NAP (1154) validates the PAPID and PAP password so that the client 1150 may communicate with a pinger entity such as 1158. (Although the preferred embodiment of the invention has the client 1150 send a registration request to pinger 1158 to provide further "security by obscurity", the registration request can be made directly to a registration and authentication server such as 1156 if so desired and thus proceed directly to a later portion of this paragraph description.) When pinger 1158 receives the registration request, it returns addressing, ID and password information to client 1150. This information will normally have a single life (that is it may only be used once) since the inventive system is designed to continually change passwords and other data such as addresses. With this information, the client 1150 may now initiate a registration request to the server 1156 as referenced above. The server 1156 processes the users supplied information and issues a unique authentication token, a temporary PAPID and PAP password and/or a permanent PAPID and PAP password in accordance with system design. In an alternate embodiment, only a unique authentication token may be issued wherein the software in client 1150 is required to obtain the PAPID and PAP password from a pinger such as 1158. This supplied user registration information is stored in an appropriate database in 1156 for later authentication purposes. It may be noted that blocks 1156 and 1158 may share the same physical hardware but may also be remotely located and be interconnected via the network.

Figure 21:
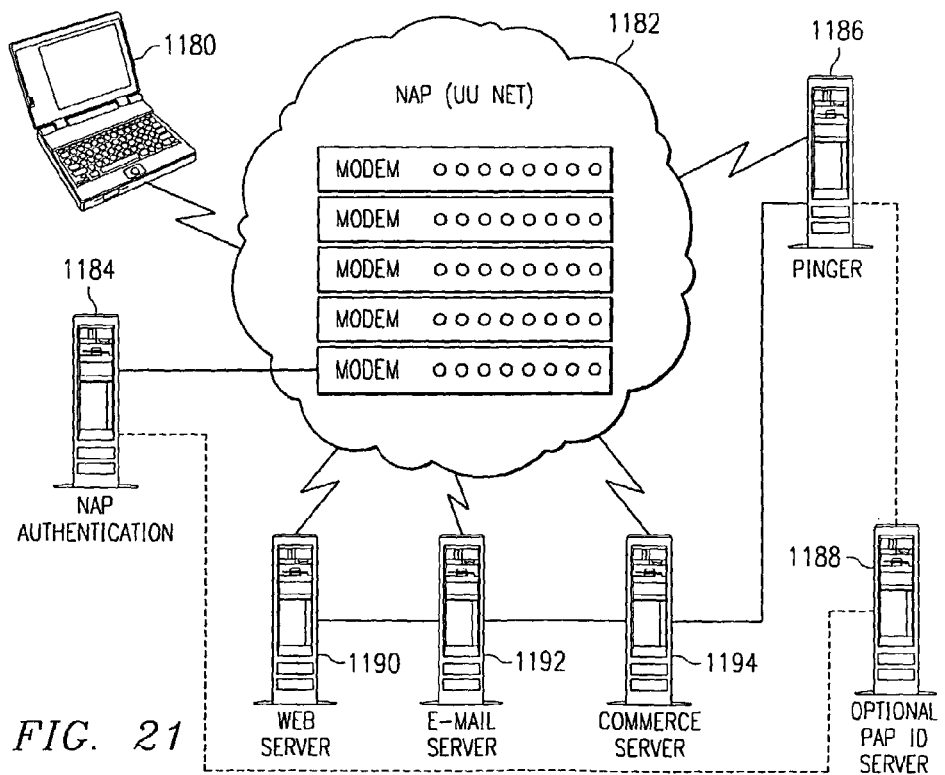
FIG. 21 provides additional illustrative material for the interaction of the client systems software and the components of the inventive system in obtaining general and anonymous access to the system.

FIG. 21 is similar to FIG. 20 in having a client system 1180, a network 1182, a NAP authentication entity 1154, and a pinger entity 1186. In addition an optional PAP ID server 1188 is illustrated connected to the blocks 1184 and 1186. This connection may be through the network or direct as illustrated in the drawing. A further plurality of blocks representing at least a web server 1190, an email server 1192 and a commerce server 1194 are shown connected to the network and directly to pinger 1186. When operating in a general or anonymous access mode, the client 1180 connects to a NAP within network 1182 using a PAPID and PAP password assigned and stored in the NS database for a selected NAP. The NAP validates the ID and password via block 1184. Once connected, client 1180 initiates a "Network Presence Notification" to the appropriate pinger such as 1186. If the client 1180 is set in a selectable "Anonymous Mode" the "Network Presence Notification" will include a request for a new alias along with revised PAPID and PAP password data for use in the next network login attempt.

When the pinger 1186 receives the notification, the date and time of receipt in logged along with the clients authentication token and the network address assigned to the client 1180 by the selected NAP. The pinger 1186 returns a response which may, from time to time, include a new authentication token in addition to data requested when the client is in the "Anonymous Mode". It should be noted that the pinger entities such as 1188 may be used to facilitate "Client side Authentication" when used in conjunction with servers such as 1190, 1192 and 1194 as examples. The client, or others attempting to access the system, does not have access to the information contained in any of the client databases and the client and others cannot spoof a commerce server into believing that a transaction is originating somewhere else or by someone else.

From the above discourse, it may be appreciated that the various databases residing at the access provider and each of the clients systems along with a script language such as MOT and the two way communication between clients and an access provider permits dynamic or constantly changeable network access and encryption parameters to minimize the possibility of unauthorized access to the network access provider or its clients communications. This is accomplished by:
1 Dynamic network login ID and password;
2 Dynamically assigned network address;
3 Dynamically assigned resource user Ids, passwords and so forth;
4 Dynamic encryption algorithm use; and
5 Dynamic encryption key generation and use.

With respect to item 1 above, since a user's network login and password change periodically transparent to the user client and they are hidden from the user so as to be not accessible by the user, network fraud and abuse may be significantly reduced. Further the dynamic assignment process allows the login access to be different from system to system. Since the physical address of a server can be changed on any random or periodic basis, Item 2 causes a significant reduction in the risk of service attacks, network lockouts and unauthorized access to data. The dynamic assigning and reassigning of email alias as occurs in accordance with Item 3 significantly reduces the risk of unauthorized viewing of a given clients email messages. The changing domain aliases minimizes the risk of denial of access service while the dynamically generated and authenticated session IDs for network commerce reduces the risk of fraud.

In addition to the above discussion and description, the present invention is also described and disclosed in Appendices A, B and C which are hereby incorporated by referen Although the invention has been described with reference to a specific embodiment, these descriptions are not meant to be construed in a limiting sense. Various modifications of the disclosed embodiments, as well as alternative embodiments of the invention will become apparent to persons skilled in the art upon reference to the description of the invention. It should also be noted that while terms such as "network device user" may be used to describe a single client, it may also be used to describe a network of users having a common factor such as an employer. It is therefore, contemplated that the claims will cover any such modifications or embodiments that fall within the true scope of the invention.

What is claimed is:

1. A method of connecting a network access device of a user to a network comprising the steps of:
  selecting at least one of a plurality of geographic location indicators stored in the network access device;
  the network access device selecting, based at least on the at least one selected geographic location indicator:
    a first access number of a plurality of access numbers stored in the network access device, each of the plurality of access numbers being associated with the at least one selected geographic location indicator, and
    a plurality of authentication information data items stored in the network access device, wherein one or more of the plurality of authentication information data items is associated with the first access number and selected based at least on the at least one selected geographic location indicator;
  the network access device accessing the first access number;
  the network access device determining whether the first access number is in use;
  upon a determination by the network access device that the first access number is not in use:
    the network access device transmitting the selected one or more authentication information data items associated with the first access number, and
    the network access device connecting the user to the network; and
  upon a determination that the first access number is in use, the network access device connecting to the network via another of the plurality of access numbers stored in the network access device and associated with the at least one selected geographic location indicator.

2. The method of claim 1, wherein the one or more authentication information data items comprises a Password Authentication Protocol identification and password.

3. The method of claim 1, wherein the one or more authentication information data items are specific to the first access number.

4. A method of connecting a user network access device to a network comprising the steps of:
  selecting at least one of a plurality of geographic location indicators stored in the user network access device;
  the network access device selecting, based at least on the at least one selected geographic location indicator:
    an initial predefined access number of an ISP, from a plurality of predefined access numbers stored in the user network access device, the initial predefined access number of an ISP associated with the at least one selected geographic location indicator, and
    one or more authentication information data items, from a plurality of authentication information data items stored in the user network access device, the one or more authentication information data items associated with the initial predefined access number of an ISP and selected based at least on the at least one selected geographic location indicator;
  the user network access device initially determining whether the initial predefined access number of an ISP is to be used;
  upon an initial determination by the user network access device that the initial predefined access number of an ISP is to be used:
    the network access device transmitting the one or more authentication information data items associated with the initial predefined access number of an ISP; and
    the network access device connecting the user to the network via the predefined access number of an ISP;
  upon a determination by the network access device that the initial predefined access number of an ISP is not to be used, performing the substeps of:
    the user network access device selecting, based on the at least one selected geographic location indicator:
      an ISP access number of an ISP that provides a lower cost service to the user, from the plurality of predefined access numbers; and
      one or more authentication information data items associated with the selected ISP access number, from the plurality of authentication information data items; and
    the user network access device connecting the user to the network via the selected ISP access number and using the one or more authentication information data items associated with the selected ISP access number.

5. A method of connecting a network access device of a user to a network comprising the steps of:
  storing a plurality of geographical location indicators in the network access device;
  storing in the network access device a first plurality of access numbers associated with at least one of the geographical location indicators stored in the network access device, and each access number for use in connecting the network access device to the network;
  storing in the network access device a plurality of authentication information data items, each authentication information data item associated with at least one of the plurality of access numbers;
  selecting at least one of the plurality of geographical location indicators stored in the network access device, the at least one geographical location indicator associated with a second plurality of access numbers in the network access device, the first plurality of access numbers comprising the second plurality of access numbers;
  the network access device determining:
    a selected access number in the second plurality of access numbers, the determination based at least on the at least one selected geographical location indicator, and
    one or more selected authentication information data items in the plurality of authentication information data items associated with the selected access number, the determination based at least on the at least one selected geographical location indicator,
    wherein the step of determining comprises the user network access device selecting an access number that provides a higher level of service reliability to the user; and the user network access device connecting the user to the network via the selected access number and using the one or more selected authentication information data items.

6. A method of connecting a network access device of a user to a network comprising the steps of:
storing in the network access device a plurality of access numbers each associated with at least one different geographical indicator, for use in connecting the network access device to the network;
storing in the network access device a plurality of authentication information data items, each authentication information data item associated with at least one of the plurality of access numbers;
selecting at least one of a plurality of geographical indicators stored in the network access device, the at least one geographical indicator associated with at least one of the plurality of access numbers;
the network access device selecting, based on the at least one selected geographical indicator:
an access number of the plurality of access numbers, and
one or more authentication information data items of the plurality of authentication information data items, the one or more authentication information data items selected based at least on the at least one selected geographical indicator; and
the user network access device connecting the user to the network via the selected access number using the selected one or more authentication information data items.

7. The method of claim 5 or 6, further comprising:
authenticating the network access device at a centrally located database point.

8. The method of claim 5 or 6, further comprising:
authenticating the network access device at a local point of presence associated with the selected access number.

9. A method of connecting a network access device of a user to a network comprising the steps of:
storing in the network access device:
a plurality of geographical location indicators for selection to access the network from a plurality of geographic locations,
a plurality of access numbers for use in connecting the network access device to the network from at least one of the plurality of geographic locations, and
a plurality of authentication information data items, each authentication information data item associated with at least one of the plurality of access numbers,
wherein each of the plurality of geographical location indicators is associated with at least one of the plurality of access numbers, wherein the at least one of the plurality of access numbers is an access number of a point of presence for connection to the network, the point of presence local to a geographic location indicated by the geographical location indicator;
selecting at least one of the plurality of geographical location indicators;
the network access device selecting, based at least on the at least one selected geographical location indicator and at least one of a service characteristic or a billing characteristic:
a an access number of the plurality of access numbers, and
one or more authentication information data items of the plurality of authentication information data items, the one or more authentication information data items selected based at least on the at least one selected geographical location indicator and the at least one of a service characteristic or a billing characteristic; and
the network access device transmitting the selected one or more authentication information data items to the point of presence associated with at least the access number selected by the network access device, the one or more authentication information data items associated with the access number selected by the network access device, the point of presence local to a geographic location indicated by the geographical location indicator.

10. The method of claim 9, wherein the selected one or more authentication information data items transmitted to the point of presence are authenticated by a centrally located database point via the local point of presence.

11. The method of claim 10, wherein the centrally located database point comprises an ASP.

12. The method of claim 11, wherein at least one of the one or more local points of presence and the ASP are controlled by the same entity.

13. The method of claim 10, wherein the centrally located database point comprises an ASP billing entity.

14. The method of claim 13, wherein at least one of the one or more local points of presence and the ASP billing entity are controlled by the same entity.

15. The method of claim 10, further comprising the network access device receiving one or more authentication acknowledgements from the centrally located database point via the local point of presence.

16. The method of claim 15, wherein the centrally located database point comprises an ASP.

17. The method of claim 16, wherein at least one of the one or more local points of presence and the ASP are controlled by the same entity.

18. The method of claim 15, wherein the centrally located database point comprises an ASP billing entity.

19. The method of claim 18, wherein at least one of the one or more local points of presence and the ASP billing entity are controlled by the same entity.

20. The method of claim 15, wherein at least one of the one or more local points of presence and the centrally located database point are controlled by the same entity.

21. The method of claim 10, wherein at least one of the one or more local points of presence and the centrally located database point are controlled by the same entity.

* * * * *